(12) United States Patent
McBride et al.

(10) Patent No.: US 7,958,731 B2
(45) Date of Patent: *Jun. 14, 2011

(54) SYSTEMS AND METHODS FOR COMBINED THERMAL AND COMPRESSED GAS ENERGY CONVERSION SYSTEMS

(75) Inventors: Troy O. McBride, West Lebanon, NH (US); Benjamin R. Bollinger, West Lebanon, NH (US); Michael Izenson, Hanover, NH (US); Weibo Chen, Hanover, NH (US); Patrick Magari, Plainfield, NH (US); Benjamin Cameron, Hanover, NH (US)

(73) Assignee: SustainX, Inc., West Lebanon, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/690,513

(22) Filed: Jan. 20, 2010

(65) Prior Publication Data

US 2010/0205960 A1 Aug. 19, 2010

Related U.S. Application Data

(60) Provisional application No. 61/145,864, filed on Jan. 20, 2009, provisional application No. 61/145,860, filed on Jan. 20, 2009, provisional application No. 61/146,432, filed on Jan. 22, 2009, provisional application No. 61/148,481, filed on Jan. 30, 2009, provisional application No. 61/151,332, filed on Feb. 10, 2009, provisional application No. 61/227,222, filed on Jul. 21, 2009, provisional application No. 61/256,576, filed on Oct. 30, 2009, provisional application No. 61/264,317, filed on Nov. 25, 2009, provisional application No. 61/266,758, filed on Dec. 4, 2009.

(51) Int. Cl.
*F16D 31/02* (2006.01)
*F15B 21/04* (2006.01)

(52) U.S. Cl. .............................. 60/613; 60/645; 91/4 R

(58) Field of Classification Search ............ 60/413–418, 60/643, 645, 641.2; 91/4 R, 4 A
See application file for complete search history.

(56) References Cited

U.S. PATENT DOCUMENTS

| 114,297 A | 5/1871 | Ivens et al. |
| 224,081 A | 2/1880 | Eckart |
| 233,432 A | 10/1880 | Pitchford |
| 1,635,524 A | 7/1927 | Aikman |
| 1,681,280 A | 8/1928 | Bruckner |

(Continued)

FOREIGN PATENT DOCUMENTS

BE 898225 3/1984

(Continued)

OTHER PUBLICATIONS

International Search Report and Written Opinion for International Appln. No. PCT/US2010/055279, mailed Jan. 24, 2011 (13 pages).

(Continued)

*Primary Examiner* — Hoang M Nguyen
(74) *Attorney, Agent, or Firm* — Bingham McCutchen LLP

(57) ABSTRACT

The invention relates to systems and methods including an energy conversion system for storage and recovery of energy using compressed gas, a source of recovered thermal energy, and a heat-exchange subsystem in fluid communication with the energy conversion system and the source of recovered thermal energy.

31 Claims, 22 Drawing Sheets

U.S. PATENT DOCUMENTS

| | | |
|---|---|---|
| 2,025,142 A | 12/1935 | Zahm et al. |
| 2,042,991 A | 6/1936 | Harris, Jr. |
| 2,141,703 A | 12/1938 | Bays |
| 2,280,100 A | 4/1942 | Singleton |
| 2,280,845 A | 4/1942 | Parker |
| 2,404,660 A | 7/1946 | Rouleau |
| 2,420,098 A | 5/1947 | Rouleau |
| 2,539,862 A | 1/1951 | Rushing |
| 2,628,564 A | 2/1953 | Jacobs |
| 2,712,728 A | 7/1955 | Lewis et al. |
| 2,813,398 A | 11/1957 | Wilcox |
| 2,829,501 A | 4/1958 | Walls |
| 2,880,759 A | 4/1959 | Wisman |
| 3,041,842 A | 7/1962 | Heinecke |
| 3,236,512 A | 2/1966 | Kirsch et al. |
| 3,269,121 A | 8/1966 | Ludwig |
| 3,538,340 A | 11/1970 | Lang |
| 3,608,311 A | 9/1971 | Roesel, Jr. |
| 3,648,458 A * | 3/1972 | McAlister ............. 60/415 |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,757,517 A | 9/1973 | Rigollot |
| 3,793,848 A | 2/1974 | Eskeli |
| 3,801,793 A | 4/1974 | Goebel |
| 3,803,847 A * | 4/1974 | McAlister ............. 60/721 |
| 3,839,863 A | 10/1974 | Frazier |
| 3,847,182 A | 11/1974 | Greer |
| 3,895,493 A | 7/1975 | Rigollot |
| 3,903,696 A | 9/1975 | Carman |
| 3,935,469 A | 1/1976 | Haydock |
| 3,939,356 A | 2/1976 | Loane |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | Herberg |
| 3,998,049 A | 12/1976 | McKinley et al. |
| 4,008,006 A | 2/1977 | Bea |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,055,950 A | 11/1977 | Grossman |
| 4,058,979 A | 11/1977 | Germain |
| 4,089,744 A | 5/1978 | Cahn |
| 4,095,118 A | 6/1978 | Rathbun |
| 4,100,745 A | 7/1978 | Gyarmathy et al. |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,696 A | 10/1978 | Fawcett et al. |
| 4,118,637 A | 10/1978 | Tackett |
| 4,124,182 A | 11/1978 | Loeb |
| 4,126,000 A | 11/1978 | Funk |
| 4,136,432 A | 1/1979 | Melley, Jr. |
| 4,142,368 A | 3/1979 | Mantegani |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahnig |
| 4,173,431 A | 11/1979 | Smith |
| 4,189,925 A | 2/1980 | Long |
| 4,197,700 A | 4/1980 | Jahnig |
| 4,197,715 A | 4/1980 | Fawcett et al. |
| 4,201,514 A | 5/1980 | Huetter |
| 4,204,126 A | 5/1980 | Diggs |
| 4,206,608 A | 6/1980 | Bell |
| 4,209,982 A | 7/1980 | Pitts |
| 4,220,006 A | 9/1980 | Kindt |
| 4,229,143 A | 10/1980 | Pucher |
| 4,229,661 A | 10/1980 | Mead et al. |
| 4,232,253 A | 11/1980 | Mortelmans |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege |
| 4,273,514 A | 6/1981 | Shore et al. |
| 4,274,010 A | 6/1981 | Lawson-tancred |
| 4,275,310 A | 6/1981 | Summers et al. |
| 4,281,256 A | 7/1981 | Ahrens |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |
| 4,311,011 A | 1/1982 | Lewis |
| 4,316,096 A | 2/1982 | Syverson |
| 4,317,439 A | 3/1982 | Emmerling |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,375,387 A | 3/1983 | deFilippi et al. |
| 4,380,419 A | 4/1983 | Morton |
| 4,393,752 A | 7/1983 | Meier |
| 4,411,136 A | 10/1983 | Funk |
| 4,421,661 A | 12/1983 | Claar et al. |
| 4,428,711 A | 1/1984 | Archer |
| 4,435,131 A | 3/1984 | Ruben |
| 4,444,011 A | 4/1984 | Kolin |
| 4,446,698 A | 5/1984 | Benson |
| 4,447,738 A | 5/1984 | Allison |
| 4,449,372 A | 5/1984 | Rilett |
| 4,452,046 A | 6/1984 | Valentin |
| 4,454,429 A | 6/1984 | Buonome |
| 4,454,720 A | 6/1984 | Leibowitz |
| 4,455,834 A | 6/1984 | Earle |
| 4,462,213 A | 7/1984 | Lewis |
| 4,474,002 A | 10/1984 | Perry |
| 4,476,851 A | 10/1984 | Brugger et al. |
| 4,478,553 A | 10/1984 | Leibowitz et al. |
| 4,489,554 A | 12/1984 | Otters |
| 4,491,739 A | 1/1985 | Watson |
| 4,492,539 A | 1/1985 | Specht |
| 4,493,189 A | 1/1985 | Slater |
| 4,496,847 A | 1/1985 | Parkings |
| 4,498,848 A | 2/1985 | Petrovsky et al. |
| 4,502,284 A | 3/1985 | Chrisoghilos |
| 4,503,673 A | 3/1985 | Schachle |
| 4,515,516 A | 5/1985 | Perrine et al. |
| 4,520,840 A | 6/1985 | Michel |
| 4,525,631 A | 6/1985 | Allison |
| 4,530,208 A | 7/1985 | Sato |
| 4,547,209 A | 10/1985 | Netzer |
| 4,585,039 A | 4/1986 | Hamilton |
| 4,589,475 A | 5/1986 | Jones |
| 4,593,202 A | 6/1986 | Dickinson |
| 4,619,225 A | 10/1986 | Lowther |
| 4,624,623 A | 11/1986 | Wagner |
| 4,648,801 A | 3/1987 | Wilson |
| 4,651,525 A | 3/1987 | Cestero |
| 4,653,986 A | 3/1987 | Ashton |
| 4,671,742 A | 6/1987 | Gyimesi |
| 4,676,068 A | 6/1987 | Funk |
| 4,679,396 A | 7/1987 | Heggie |

| | | | | | | |
|---|---|---|---|---|---|---|
| 4,691,524 A | 9/1987 | Holscher | | 5,600,953 A | 2/1997 | Oshita et al. |
| 4,693,080 A | 9/1987 | Van Hooff | | 5,616,007 A | 4/1997 | Cohen |
| 4,706,456 A | 11/1987 | Backe | | 5,634,340 A | 6/1997 | Grennan |
| 4,707,988 A | 11/1987 | Palmers | | 5,641,273 A | 6/1997 | Moseley |
| 4,710,100 A | 12/1987 | Laing et al. | | 5,674,053 A | 10/1997 | Paul et al. |
| 4,735,552 A | 4/1988 | Watson | | 5,685,155 A | 11/1997 | Brown |
| 4,739,620 A | 4/1988 | Pierce | | 5,768,893 A * | 6/1998 | Hoshino et al. .................. 60/682 |
| 4,760,697 A | 8/1988 | Heggie | | 5,769,610 A | 6/1998 | Paul et al. |
| 4,761,118 A | 8/1988 | Zanarini et al. | | 5,771,693 A | 6/1998 | Coney |
| 4,765,142 A | 8/1988 | Nakhamkin | | 5,775,107 A | 7/1998 | Sparkman |
| 4,765,143 A | 8/1988 | Crawford et al. | | 5,778,675 A | 7/1998 | Nakhamkin |
| 4,767,938 A | 8/1988 | Bervig | | 5,794,442 A | 8/1998 | Lisniansky |
| 4,792,700 A | 12/1988 | Ammons | | 5,797,980 A | 8/1998 | Fillet |
| 4,849,648 A | 7/1989 | Longardner | | 5,819,533 A | 10/1998 | Moonen |
| 4,870,816 A | 10/1989 | Nakhamkin | | 5,819,635 A | 10/1998 | Moonen |
| 4,872,307 A | 10/1989 | Nakhamkin | | 5,831,757 A | 11/1998 | DiFrancesco |
| 4,873,828 A | 10/1989 | Laing et al. | | 5,832,728 A | 11/1998 | Buck |
| 4,873,831 A | 10/1989 | Dehne | | 5,832,906 A | 11/1998 | Douville et al. |
| 4,876,992 A | 10/1989 | Sobotowski | | 5,839,270 A | 11/1998 | Jirnov et al. |
| 4,877,530 A | 10/1989 | Moses | | 5,845,479 A | 12/1998 | Nakhamkin |
| 4,885,912 A | 12/1989 | Nakhamkin | | 5,873,250 A | 2/1999 | Lewis |
| 4,886,534 A | 12/1989 | Castan | | 5,901,809 A | 5/1999 | Berkun |
| 4,907,495 A | 3/1990 | Sugahara | | 5,924,283 A | 7/1999 | Burke, Jr. |
| 4,936,109 A | 6/1990 | Longardner | | 5,934,063 A | 8/1999 | Nakhamkin |
| 4,942,736 A | 7/1990 | Bronicki | | 5,934,076 A | 8/1999 | Coney |
| 4,947,977 A | 8/1990 | Raymond | | 5,937,652 A | 8/1999 | Abdelmalek |
| 4,955,195 A * | 9/1990 | Jones et al. ...................... 60/405 | | 5,971,027 A | 10/1999 | Beachley et al. |
| 4,984,432 A | 1/1991 | Corey | | 6,012,279 A | 1/2000 | Hines |
| 5,056,601 A | 10/1991 | Grimmer | | 6,023,105 A | 2/2000 | Youssef |
| 5,058,385 A | 10/1991 | Everett, Jr. | | 6,026,349 A | 2/2000 | Heneman |
| 5,062,498 A | 11/1991 | Tobias | | 6,029,445 A | 2/2000 | Lech |
| 5,107,681 A | 4/1992 | Wolfbauer, III | | 6,073,445 A * | 6/2000 | Johnson .......................... 60/512 |
| 5,133,190 A | 7/1992 | Abdelmalek | | 6,073,448 A * | 6/2000 | Lozada ....................... 60/641.2 |
| 5,138,838 A | 8/1992 | Crosser | | 6,085,520 A | 7/2000 | Kohno |
| 5,140,170 A | 8/1992 | Henderson | | 6,090,186 A | 7/2000 | Spencer |
| 5,152,260 A | 10/1992 | Erickson et al. | | 6,119,802 A | 9/2000 | Puett, Jr. |
| 5,161,449 A | 11/1992 | Everett, Jr. | | 6,132,181 A | 10/2000 | Mccabe |
| 5,169,295 A | 12/1992 | Stogner et al. | | 6,145,311 A | 11/2000 | Cyphelly |
| 5,182,086 A | 1/1993 | Henderson et al. | | 6,148,602 A | 11/2000 | Demetri |
| 5,203,168 A | 4/1993 | Oshina | | 6,153,943 A | 11/2000 | Mistr, Jr. |
| 5,209,063 A | 5/1993 | Shirai et al. | | 6,158,499 A | 12/2000 | Rhodes |
| 5,213,470 A | 5/1993 | Lundquist | | 6,170,443 B1 | 1/2001 | Hofbauer |
| 5,239,833 A | 8/1993 | Fineblum | | 6,178,735 B1 | 1/2001 | Frutschi |
| 5,259,345 A | 11/1993 | Richeson | | 6,179,446 B1 | 1/2001 | Sarmadi |
| 5,271,225 A | 12/1993 | Adamides | | 6,188,182 B1 | 2/2001 | Nickols et al. |
| 5,279,206 A | 1/1994 | Krantz | | 6,202,707 B1 | 3/2001 | Woodall et al. |
| 5,296,799 A | 3/1994 | Davis | | 6,206,660 B1 | 3/2001 | Coney et al. |
| 5,309,713 A | 5/1994 | Vassallo | | 6,210,131 B1 | 4/2001 | Whitehead |
| 5,321,946 A | 6/1994 | Abdelmalek | | 6,216,462 B1 | 4/2001 | Gray, Jr. |
| 5,327,987 A | 7/1994 | Abdelmalek | | 6,225,706 B1 | 5/2001 | Keller |
| 5,339,633 A | 8/1994 | Fujii et al. | | 6,276,123 B1 | 8/2001 | Chen et al. |
| 5,341,644 A | 8/1994 | Nelson | | 6,327,858 B1 | 12/2001 | Negre et al. |
| 5,344,627 A | 9/1994 | Fujii et al. | | 6,327,994 B1 | 12/2001 | Labrador |
| 5,364,611 A | 11/1994 | Iijima et al. | | 6,349,543 B1 | 2/2002 | Lisniansky |
| 5,365,980 A | 11/1994 | Deberardinis | | RE37,603 E | 3/2002 | Coney |
| 5,375,417 A | 12/1994 | Barth | | 6,352,576 B1 | 3/2002 | Spencer et al. |
| 5,379,589 A | 1/1995 | Cohn et al. | | 6,360,535 B1 | 3/2002 | Fisher |
| 5,384,489 A | 1/1995 | Bellac | | 6,367,570 B1 | 4/2002 | Long, III |
| 5,387,089 A | 2/1995 | Stogner et al. | | 6,372,023 B1 | 4/2002 | Kiyono et al. |
| 5,394,693 A | 3/1995 | Plyter | | 6,389,814 B2 | 5/2002 | Viteri et al. |
| 5,427,194 A | 6/1995 | Miller | | 6,397,578 B2 | 6/2002 | Tsukamoto |
| 5,436,508 A | 7/1995 | Sorensen | | 6,401,458 B2 | 6/2002 | Jacobson |
| 5,448,889 A | 9/1995 | Bronicki | | 6,407,465 B1 | 6/2002 | Peltz et al. |
| 5,454,408 A | 10/1995 | Dibella et al. | | 6,419,462 B1 | 7/2002 | Horie et al. |
| 5,454,426 A | 10/1995 | Moseley | | 6,422,016 B2 | 7/2002 | Alkhamis |
| 5,467,722 A | 11/1995 | Meratla | | 6,478,289 B1 | 11/2002 | Trewin |
| 5,477,677 A | 12/1995 | Krnavek | | 6,512,966 B2 | 1/2003 | Lof |
| 5,491,969 A | 2/1996 | Cohn et al. | | 6,513,326 B1 | 2/2003 | Maceda et al. |
| 5,491,977 A | 2/1996 | Cho | | 6,516,615 B1 | 2/2003 | Stockhausen et al. |
| 5,524,821 A | 6/1996 | Yie et al. | | 6,516,616 B2 | 2/2003 | Carver |
| 5,537,822 A | 7/1996 | Shnaid et al. | | 6,598,392 B2 | 7/2003 | Majeres |
| 5,544,698 A | 8/1996 | Paulman | | 6,598,402 B2 | 7/2003 | Kataoka et al. |
| 5,561,978 A | 10/1996 | Buschur | | 6,606,860 B2 | 8/2003 | McFarland |
| 5,562,010 A | 10/1996 | McGuire | | 6,612,348 B1 | 9/2003 | Wiley |
| 5,579,640 A * | 12/1996 | Gray et al. ...................... 60/413 | | 6,619,930 B2 | 9/2003 | Jansen et al. |
| 5,584,664 A | 12/1996 | Elliott et al. | | 6,626,212 B2 | 9/2003 | Morioka et al. |
| 5,592,028 A | 1/1997 | Pritchard | | 6,629,413 B1 | 10/2003 | Wendt et al. |
| 5,598,736 A | 2/1997 | Erskine | | 6,637,185 B2 | 10/2003 | Hatamiya et al. |
| 5,599,172 A | 2/1997 | Mccabe | | 6,652,241 B1 | 11/2003 | Alder |

| | | |
|---|---|---|
| 6,652,243 B2 | 11/2003 | Krasnov |
| 6,666,024 B1 | 12/2003 | Moskal |
| 6,670,402 B1 | 12/2003 | Lee et al. |
| 6,672,056 B2 | 1/2004 | Roth et al. |
| 6,675,765 B2 | 1/2004 | Endoh |
| 6,688,108 B1 | 2/2004 | Van Liere |
| 6,698,472 B2 | 3/2004 | Camacho et al. |
| 6,711,984 B2 | 3/2004 | Tagge et al. |
| 6,712,166 B2 | 3/2004 | Rush et al. |
| 6,715,514 B2 | 4/2004 | Parker, III |
| 6,718,761 B2 | 4/2004 | Merswolke et al. |
| 6,739,131 B1 | 5/2004 | Kershaw |
| 6,745,569 B2 | 6/2004 | Gerdes |
| 6,745,801 B1 | 6/2004 | Cohen et al. |
| 6,748,737 B2 | 6/2004 | Lafferty |
| 6,762,926 B1 | 7/2004 | Shiue et al. |
| 6,786,245 B1 | 9/2004 | Eichelberger |
| 6,789,387 B2 | 9/2004 | Brinkman |
| 6,789,576 B2 | 9/2004 | Umetsu et al. |
| 6,797,039 B2 | 9/2004 | Spencer |
| 6,815,840 B1 | 11/2004 | Aldendeshe |
| 6,817,185 B2 | 11/2004 | Coney et al. |
| 6,834,737 B2 | 12/2004 | Bloxham |
| 6,848,259 B2 | 2/2005 | Kelller-Sornig |
| 6,857,450 B2 | 2/2005 | Rupp |
| 6,886,326 B2 | 5/2005 | Holtzapple et al. |
| 6,892,802 B2 | 5/2005 | Kelly et al. |
| 6,900,556 B2 | 5/2005 | Provanzana |
| 6,922,991 B2 | 8/2005 | Polcuch |
| 6,925,821 B2 | 8/2005 | Sienel |
| 6,927,503 B2 | 8/2005 | Enish et al. |
| 6,931,848 B2 * | 8/2005 | Maceda et al. .................. 60/524 |
| 6,935,096 B2 | 8/2005 | Haiun |
| 6,938,415 B2 | 9/2005 | Last |
| 6,938,654 B2 | 9/2005 | Gershtein et al. |
| 6,946,017 B2 | 9/2005 | Leppin et al. |
| 6,948,328 B2 | 9/2005 | Kidwell |
| 6,952,058 B2 | 10/2005 | Mccoin |
| 6,959,546 B2 | 11/2005 | Corcoran |
| 6,963,802 B2 | 11/2005 | Enis et al. |
| 6,964,165 B2 | 11/2005 | Uhl et al. |
| 6,964,176 B2 | 11/2005 | Kidwell |
| 6,974,307 B2 | 12/2005 | Antoune et al. |
| 7,000,389 B2 | 2/2006 | Lewellin |
| 7,007,474 B1 | 3/2006 | Ochs et al. |
| 7,017,690 B2 | 3/2006 | Burke |
| 7,028,934 B2 | 4/2006 | Burynski, Jr. |
| 7,040,083 B2 | 5/2006 | Horii et al. |
| 7,040,108 B1 | 5/2006 | Flammang |
| 7,040,859 B2 | 5/2006 | Kane |
| 7,043,920 B2 | 5/2006 | Viteri et al. |
| 7,047,744 B1 | 5/2006 | Robertson et al. |
| 7,055,325 B2 | 6/2006 | Wolken |
| 7,067,937 B2 | 6/2006 | Enish et al. |
| 7,075,189 B2 | 7/2006 | Heronemus |
| RE39,249 E | 8/2006 | Link, Jr. |
| 7,084,520 B2 | 8/2006 | Zambrano |
| 7,086,231 B2 | 8/2006 | Pinkerton |
| 7,093,450 B2 | 8/2006 | Jimenez Haertel et al. |
| 7,093,626 B2 | 8/2006 | Li et al. |
| 7,098,552 B2 | 8/2006 | Mccoin |
| 7,107,766 B2 | 9/2006 | Zacche' et al. |
| 7,107,767 B2 | 9/2006 | Frazer et al. |
| 7,116,006 B2 | 10/2006 | Mccoin |
| 7,124,576 B2 | 10/2006 | Cherney et al. |
| 7,124,586 B2 | 10/2006 | Negre et al. |
| 7,127,895 B2 | 10/2006 | Pinkerton et al. |
| 7,128,777 B2 | 10/2006 | Spencer |
| 7,134,279 B2 | 11/2006 | White |
| 7,155,912 B2 | 1/2007 | Enis et al. |
| 7,168,928 B1 | 1/2007 | West |
| 7,168,929 B2 | 1/2007 | Siegel et al. |
| 7,169,489 B2 | 1/2007 | Redmond |
| 7,177,751 B2 | 2/2007 | Froloff |
| 7,178,337 B2 | 2/2007 | Pflanz |
| 7,191,603 B2 | 3/2007 | Taube |
| 7,197,871 B2 | 4/2007 | Yoshino |
| 7,201,095 B2 | 4/2007 | Hughey |
| 7,218,009 B2 | 5/2007 | Hendrickson et al. |
| 7,219,779 B2 | 5/2007 | Bauer et al. |
| 7,225,762 B2 | 6/2007 | Mahlanen |
| 7,228,690 B2 | 6/2007 | Barker |
| 7,230,348 B2 | 6/2007 | Poole |
| 7,231,998 B1 | 6/2007 | Schechter |
| 7,240,812 B2 | 7/2007 | Kamikozuru |
| 7,249,617 B2 | 7/2007 | Musselman et al. |
| 7,254,944 B1 | 8/2007 | Goetzinger et al. |
| 7,273,122 B2 | 9/2007 | Rose |
| 7,281,371 B1 | 10/2007 | Heidenreich |
| 7,308,361 B2 | 12/2007 | Enis et al. |
| 7,317,261 B2 | 1/2008 | Rolt |
| 7,322,377 B2 | 1/2008 | Baltes |
| 7,325,401 B1 | 2/2008 | Kesseli et al. |
| 7,328,575 B2 | 2/2008 | Hedman |
| 7,329,099 B2 | 2/2008 | Hartman |
| 7,347,049 B2 | 3/2008 | Rajendran et al. |
| 7,353,786 B2 | 4/2008 | Scuderi et al. |
| 7,353,845 B2 | 4/2008 | Underwood et al. |
| 7,354,252 B2 | 4/2008 | Baatrup et al. |
| 7,364,410 B2 | 4/2008 | Link, Jr. |
| 7,392,871 B2 | 7/2008 | Severinsky et al. |
| 7,406,828 B1 | 8/2008 | Nakhamkin |
| 7,407,501 B2 | 8/2008 | Zvuloni |
| 7,415,835 B2 | 8/2008 | Cowans et al. |
| 7,415,995 B2 | 8/2008 | Plummer et al. |
| 7,417,331 B2 | 8/2008 | De la Torre et al. |
| 7,418,820 B2 | 9/2008 | Harvey et al. |
| 7,436,086 B2 | 10/2008 | Mcclintic |
| 7,441,399 B2 | 10/2008 | Utamura |
| 7,448,213 B2 | 11/2008 | Mitani |
| 7,453,164 B2 | 11/2008 | Borden et al. |
| 7,469,527 B2 | 12/2008 | Negre et al. |
| 7,471,010 B1 | 12/2008 | Fingersh |
| 7,481,337 B2 | 1/2009 | Luharuka et al. |
| 7,488,159 B2 | 2/2009 | Bhatt et al. |
| 7,527,483 B1 | 5/2009 | Glauber |
| 7,579,700 B1 | 8/2009 | Meller |
| 7,603,970 B2 | 10/2009 | Scuderi et al. |
| 7,607,503 B1 | 10/2009 | Schechter |
| 7,693,402 B2 | 4/2010 | Hudson et al. |
| 7,802,426 B2 * | 9/2010 | Bollinger .................. 60/508 |
| 7,827,787 B2 | 11/2010 | Cherney et al. |
| 7,900,444 B1 | 3/2011 | McBride et al. |
| 2001/0045093 A1 | 11/2001 | Jacobson |
| 2003/0131599 A1 | 7/2003 | Gerdes |
| 2003/0145589 A1 | 8/2003 | Tillyer |
| 2003/0177767 A1 | 9/2003 | Keller-Sornig et al. |
| 2003/0180155 A1 | 9/2003 | Coney et al. |
| 2004/0050042 A1 | 3/2004 | Frazer |
| 2004/0050049 A1 | 3/2004 | Wendt et al. |
| 2004/0146406 A1 | 7/2004 | Last |
| 2004/0146408 A1 | 7/2004 | Anderson |
| 2004/0148934 A1 | 8/2004 | Pinkerton et al. |
| 2004/0211182 A1 | 10/2004 | Gould |
| 2004/0244580 A1 | 12/2004 | Coney et al. |
| 2004/0261415 A1 | 12/2004 | Negre et al. |
| 2005/0016165 A1 | 1/2005 | Enis et al. |
| 2005/0028529 A1 | 2/2005 | Bartlett et al. |
| 2005/0047930 A1 | 3/2005 | Schmid |
| 2005/0072154 A1 | 4/2005 | Frutschi |
| 2005/0115234 A1 | 6/2005 | Asano et al. |
| 2005/0155347 A1 | 7/2005 | Lewellin |
| 2005/0166592 A1 | 8/2005 | Larson et al. |
| 2005/0274334 A1 | 12/2005 | Warren |
| 2005/0275225 A1 | 12/2005 | Bertolotti |
| 2005/0279086 A1 | 12/2005 | Hoos |
| 2005/0279292 A1 | 12/2005 | Hudson et al. |
| 2006/0055175 A1 | 3/2006 | Grinblat |
| 2006/0059936 A1 | 3/2006 | Radke et al. |
| 2006/0059937 A1 | 3/2006 | Perkins et al. |
| 2006/0075749 A1 | 4/2006 | Cherney et al. |
| 2006/0090467 A1 | 5/2006 | Crow |
| 2006/0090477 A1 | 5/2006 | Rolff |
| 2006/0107664 A1 | 5/2006 | Hudson et al. |
| 2006/0162543 A1 | 7/2006 | Abe et al. |
| 2006/0162910 A1 | 7/2006 | Kelly et al. |
| 2006/0175337 A1 | 8/2006 | Defosset |
| 2006/0201148 A1 | 9/2006 | Zabtcioglu |

| | | |
|---|---|---|
| 2006/0248886 A1 | 11/2006 | Ma |
| 2006/0248892 A1 | 11/2006 | Ingersoll |
| 2006/0254281 A1 | 11/2006 | Badeer et al. |
| 2006/0260311 A1 | 11/2006 | Ingersoll |
| 2006/0260312 A1 | 11/2006 | Ingersoll |
| 2006/0262465 A1 | 11/2006 | Wiederhold |
| 2006/0266034 A1 | 11/2006 | Ingersoll |
| 2006/0266035 A1 | 11/2006 | Ingersoll et al. |
| 2006/0266036 A1 | 11/2006 | Ingersoll |
| 2006/0266037 A1 | 11/2006 | Ingersoll |
| 2006/0280993 A1 | 12/2006 | Keefer et al. |
| 2006/0283967 A1 | 12/2006 | Cho et al. |
| 2007/0006586 A1 | 1/2007 | Hoffman et al. |
| 2007/0022754 A1 | 2/2007 | Perkins et al. |
| 2007/0022755 A1 | 2/2007 | Pinkerton et al. |
| 2007/0062194 A1 | 3/2007 | Ingersoll |
| 2007/0074533 A1 | 4/2007 | Hugenroth et al. |
| 2007/0095069 A1 | 5/2007 | Joshi et al. |
| 2007/0113803 A1 | 5/2007 | Froloff et al. |
| 2007/0116572 A1 | 5/2007 | Barbu et al. |
| 2007/0137595 A1 | 6/2007 | Greenwell |
| 2007/0151528 A1 | 7/2007 | Hedman |
| 2007/0158946 A1 | 7/2007 | Annen et al. |
| 2007/0181199 A1 | 8/2007 | Weber |
| 2007/0182160 A1 | 8/2007 | Enis et al. |
| 2007/0205298 A1 | 9/2007 | Harrison et al. |
| 2007/0234749 A1 | 10/2007 | Enis et al. |
| 2007/0243066 A1 | 10/2007 | Baron |
| 2007/0245735 A1 | 10/2007 | Ashikian |
| 2007/0258834 A1 | 11/2007 | Froloff et al. |
| 2008/0000436 A1 | 1/2008 | Goldman |
| 2008/0016868 A1 | 1/2008 | Ochs et al. |
| 2008/0047272 A1 | 2/2008 | Schoell |
| 2008/0050234 A1 | 2/2008 | Ingersoll et al. |
| 2008/0072870 A1 | 3/2008 | Chomyszak et al. |
| 2008/0087165 A1 | 4/2008 | Wright et al. |
| 2008/0104939 A1 | 5/2008 | Hoffmann et al. |
| 2008/0112807 A1 | 5/2008 | Uphues et al. |
| 2008/0127632 A1 | 6/2008 | Finkenrath et al. |
| 2008/0138265 A1 | 6/2008 | Lackner et al. |
| 2008/0155975 A1 | 7/2008 | Brinkman |
| 2008/0155976 A1 | 7/2008 | Smith et al. |
| 2008/0157528 A1 | 7/2008 | Wang et al. |
| 2008/0157537 A1 | 7/2008 | Richard |
| 2008/0164449 A1 | 7/2008 | Gray et al. |
| 2008/0185194 A1 | 8/2008 | Leone |
| 2008/0202120 A1 | 8/2008 | Karyambas |
| 2008/0211230 A1 | 9/2008 | Gurin |
| 2008/0228323 A1 | 9/2008 | Laumer et al. |
| 2008/0233029 A1 | 9/2008 | Fan et al. |
| 2008/0238105 A1 | 10/2008 | Ortiz et al. |
| 2008/0238187 A1 | 10/2008 | Garnett et al. |
| 2008/0250788 A1* | 10/2008 | Nuel et al. ............... 60/641.14 |
| 2008/0251302 A1 | 10/2008 | Lynn et al. |
| 2008/0272597 A1 | 11/2008 | Althaus |
| 2008/0272598 A1 | 11/2008 | Nakhamkin |
| 2008/0272605 A1 | 11/2008 | Borden et al. |
| 2008/0308168 A1 | 12/2008 | O'Brien, II et al. |
| 2008/0308270 A1 | 12/2008 | Wilson |
| 2008/0315589 A1 | 12/2008 | Malmrup |
| 2009/0000290 A1 | 1/2009 | Brinkman |
| 2009/0007558 A1 | 1/2009 | Hall |
| 2009/0008173 A1 | 1/2009 | Hall et al. |
| 2009/0010772 A1 | 1/2009 | Siemroth |
| 2009/0020275 A1 | 1/2009 | Neher et al. |
| 2009/0021012 A1 | 1/2009 | Stull et al. |
| 2009/0056331 A1 | 3/2009 | Zhao et al. |
| 2009/0071153 A1 | 3/2009 | Boyapati et al. |
| 2009/0107784 A1* | 4/2009 | Gabriel et al. ............. 188/313 |
| 2009/0145130 A1 | 6/2009 | Kaufman |
| 2009/0158740 A1 | 6/2009 | Littau et al. |
| 2009/0178409 A1 | 7/2009 | Shinnar |
| 2009/0200805 A1 | 8/2009 | Kim et al. |
| 2009/0229902 A1 | 9/2009 | Stansbury, III |
| 2009/0249826 A1 | 10/2009 | Hugelman |
| 2009/0282822 A1 | 11/2009 | McBride et al. |
| 2009/0282840 A1 | 11/2009 | Chen et al. |
| 2009/0294096 A1 | 12/2009 | Mills et al. |
| 2009/0301089 A1 | 12/2009 | Bollinger |
| 2009/0317267 A1 | 12/2009 | Gill et al. |
| 2009/0322090 A1 | 12/2009 | Wolf |
| 2010/0018196 A1 | 1/2010 | Li et al. |
| 2010/0077765 A1 | 4/2010 | Japikse |
| 2010/0089063 A1 | 4/2010 | McBride et al. |
| 2010/0133903 A1 | 6/2010 | Rufer |
| 2010/0139277 A1 | 6/2010 | McBride et al. |
| 2010/0193270 A1 | 8/2010 | Deshaies et al. |
| 2010/0199652 A1 | 8/2010 | Lemofouet et al. |
| 2010/0205960 A1 | 8/2010 | McBride et al. |
| 2010/0229544 A1 | 9/2010 | Bollinger et al. |
| 2010/0307156 A1 | 12/2010 | Bollinger |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |

FOREIGN PATENT DOCUMENTS

| | | |
|---|---|---|
| BE | 1008885 | 8/1996 |
| CH | 201125855 | 10/2008 |
| CN | 1061262 | 5/1992 |
| CN | 1171490 | 1/1998 |
| CN | 1276308 | 12/2000 |
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |
| CN | 201103518 | 8/2008 |
| CN | 201106527 | 8/2008 |
| CN | 101289963 | 10/2008 |
| CN | 101377190 | 4/2009 |
| CN | 101408213 | 4/2009 |
| CN | 101435451 | 5/2009 |
| DE | 25 38 870 | 6/1977 |
| DE | 19530253 | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 10 2005 047622 | 4/2007 |
| EP | 0204748 | 3/1981 |
| EP | 0091801 | 10/1983 |
| EP | 0097002 | 12/1983 |
| EP | 0196690 | 10/1986 |
| EP | 0212692 | 3/1987 |
| EP | 0364106 | 4/1990 |
| EP | 0507395 | 10/1992 |
| EP | 0821162 | 1/1998 |
| EP | 0 857 877 | 8/1998 |
| EP | 1 388 442 | 2/2004 |
| EP | 1405662 | 4/2004 |

| | | |
|---|---|---|
| EP | 1657452 | 5/2006 |
| EP | 1726350 | 11/2006 |
| EP | 1741899 | 1/2007 |
| EP | 1 780 058 | 5/2007 |
| EP | 1988294 | 11/2008 |
| EP | 2014896 | 1/2009 |
| EP | 2078857 | 7/2009 |
| FR | 2816993 | 5/2002 |
| FR | 2829805 | 3/2003 |
| GB | 722524 | 11/1951 |
| GB | 772703 | 4/1957 |
| GB | 1449076 | 9/1976 |
| GB | 1479940 | 7/1977 |
| GB | 2106992 | 4/1983 |
| GB | 2223810 | 4/1990 |
| GB | 2 300 673 | 11/1996 |
| GB | 2373546 | 9/2002 |
| GB | 2403356 | 12/2004 |
| JP | 57010778 | 1/1982 |
| JP | 57070970 | 5/1982 |
| JP | 57120058 | 7/1982 |
| JP | 58183880 | 10/1982 |
| JP | 58150079 | 9/1983 |
| JP | 58192976 | 11/1983 |
| JP | 60206985 | 10/1985 |
| JP | 62101900 | 5/1987 |
| JP | 63227973 | 9/1988 |
| JP | 2075674 | 3/1990 |
| JP | 2247469 | 10/1990 |
| JP | 3009090 | 1/1991 |
| JP | 3281984 | 12/1991 |
| JP | 4121424 | 4/1992 |
| JP | 6185450 | 7/1994 |
| JP | 8145488 | 6/1996 |
| JP | 9166079 | 6/1997 |
| JP | 2000-346093 | 6/1999 |
| JP | 11351125 | 12/1999 |
| JP | 2000166128 | 6/2000 |
| JP | 200346093 | 12/2000 |
| JP | 2002127902 | 5/2002 |
| JP | 2003083230 | 3/2003 |
| JP | 2005023918 | 1/2005 |
| JP | 2005036769 | 2/2005 |
| JP | 2005068963 | 3/2005 |
| JP | 2006220252 | 8/2006 |
| JP | 2007001872 | 1/2007 |
| JP | 2007145251 | 6/2007 |
| JP | 2007211730 | 8/2007 |
| JP | 2008038658 | 2/2008 |
| KR | 840000180 | 2/1984 |
| KR | 2004004637 | 1/2004 |
| RU | 2101562 | 1/1998 |
| RU | 2169857 | 6/2001 |
| RU | 2213255 | 9/2003 |
| UA | 69030 | 8/2004 |
| WO | WO-82/00319 | 2/1982 |
| WO | WO-88/02818 | 4/1988 |
| WO | WO-92/22741 | 12/1992 |
| WO | WO-93/06367 | 4/1993 |
| WO | WO-93/11363 | 6/1993 |
| WO | WO-93/24754 | 12/1993 |
| WO | WO-9412785 | 6/1994 |
| WO | WO-95/25381 | 9/1995 |
| WO | WO-96/01942 | 1/1996 |
| WO | WO-96/22456 | 7/1996 |
| WO | WO-96/34213 | 10/1996 |
| WO | WO-97/01029 | 1/1997 |
| WO | WO-97/17546 | 5/1997 |
| WO | WO-98/02818 | 1/1998 |
| WO | WO-98/17492 | 4/1998 |
| WO | WO-99/41498 | 8/1999 |
| WO | WO-00/01945 | 1/2000 |
| WO | WO-00/37800 | 6/2000 |
| WO | WO-00/65212 | 11/2000 |
| WO | WO-00/68578 | 11/2000 |
| WO | WO-0175290 | 10/2001 |
| WO | WO-02/25083 | 3/2002 |
| WO | WO-02/46621 | 6/2002 |
| WO | WO-02/103200 | 12/2002 |
| WO | WO-03/021702 | 3/2003 |
| WO | WO-03/078812 | 9/2003 |
| WO | WO-2004/034391 | 5/2004 |
| WO | WO-2004/059155 | 7/2004 |
| WO | WO-2004/072452 | 8/2004 |
| WO | WO-2004/074679 | 9/2004 |
| WO | WO-2004/109172 | 12/2004 |
| WO | WO-2005/044424 | 5/2005 |
| WO | WO-2005/062969 | 7/2005 |
| WO | WO-2005/067373 | 7/2005 |
| WO | WO-2005/079461 | 9/2005 |
| WO | WO-2005/088131 | 9/2005 |
| WO | WO-2005/095155 | 10/2005 |
| WO | WO-2006/029633 | 3/2006 |
| WO | WO-2006/058085 | 6/2006 |
| WO | WO-2006/124006 | 11/2006 |
| WO | WO-2007/002094 | 1/2007 |
| WO | WO-2007/003954 | 1/2007 |
| WO | WO-2007/012143 | 2/2007 |
| WO | WO-2007/035997 | 4/2007 |
| WO | WO-2007/051034 | 5/2007 |
| WO | WO-2007/066117 | 6/2007 |
| WO | WO-2007/086792 | 8/2007 |
| WO | WO-2007/089872 | 8/2007 |
| WO | WO-2007/096656 | 8/2007 |
| WO | WO-2007/111839 | 10/2007 |
| WO | WO-2007/136765 | 11/2007 |
| WO | WO-2008/003950 | 1/2008 |
| WO | WO-2008/014769 | 2/2008 |
| WO | WO-2008023901 | 2/2008 |
| WO | WO-2008/027259 | 3/2008 |
| WO | WO-2008/028881 | 3/2008 |
| WO | WO-2008/039725 | 4/2008 |
| WO | WO-2008/045468 | 4/2008 |
| WO | WO-2008045468 | 4/2008 |
| WO | WO-2008/051427 | 5/2008 |
| WO | WO-2008/074075 | 6/2008 |
| WO | WO-2008/084507 | 7/2008 |
| WO | WO-2008/091373 | 7/2008 |
| WO | WO-2008102292 | 8/2008 |
| WO | WO-2008/106967 | 9/2008 |
| WO | WO-2008/108870 | 9/2008 |
| WO | WO-2008/109006 | 9/2008 |
| WO | WO-2008/110018 | 9/2008 |
| WO | WO-2008/115479 | 9/2008 |
| WO | WO-2008/121378 | 10/2008 |
| WO | WO-2008139267 | 11/2008 |
| WO | WO-2008/152432 | 12/2008 |
| WO | WO-2008/153591 | 12/2008 |
| WO | WO-2008/157327 | 12/2008 |
| WO | WO-2009/034421 | 3/2009 |
| WO | WO-2009/034548 | 3/2009 |
| WO | WO-2009/038973 | 3/2009 |
| WO | WO-2009/044139 | 4/2009 |
| WO | WO-2009/045110 | 4/2009 |
| WO | WO-2009/114205 | 9/2009 |
| WO | WO-2009/126784 | 10/2009 |
| WO | WO-2010/006319 | 1/2010 |
| WO | WO-2010/009053 | 1/2010 |
| WO | WO-2010/135658 | 11/2010 |
| WO | WO-2011/008321 | 1/2011 |
| WO | WO-2011/008325 | 1/2011 |
| WO | WO-2011/008500 | 1/2011 |

OTHER PUBLICATIONS

Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

"Hydraulic Transformer Supplies Continuous High Pressure," Machine Design, Penton Media, vol. 64, No. 17, (Aug. 1992), 1 page.

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report May 2004, 14 pages.

* cited by examiner

SYSTEMS AND METHODS FOR COMBINED THERMAL AND COMPRESSED GAS ENERGY CONVERSION SYSTEMS

CROSS-REFERENCE TO RELATED APPLICATIONS

This application claims priority to U.S. Provisional Patent Application Ser. No. 61/145,860, filed on Jan. 20, 2009; U.S. Provisional Patent Application Ser. No. 61/145,864, filed on Jan. 20, 2009; U.S. Provisional Patent Application Ser. No. 61/146,432, filed on Jan. 22, 2009; U.S. Provisional Patent Application Ser. No. 61/148,481, filed on Jan. 30, 2009; U.S. Provisional Patent Application Ser. No. 61/151,332, filed on Feb. 10, 2009; U.S. Provisional Patent Application Ser. No. 61/227,222, filed on Jul. 21, 2009; U.S. Provisional Patent Application Ser. No. 61/256,576, filed on Oct. 30, 2009; U.S. Provisional Patent Application Ser. No. 61/264,317, filed on Nov. 25, 2009; and U.S. Provisional Patent Application Ser. No. 61/266,758, filed on Dec. 4, 2009; the disclosure of each of which is hereby incorporated herein by reference in its entirety.

STATEMENT REGARDING FEDERALLY SPONSORED RESEARCH

This invention was made with government support under IIP-0810590 and IIP-0923633, awarded by the NSF. The government has certain rights in the invention.

FIELD OF THE INVENTION

This invention relates to power generation, thermal energy recovery, and energy storage. More particularly, this invention relates to the combination of systems and processes that require heating and/or cooling, have excess heating and/or cooling capacity, and/or efficiently transfer thermal energy between locations with systems that store and recover electrical energy using compressed gas.

BACKGROUND OF THE INVENTION

As the world's demand for electric energy increases, the existing power grid is being taxed beyond its ability to serve this demand continuously. In certain parts of the United States, inability to meet peak demand has led to inadvertent brownouts and blackouts due to system overload as well as to deliberate "rolling blackouts" of non-essential customers to shunt the excess demand. For the most part, peak demand occurs during the daytime hours (and during certain seasons, such as summer) when business and industry employ large quantities of power for running equipment, heating, air conditioning, lighting, etc. During the nighttime hours, demand for electricity is often reduced significantly, and the existing power grid in most areas can usually handle this load without problem.

To address the possible insufficiency of power supply at peak demand, users are asked to conserve where possible. Also, power companies often employ rapidly deployable gas turbines to supplement production to meet peak demand. However, these units burn expensive fuels, such as natural gas, and have high generation costs when compared with coal-fired systems and other large-scale generators. Accordingly, supplemental sources have economic drawbacks and, in any case, can provide only a partial solution in a growing economy. The most obvious solution involves construction of new power plants, which is expensive and has environmental side effects. In addition, because most power plants operate most efficiently when generating a relatively continuous output, the difference between peak and off-peak demand often leads to wasteful practices during off-peak periods, such as over-lighting of outdoor areas, as power is sold at a lower rate off peak. Thus, it is desirable to address the fluctuation in power demand in a manner that does not require construction of new plants and can be implemented either at a power-generating facility to provide excess capacity during peak, or on a smaller scale on-site at the facility of an electric customer (allowing that customer to provide additional power to itself during peak demand, when the grid is heavily taxed).

Additionally, it is desirable for solutions that address fluctuations in power demand to also address environmental concerns and support the use of renewable energy sources. As demand for renewable energy increases, the intermittent nature of some renewable energy sources (e.g., wind and solar) places an increasing burden on the electric grid. The use of energy storage is a key factor in addressing the intermittent nature of the electricity produced by some renewable sources, and more generally in shifting the energy produced to the time of peak demand.

Storing energy in the form of compressed air has a long history. Most methods for converting potential energy in the form of compressed air to electrical energy utilize turbines to expand the gas, which is an inherently adiabatic process. As gas expands, it cools off if there is no input of heat (adiabatic gas expansion), as is the case with gas expansion in a turbine. The advantage of adiabatic gas expansion is that it can occur quickly, thus resulting in the release of a substantial quantity of energy in a short time.

However, if the gas expansion occurs slowly relative to the time which it takes for heat to flow into the gas, then the gas remains at a relatively constant temperature as it expands (isothermal gas expansion). Gas stored at ambient temperature that is expanded isothermally provides approximately three times the energy of ambient-temperature gas expanded adiabatically. Therefore, there is a significant energy advantage to expanding gas isothermally.

In the case of certain compressed-gas energy-storage systems according to prior implementations, gas is expanded from a high-pressure, high-capacity source, such as a large underground cavern, and directed through a multi-stage gas turbine. Because significant, rapid expansion occurs at each stage of the operation, the gas cools at each stage. To increase efficiency, the gas is mixed with fuel and the mix is ignited, pre-heating it to a higher temperature and thereby increasing power and final gas temperature. However, the need to burn fossil fuel (or apply another energy source, such as electric heating) to compensate for adiabatic expansion substantially defeats the purpose of an emission-free process for storing and recovering energy.

A more efficient and novel design for storing energy in the form of compressed gas utilizing isothermal gas expansion and compression is shown and described in U.S. patent application Ser. No. 12/421,057 (the '057 application), the disclosure of which is hereby incorporated herein by reference in its entirety. The '057 application discloses a system for expanding gas isothermally in staged hydraulic/pneumatic cylinders and intensifiers over a large pressure range in order to generate electrical energy when required. The power output of the system is governed by how fast the gas can expand isothermally. Therefore, the ability to expand/compress the gas isothermally at a faster rate will result in a greater power output of the system.

While it is technically possible to attach a heat-exchange subsystem directly to a hydraulic/pneumatic cylinder (an external jacket, for example), such an approach is not particularly effective given the thick walls of the cylinder. An internalized heat exchange subsystem could conceivably be mounted directly within the cylinder's pneumatic (gas-filled) side; however, size limitations would reduce such a heat exchanger's effectiveness and the task of sealing a cylinder with an added subsystem installed therein would be significant, making the use of a conventional, commercially available component difficult or impossible.

A novel compressed-gas-based energy storage system incorporating an external heat transfer circuit is disclosed in U.S. patent application Ser. No. 12/481,235 (the '235 application), the disclosure of which is hereby incorporated herein by reference in its entirety. The '235 application discloses a hydraulic/pneumatic converter component in a staged energy storage system that can store high-pressure gas at, for example, over 200 atmospheres (3000 psi) for use by the system. A pressure vessel or cylinder defining a gas chamber (pneumatic side) and a fluid chamber (hydraulic side) has a piston or other mechanism that separates the gas chamber and fluid chamber, preventing gas or fluid migration from one chamber to the other while allowing the transfer of force/pressure between the chambers. Both the gas chamber and the fluid chamber have primary ports that interface with the respective pneumatic and hydraulic components of the overall energy storage and recovery system. The gas chamber/pneumatic side of the cylinder has additional ports. The additional gas exit port is in fluid communication with an inlet to a circulation device (for example, a pneumatic pump or fan impeller), the exit of which is in fluid communication with the gas inlet of a heat exchanger. The gas exit port of the heat exchanger is in fluid connection with the additional gas chamber inlet port. The heat exchanger has corresponding fluid ports that support a flow of ambient-temperature fluid through the heat exchanger in a direction counter to the flow of gas in the heat exchanger. Thus, due to the heat exchange with the flowing fluid, the gas exiting the heat exchanger is returned to the gas chamber at ambient or near ambient temperature. (The term "ambient" is used to represent the temperature of the surrounding environment, or another desired temperature at which efficient performance of the system may be achieved.) The circulation of gas in the gas chamber through the heat exchange subsystem thereby maintains the gas in the gas chamber at ambient or near-ambient temperature. The entire gas circuit in the heat exchanger is sealed and capable of handling high pressures (e.g., 200 atmospheres) encountered within the pneumatic side of the cylinder. The fluid side of the heat exchanger communicates with an appropriate reservoir of ambient fluid.

However, the prior art does not disclose systems and methods for increasing efficiency and power density in isothermal compressed-gas-based energy storage systems having heat exchangers by heating or cooling the heat-transfer fluid.

SUMMARY OF THE INVENTION

The invention overcomes the disadvantages of the prior art by combining systems for thermal energy recovery, extraction, and/or usage with a system and method for compressed-gas energy storage to allow for cost-effective and efficient energy storage. In the invention, the heat-exchange subsystem of a novel compressed-gas energy conversion system, a staged hydraulic/pneumatic system as described in U.S. Provisional Patent Application No. 61/043,630 with heat transfer circuit as described in U.S. Provisional Patent Application No. 61/059,964—both applications of which are hereby incorporated by reference in their entireties—is combined with thermal systems to increase power density and efficiency by utilizing said thermal systems to chill or heat the transfer medium (e.g., water). In one application, excess thermal energy (e.g., waste heat) from power plants or industrial processes is used to preheat the heat-exchange fluid in the compressed-gas energy conversion system's heat-exchange subsystem. In such instances, the power density of the energy conversion system can be increased by coupling this excess thermal energy with the system while expanding stored gas. Similarly, chilled water that may be available from the natural local environment (e.g., a river) can be used to pre-cool the heat exchange fluid to decrease power requirements during compression. In the absence of such heating or cooling sources, both pre-heated and pre-chilled water can be efficiently generated through the use of heat pumps. Alternatively, hot and cold water generated during compression and expansion cycles, respectively, can be used as a heating or cooling source. Heated water (from the heat exchange subsystem during compression) can be used for process heat or building conditioning, and cooled water (from the heat exchange subsystem during expansion) can be used for cooling systems and/or building conditioning. In all instances, the combination of systems for thermal energy recovery, extraction, and/or usage with a compressed-gas energy conversion system improves performance and cost effectiveness.

In one application, excess thermal energy (e.g., waste heat) from power plants or industrial processes is used to preheat the heat exchange fluid and/or the compressed gas in the compressed-gas energy conversion system's heat-exchange subsystem. In such instances, the power density of the energy conversion system may be increased by coupling this excess thermal energy with the system during expansion of stored gas. Similarly, chilled water, such as may be available from the natural local environment (e.g., from a river), may be used to pre-cool the heat exchange fluid, the stored compressed gas prior to further compression, and/or the compressed gas during compression to decrease power requirements during compression. In the absence of such heating or cooling sources, heated and chilled water may be efficiently generated using ground loops, water loops, heat pumps, or other means. Alternatively, hot and cold water generated during compression and expansion cycles, respectively, may be used as a heating or cooling source. Heated water (from the heat exchange subsystem during compression) may be used for process heat or building conditioning, and cooled water (from the heat exchange subsystem during expansion) may be used for cooling systems and/or building conditioning. In all instances, the combination of systems for thermal energy recovery, extraction, and/or usage with a compressed-gas energy conversion system improves performance and cost effectiveness.

In one aspect, the invention relates to a combined thermal and compressed-gas energy conversion system. The system includes a compressed-gas energy conversion system, a source of recovered thermal energy, and a heat-exchange subsystem in fluid communication with the compressed-gas energy conversion system and the source of recovered thermal energy. The compressed gas energy conversion system is configured for substantially isothermal storage and recovery of energy. Examples of compressed-gas energy conversion systems are described in U.S. patent application Ser. No. 12/639,703 (the '703 application), the disclosure of which is hereby incorporated herein by reference in its entirety. The term "isothermal," as used herein, denotes any non-adiabatic expansion or compression process that confers increased efficiency or other energetic benefit through the deliberate transfer of heat to or from the quantity of gas subject to the expansion or compression process. The term "recovered thermal energy," as used herein denotes the transfer or recycling of thermal energy between at least two sources. The source of recovered thermal energy can include at least one of a fossil fuel power plant, a heat engine power plant, a solar thermal source, a geothermal source, an industrial process with waste heat, a heat pump, a heat source, a heat sink, or a source of environmentally chilled water.

In various embodiments of the foregoing aspect, the heat-exchange subsystem utilizes the recovered thermal energy to heat the compressed gas prior to and/or during expansion thereof. Additionally, the heat-exchange subsystem can use the recovered thermal energy to cool the compressed gas during and/or after compression thereof. In this scenario, the source of recovered thermal energy is being used as a heat sink for accepting the thermal energy transferred from the gas under compression. Generally, the source of thermal energy can be a source of fluid at a non-ambient temperature (either warmer or cooler), where the heat-exchange subsystem utilizes the temperature differential offered by the fluid source either to recover thermal energy by heating gas during expansion or to dispose of thermal energy by cooling gas during compression, as described above.

The source of recovered thermal energy can also include thermal well, where the thermal well can be used as a means of storing recovered energy from, for example, the compressed-gas energy conversion system. This stored thermal energy can be used, for example, to provide heating or other building conditioning. Additionally, thermal energy from another source can be used to preheat the thermal well prior to an expansion stage of the compressed-gas energy conversion system.

The heat exchange subsystem can include a circulation apparatus in fluid communication with the energy conversion system for circulating a fluid through the heat-exchange subsystem and a heat exchanger. The heat exchanger can include a first side in fluid communication with the circulation apparatus and the energy conversion system, where the circulation apparatus circulates the fluid from the energy conversion system, through the heat exchanger, and back to the energy conversion system, and a second side circulating a heat-exchange fluid through the source of recovered thermal energy. In one embodiment, the heat-exchange fluid transfers at least a portion of the recovered thermal energy for use as at least one of process heat, cooling, or building conditioning.

In one embodiment, the compressed-gas energy conversion system includes a cylinder assembly including a staged pneumatic side and a hydraulic side. The sides are separated by a mechanical boundary mechanism that transfers energy therebetween. In this embodiment, the heat exchange subsystem is in fluid communication with the pneumatic side of the cylinder assembly and the circulation apparatus circulates the fluid from the pneumatic side of the cylinder assembly, through the heat exchanger, and back to the pneumatic side of the cylinder assembly. The fluid can include a gas being compressed or expanded in the pneumatic side of the cylinder assembly. The heat exchange subsystem can include a spray mechanism disposed in the pneumatic side of the cylinder assembly and the fluid is a heat-exchange fluid introduced into the cylinder assembly through the spray mechanism. The spray mechanism can include at least one of a spray head disposed at an end of the cylinder assembly or a spray rod running through at least a portion of the cylinder assembly.

In additional embodiments, the cylinder assembly can be at least one of an accumulator or an intensifier. Additionally, the cylinders assembly can be at least one pneumatic cylinder mechanically coupled to at least one hydraulic cylinder. In one embodiment, the compressed-gas energy conversion system can include a second cylinder assembly including a staged pneumatic side and a hydraulic side separated by a boundary mechanism that transfers mechanical energy therebetween in fluid communication with the cylinder assembly. In a particular example of the foregoing embodiment, the first cylinder assembly is an accumulator that transfers the mechanical energy at a first pressure ratio and the second cylinder assembly is an intensifier that transfers the mechanical energy at a second pressure ratio greater than the first pressure ratio.

The compressed-gas energy conversion system can also include one or more pressure vessels for storage of the compressed gas, where a heat-exchange subsystem is in fluid communication with the pressure vessel. In one embodiment, a circulation apparatus of the heat exchange subsystem circulates the fluid from the pressure vessel, through a heat exchanger, and back to the pressure vessel(s). The fluid can include a gas being stored in the pressure vessel. The pressure vessel can also include a spray mechanism for introducing a heat-exchange fluid into the pressure vessel. In one embodiment, the existing heat exchange subsystem is in fluid communication with the pressure vessel(s) via appropriate valves and piping. Furthermore, the heat exchange subsystem can include an additional heat exchanger and/or circulation apparatus configured for use with the pressure vessel(s), as necessary. Alternatively, a second, dedicated heat exchange subsystem can be used with the pressure vessel(s).

In another aspect, the invention relates to a system for substantially isothermal expansion and compression of a gas. The system includes a source of recovered thermal energy, a cylinder assembly and a heat-exchange subsystem. The cylinder assembly can include a staged pneumatic side and a hydraulic side, where the sides are separated by a mechanical boundary mechanism that transfers energy therebetween. The heat exchange subsystem is in fluid communication with the pneumatic side of the cylinder assembly and the source of recovered thermal energy.

In yet another aspect, the invention relates to a method of substantially isothermal compressed-gas energy storage utilizing a source of recovered energy. The method includes the steps of at least one of substantially isothermally expanding or compressing a gas in a compressed-gas energy conversion system and utilizing thermal energy from a source of recovered thermal energy to at least one of cool the gas during or after compression or heat the gas prior to or during expansion.

These and other objects, along with the advantages and features of the present invention herein disclosed, will become apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. In addition, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
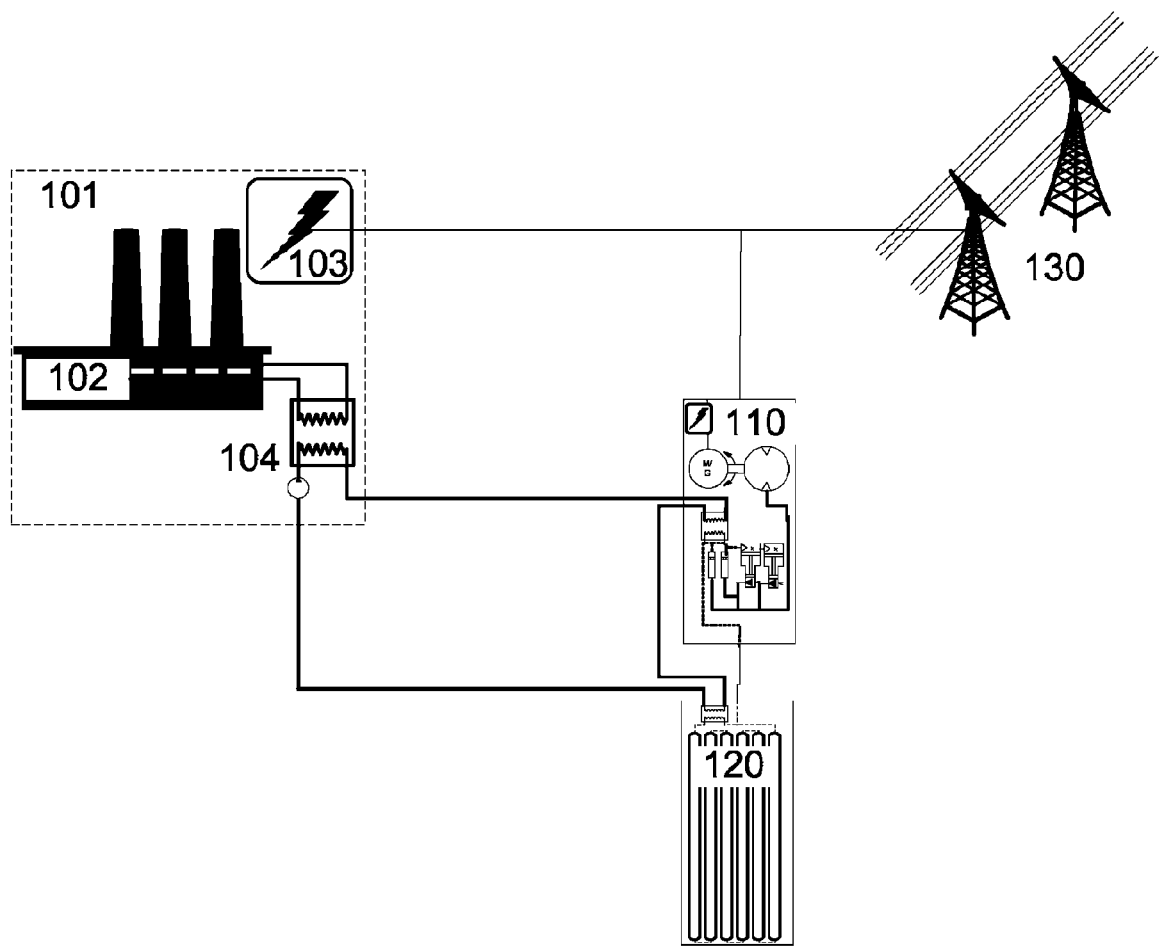
FIGS. 1 and 2 are schematic diagrams of combined thermal and compressed-gas energy conversion systems in accordance with various embodiments of the invention.

In the following, various embodiments of the present invention are generally described with reference to a single hydraulic cylinder (for example, an accumulator or an intensifier) and simplified valve arrangements. It is, however, to be understood that embodiments of the present invention may include any number and combination of accumulators, intensifiers, and valve arrangements. In addition, any dimensional values given are exemplary only, as the systems according to the invention are scalable and customizable to suit a particular application. Furthermore, the terms pneumatic, gas, and air are used interchangeably and the terms hydraulic and fluid are also used interchangeably.

The temperature of the compressed air stored in the system can be related to its pressure and volume through the ideal gas law and thus to the power output of the system during expansion. Therefore, pre-heating (before or during expansion) or pre-cooling (during compression) of the compressed gas and/or heat-exchange medium (e.g., water) in the heat-transfer circuit described in the '235 application may be used to increase power output (or decrease power input) of the compressed-air energy conversion system, improving overall effective efficiency (potentially exceeding 100% efficiency for electric input to electric output). Potential sources of pre-heating of the stored or expanding compressed gas and/or heat exchange medium include waste heat from installations such as power plants and industrial processes and heat obtained from heat pumps, ground loops, solar thermal devices, and geothermal heating. Potential sources of pre-cooling for the heat-exchange medium include heat pumps, ground loops, and cold water from the local environment.

In lieu of pre-heating or pre-cooling, the heat exchange medium (e.g., water) in the heat transfer circuit described in the '235 application becomes cooler (provides thermal energy to the compressed air) during expansion and hotter (removes thermal energy from the compressed air) during compression. This movement of thermal energy may be used in combined heating or cooling applications such as space conditioning.

Combining thermal systems with compressed-gas energy storage may improve efficiency, cost-effectiveness, and performance. In some instances, compressed-gas energy conversion systems will be located at power generation sites (e.g., coal, nuclear, solar thermal) that use heat engines producing substantial excess thermal energy. In others, the system may be located at industrial sites with substantial waste process heat or otherwise freely available excess thermal energy. In all these instances, the power density of the system may be increased by preheating the stored compressed gas and/or coupling excess thermal energy with the gas during expansion. In other instances, cooled water from this system may be used for cooling systems and/or building conditioning. Conversely, local cooling sources such as ground loops or cold water from the local environment may be used to promote cooling during compression by cooling the stored compressed gas or the gas being compressed, thus increasing the efficiency of the process. Moreover, during compression, excess thermal energy is generated by the compressed-air energy conversion system. If extracted by an appropriate thermal system, this excess thermal energy may be used for process heat or building conditioning. Cooling from environmental sources may be combined with harvesting of excess storage-system heat by using the later for preheating of cold-water inputs to the installation being served. In all of these instances, performance and/or value of the storage system may be markedly improved.

FIG. 1 is a diagram of an illustrative embodiment of the major components of the systems and methods for heating and cooling of compressed gas for energy conversion systems. The system consists of an installation 101 where thermal energy is available for recovery, extracted from the surroundings, or needed for usage, or may be removed for cooling. Example installations 101 include fossil-fuel based power plants (e.g., coal, natural gas); other heat-engine-based power plants such as nuclear, solar thermal, and geothermal; industrial processes with waste heat; heat pumps, heat sources, and heat sinks; buildings needing space heating or cooling; and sources of environmentally chilled water. In FIG. 1, for illustrative purposes, a power plant 102 is shown whose excess thermal energy is recoverable through a standard heat-exchange unit 104. Generated power 103 from the power plant 102 is used to drive the compressed-gas energy conversion system 110 as determined by the operator (e.g., when market demand for power is low), storing energy in the form of compressed gas in pressure vessels 120, caverns, or other means of high-pressure gas storage. Upon demand for increased power, this stored energy in the form of compressed gas in pressure vessels 120 undergoes staged hydraulic expansion in the compressed-gas energy conversion system 110 to generate power for usage (e.g., power grid delivery 130).

In various embodiments, the recovered thermal energy from the power plant 102 is used in the heat-exchange subsystem of the compressed-gas energy conversion system 110 to preheat the heat exchange fluid during expansion, increasing the work done by a given volume of pressurized gas, thus improving system efficiency and/or performance. Likewise, cooled water from heat exchange with cold environments or other low-temperature reservoirs may be used in the heat-exchange subsystem of the compressed-gas energy conversion system 110 to improve efficiency and/or performance during compression. In lieu of using pre-chilled heat exchange fluid, excess thermal energy generated during air compression may be used for process heat or building conditioning. Similarly, in lieu of using pre-heated heat exchange fluid, during expansion the cooled exchange fluid may be used to cool the surroundings, e.g., for building conditioning.

In other embodiments, the recovered thermal energy from the power plant 102 is used in the heat-exchange subsystem of the compressed-gas pressure vessels 120 (or other pressurized storage) to preheat the stored compressed gas and to heat the heat-exchange fluid and gas during expansion, increasing the work done by a given volume of pressurized gas and so improving system efficiency and/or performance. Likewise, water cooled by heat exchange with cold environments, ground loops, or water loops, or other low-temperature reservoirs may be used in the heat-exchange subsystem to pre-cool and continually cool the compressed gas prior to and during further compression, improving system efficiency and/or performance. In all of these instances, performance and/or value of the system may be markedly improved.

Figure 2:
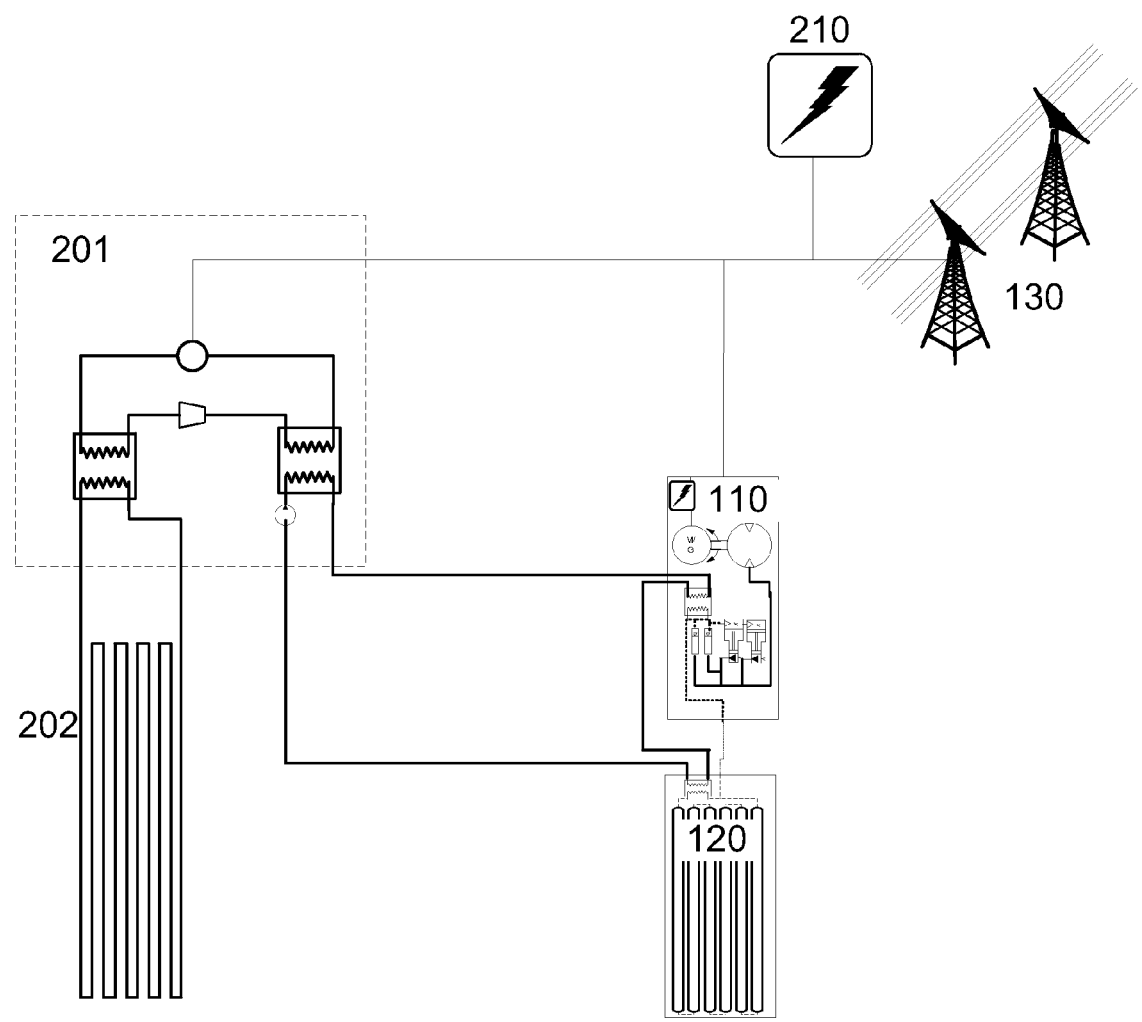

FIG. 2 illustrates an application where a ground loop (in this case with heat pump) is combined with the compressed-gas energy conversion system to improve round-trip energy storage efficiency. In FIG. 2, the major components of systems and methods for heating and cooling of compressed gas for energy conversion systems are shown operating in combination with a ground-source heat pump. In this application, generated energy 210 is used to drive the compressed-gas energy conversion system 110 as determined by the operator (e.g., when market costs or power demand are low), storing energy in the form of compressed gas in pressure vessels 120, caverns, or other means of high-pressure gas storage. Upon demand for increased power, this stored energy in the form of compressed gas in pressure vessels 120 undergoes staged pneumatic expansion through the compressed-gas energy conversion system 110 to generate power for usage (e.g., power grid delivery 130). A heat pump 201 (or simply a circulation system, for a ground-loop-only system) is mated with the heat-exchange subsystem of pressure vessels 120 and/or the compressed-gas energy conversion system 110. Prior to and/or during gas compression, electric power is used to run the heat pump (or simple circulator), which rejects thermal energy into the ground loop 202 and so cools the heat-exchange fluid and gas undergoing compression, thus reducing power requirements for compression. Likewise, prior to and/or during compressed gas expansion, electric power is used to run the heat pump (or circulator), which now extracts thermal energy (from the ground loop 202, for a ground-source heat pump) and heats the heat-exchange fluid and compressed gas, thus increasing power output during gas expansion. It should be noted that a ground-source heat pump, as of 2008, typically extracts three to five times more thermal energy than the electrical energy required to run the heat pump. Air-source and water-source heat pumps may also be used with somewhat lower installation costs and different, often lower, efficiencies (e.g., 1.5 to 3 times more thermal energy extracted than electrical energy used for a typical air-source heat pump). By combining a heat pump with the high-efficiency compressed-air energy conversion system, as illustrated in FIG. 2, to extract thermal energy from (or dump thermal energy into) the environment, albeit with the added system cost of the heat pump, the overall efficiency (electric input to electric output) of the compressed-gas storage system may be increased and potentially exceed 100%. Alternatively, in lieu of a heat pump, the heat-exchange fluid from the compressed-gas energy conversion system 110 and pressure vessels 120 may be circulated directly through a ground or water loop.

Figure 3:
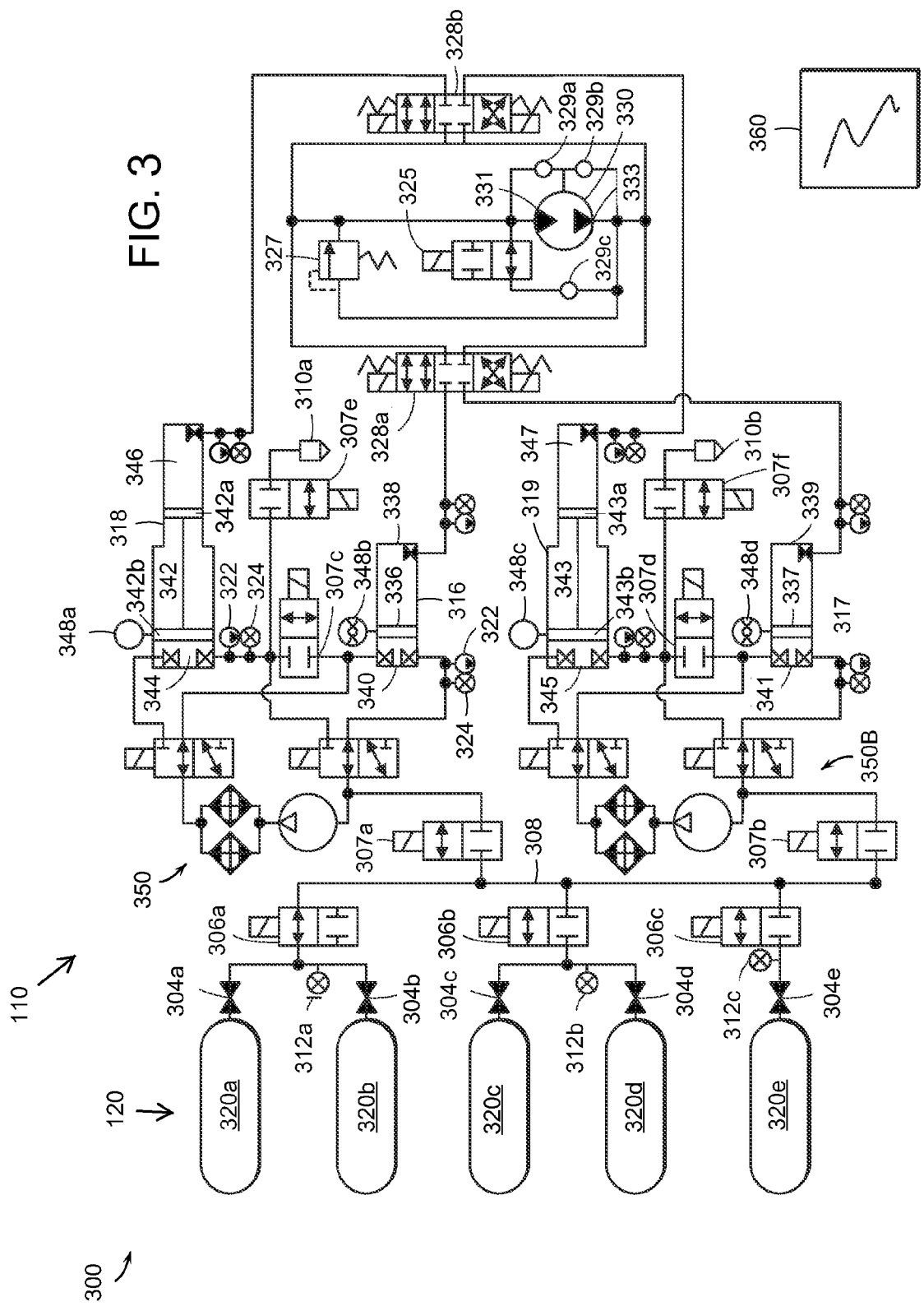
FIG. 3 is a schematic diagram of an open-air hydraulic-pneumatic energy storage and recovery system in accordance with various embodiments of the invention.

FIG. 3 depicts generally a staged hydraulic-pneumatic energy conversion system that stores and recovers electrical energy using thermally conditioned compressed fluids and is featured in various embodiments of the invention. Various types of staged hydraulic-pneumatic energy conversion systems that store and recover electrical energy using compressed fluids are described in the '057 application. The inventive concepts described herein may be used with any of those staged hydraulic-pneumatic energy conversion systems, which are generally portions of the compressed-gas energy conversion system 110 described above.

As shown in FIG. 3, the system 300 generally includes compressed-gas energy conversion system 110 and pressure vessels 120. Specifically, as shown, system 300 includes five high-pressure gas/air storage tanks 302-302e. Tanks 302a and 302b and tanks 302c and 302d are joined in parallel via manual valves 304a, 304b and 304c, 304d, respectively. Tank 302e also includes a manual shut-off valve 304e. The tanks 302 are joined to a main air line 308 via pneumatic two-way (i.e., shut-off) valves 306a, 306b, 306c. The tank output lines include pressure sensors 312a, 312b, 312c. The lines/tanks 302 may also include temperature sensors. The various sensors may be monitored by a system controller 360 via appropriate connections, as described in the '057 application. The main air line 308 is coupled to a pair of multi-stage (two stages in this example) accumulator circuits via automatically controlled pneumatic shut-off valves 307a, 307b. These valves 307a, 307b are coupled to respective accumulators 316 and 317. The air chambers 340, 341 of the accumulators 316, 317 are connected via automatically controlled pneumatic shut-offs 307c, 307d to the air chambers 344, 345 of the intensifiers 318, 319. Pneumatic shut-off valves 307e, 307f are also coupled to the air line connecting the respective accumulator and intensifier air chambers to respective atmospheric air vents 310a, 310b. This arrangement allows for air from the various tanks 302 to be selectively directed to either accumulator air chamber 344, 345. In addition, the various air lines and air chambers may include pressure and temperature sensors 322, 324 that deliver sensor telemetry to the controller 360.

Figure 3A:
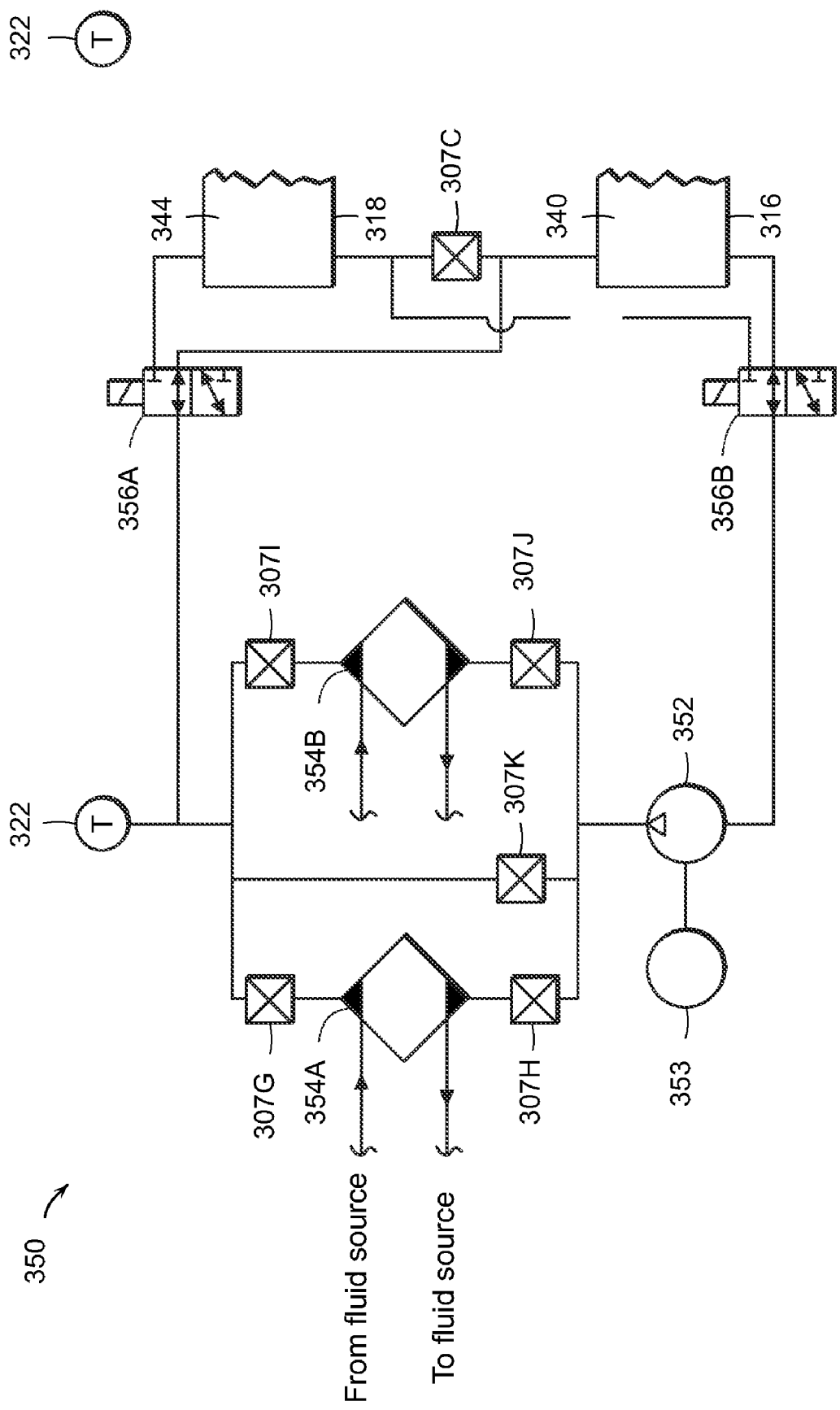
FIG. 3A is an enlarged schematic diagram of a portion of the system of FIG. 3.

The system 300 also includes two heat-exchange subsystems 350 in fluid communication with the air chambers 340, 341, 344, 345 of the accumulators and intensifiers 316-319 and the high pressure storage tanks 302: these heat-transfer subsystems provide the improved isothermal expansion and compression of the gas. A simplified schematic of one of the heat exchange subsystems 350 is shown in greater detail in FIG. 3A. Each heat-transfer subsystem 350 includes a circulation apparatus 352, at least one heat exchanger 354, and pneumatic valves 356. One circulation apparatus 352, two heat exchangers 354 and two pneumatic valves 356 are shown in FIGS. 3 and 3A, however, the number and type of circulation apparatus 352, heat exchangers 354, and valves 356 may vary to suit a particular application. The various components and the operation of the heat exchange subsystem 350 are described in greater detail hereinbelow. Generally, in one embodiment, the circulation apparatus 352 is a positive displacement pump capable of operating up to the high-pressure limit of the system (e.g., 3000 psi) or more and the two heat exchanger 354 are tube-in-shell type (also known as a shell-and-tube type). The heat exchangers 354 also capable of operating up to high pressure (e.g., 3000 psi). The heat exchangers 354 are shown connected in parallel but may also be connected in series. The heat exchangers 354 may have the same or different heat-exchange areas. For example, where the heat exchangers 354 are connected in parallel and the first heat exchanger 354A has a heat transfer area of X and the second heat exchanger 354B has a heat transfer area of 2X, a control valve arrangement may be used to selectively direct the gas flow to one or both of the heat exchangers 354 to obtain different heat-transfer areas (e.g., X, 2X, or 3X) and thus different thermal efficiencies.

The basic operation of the system 350 is described with respect to FIG. 3A. As shown, the system 350 includes the circulation apparatus 352, which may be driven by, for example, an electric motor 353 mechanically coupled thereto. Other types of and means for driving the circulation apparatus are contemplated and within the scope of the invention. For example, the circulation apparatus 352 may be a combination of accumulators, check valves, and an actuator. The circulation apparatus 352 is in fluid communication with each of the air chambers 340, 344 via a three-way, two-position pneumatic valve 356B and draws gas from either air chamber 340, 344 depending on the position of the valve 356B. The circulation apparatus 352 circulates the gas from the air chamber 340, 344 to the heat exchanger 354.

As shown in FIG. 3A, the two heat exchangers 354 are connected in parallel with a series of pneumatic shut-off valves 307G-307J, that may regulate the flow of gas to heat exchanger 354A, heat exchanger 354B, or both. Also included is a bypass pneumatic shut-off valve 307K that may be used to bypass the heat exchangers 354 (i.e., the heat-transfer subsystem 350 may be operated without circulating gas through either heat exchanger). In use, the gas flows through a first side of the heat exchanger 354 while a constant temperature fluid source flows through a second side of the heat exchanger 354. The fluid source is controlled to maintain the gas at ambient temperature. For example, as the temperature of the gas increases during compression, the gas may be directed through the heat exchanger 354, while the fluid source (at ambient or colder temperature) counter-flows through the heat exchanger 354 to remove heat from the gas. The gas outlet of the heat exchanger 354 is in fluid communication with each of the air chambers 340, 344 via a three-way, two-position pneumatic valve 356A that returns the thermally conditioned gas to either air chamber 340, 344, depending on the position of the valve 356A. The pneumatic valves 356 are used to control from which hydraulic cylinder the gas is being thermally conditioned. As previously discussed, the output of the fluid counter-flow can be used to, for example, provide building conditioning.

The selection of the various components will depend on the particular application with respect to, for example, fluid flows, heat transfer requirements, and location. In addition, the pneumatic valves may be electrically, hydraulically, pneumatically, or manually operated. In addition, the heat exchange subsystem 350 may include at least one temperature sensor 322 that, in conjunction with the controller 360 (FIG. 3), controls the operation of the various valves 307, 356 and, thus the operation of the heat-transfer subsystem 350.

In one exemplary embodiment, the heat exchange subsystem is used with a staged hydraulic-pneumatic energy conversion system as shown and described in the '057 application, where the two heat exchangers are connected in series. The operation of the heat-transfer subsystem is described with respect to the operation of a 1.5 gallon capacity piston accumulator having a 4-inch bore. In one example, the system is capable of producing 1-1.5 kW of power during a 10 second expansion of the gas from 2900 psi to 350 psi. Two tube-in-shell heat exchange units one with a heat exchange area of 0.11 m$^2$ and the other with a heat exchange area of 0.22 m$^2$, are in fluid communication with the air chamber of the accumulator. Except for the arrangement of the heat exchangers, the system is similar to that shown in FIG. 3A, and shut-off valves may be used to control the heat exchange counter flow, thus providing for no heat exchange, heat exchange with a single heat exchanger (i.e., with a heat exchange area of 0.11 m$^2$ or 0.22 m$^2$), or heat exchange with both heat exchangers (i.e., with a heat exchange area of 0.33 m$^2$.)

During operation of the systems 300, 350, high-pressure air is drawn from the accumulator 316 and/or 317 and circulated through the heat exchangers 354 by the circulation apparatus 352. Specifically, once the accumulator(s) 316, 317 is filled with hydraulic fluid and the piston is at the top of the cylinder, the gas circulation/heat exchanger sub-circuit and remaining volume on the air side of the accumulator is filled with high-pressure (e.g., 3000 psi) air. The shut-off valves 307G-307J are used to select which, if any, heat exchanger to use. Once this is complete, the circulation apparatus 352 is turned on as is the heat exchanger counter-flow.

During gas expansion in the accumulator 316 the three-way valves 356 are actuated as shown in FIG. 3A and the gas expands. Pressure and temperature transducers/sensors on the gas side of the accumulator 316 are monitored during the expansion, as well as temperature transducers/sensors located on the heat exchange subsystem 350. The thermodynamic efficiency of the gas expansion may be determined when the total fluid power energy output is compared to the theoretical energy output that could have been obtained by perfectly isothermal expansion of the known volume of gas.

Figure 4:
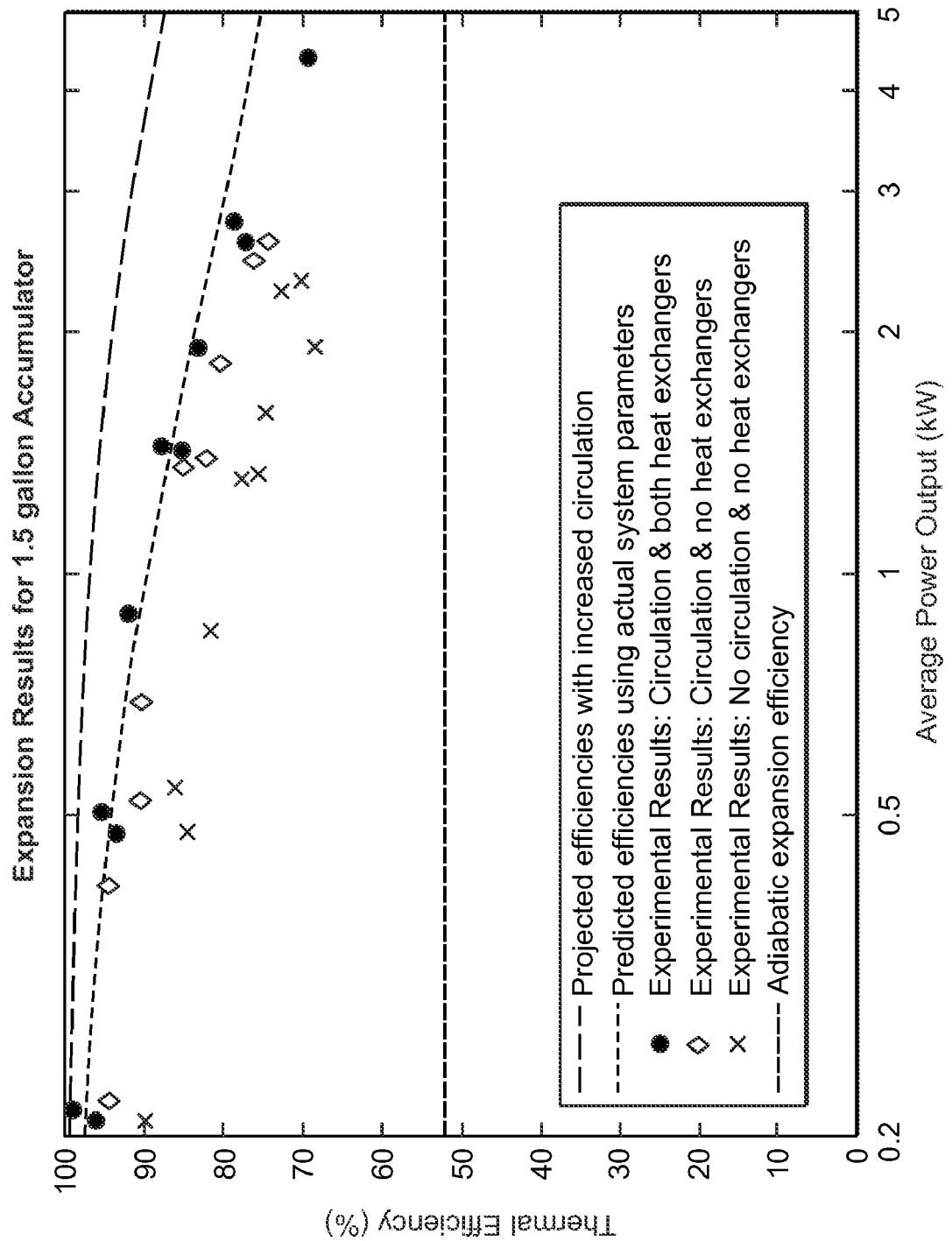
FIG. 4 is a graphical representation of the thermal efficiencies obtained at different operating parameters.

The overall work output and thermal efficiency may be controlled by adjusting the hydraulic fluid flow rate and the heat exchanger area. FIG. 4 depicts the relationship between power output, thermal efficiency, and heat-exchanger surface area for this exemplary embodiment of the systems 300, 350. As shown in FIG. 4, there is a trade-off between power output and efficiency. By increasing heat-exchange area (e.g., by adding heat exchangers to the heat exchange subsystem 350), greater thermal efficiency is achieved over the power output range. For this exemplary embodiment, thermal efficiencies above 90% may be achieved when using both heat exchangers 354 for average power outputs of approximately 1.0 kW. Increasing the gas circulation rate through the heat exchangers will also provide additional efficiencies. Based on the foregoing, the selection and sizing of the components may be accomplished to optimize system design by balancing cost and size with power output and efficiency.

Referring back to FIG. 3 for the remaining description of the basic staged hydraulic-pneumatic energy conversion system, the air chamber 340, 341 of each accumulator 316, 317 is enclosed by a movable piston 336, 337 having an appropriate sealing system using sealing rings and other components that are known to those of ordinary skill in the art. The piston 336, 337 moves along the accumulator housing in response to pressure differentials between the air chamber 340, 341 and an opposing fluid chamber 338, 339, respectively, on the opposite side of the accumulator housing. Likewise, the air chambers 344, 345 of the respective intensifiers 318, 319 are also enclosed by a moving piston assembly 342, 343. However, the piston assembly 342, 343 includes an air piston 342a, 343a connected by a shaft, rod, or other coupling to a respective fluid piston 342b, 343b that moves in conjunction. The differences between the piston diameters allows a lower air pressure acting upon the air piston to generate a pressure on the associated fluid chamber similar to the higher air pressure acting on the accumulator piston. In this manner, and as previously described, the system allows for at least two stages of pressure to be employed to generate similar levels of fluid pressure.

The accumulator fluid chambers 338, 339 are interconnected to a hydraulic motor/pump arrangement 330 via a hydraulic valve 328a. The hydraulic motor/pump arrangement 330 includes a first port 331 and a second port 333. The arrangement 330 also includes several optional valves, including a normally open shut-off valve 325, a pressure relief valve 327, and three check valves 329 that may further control the operation of the motor/pump arrangement 330. For example, check valves 329a, 329b, direct fluid flow from the motor/pump's leak port to the port 331, 333 at a lower pressure. In addition, valves 325, 329c prevent the motor/pump from coming to a hard stop during an expansion cycle.

The hydraulic valve 328a is shown as a three-position, four-way directional valve that is electrically actuated and spring returned to a center closed position, where no flow through the valve 328a is possible in the unactuated state. The directional valve 328a controls the fluid flow from the accumulator fluid chambers 338, 339 to either the first port 331 or the second port 333 of the motor/pump arrangement 330. This arrangement allows fluid from either accumulator fluid chamber 338, 339 to drive the motor/pump 330 clockwise or counter-clockwise via a single valve.

The intensifier fluid chambers 346, 347 are also interconnected to the hydraulic motor/pump arrangement 330 via a hydraulic valve 328b. The hydraulic valve 328b is also a three-position, four-way directional valve that is electrically actuated and spring returned to a center closed position, where no flow through the valve 328b is possible in the unactuated state. The directional valve 328b controls the fluid flow from the intensifier fluid chambers 346, 347 to either the first port 331 or the second port 333 of the motor/pump arrangement 330. This arrangement allows fluid from either intensifier fluid chamber 346, 347 to drive the motor/pump 330 clockwise or counter-clockwise via a single valve.

The motor/pump 330 may be coupled to an electrical generator/motor and that drives and is driven by the motor/pump 330. As discussed with respect to the previously described embodiments, the generator/motor assembly may be interconnected with a power distribution system and may be monitored for status and output/input level by the controller 360.

In addition, the fluid lines and fluid chambers may include pressure, temperature, or flow sensors and/or indicators 322, 324 that deliver sensor telemetry to the controller 360 and/or provide visual indication of an operational state. In addition, the pistons 336, 337, 342, 343 may include position sensors 348 that report their present position to the controller 360. The position of the piston may be used to determine relative pressure and flow of both gas and fluid.

Figure 5:
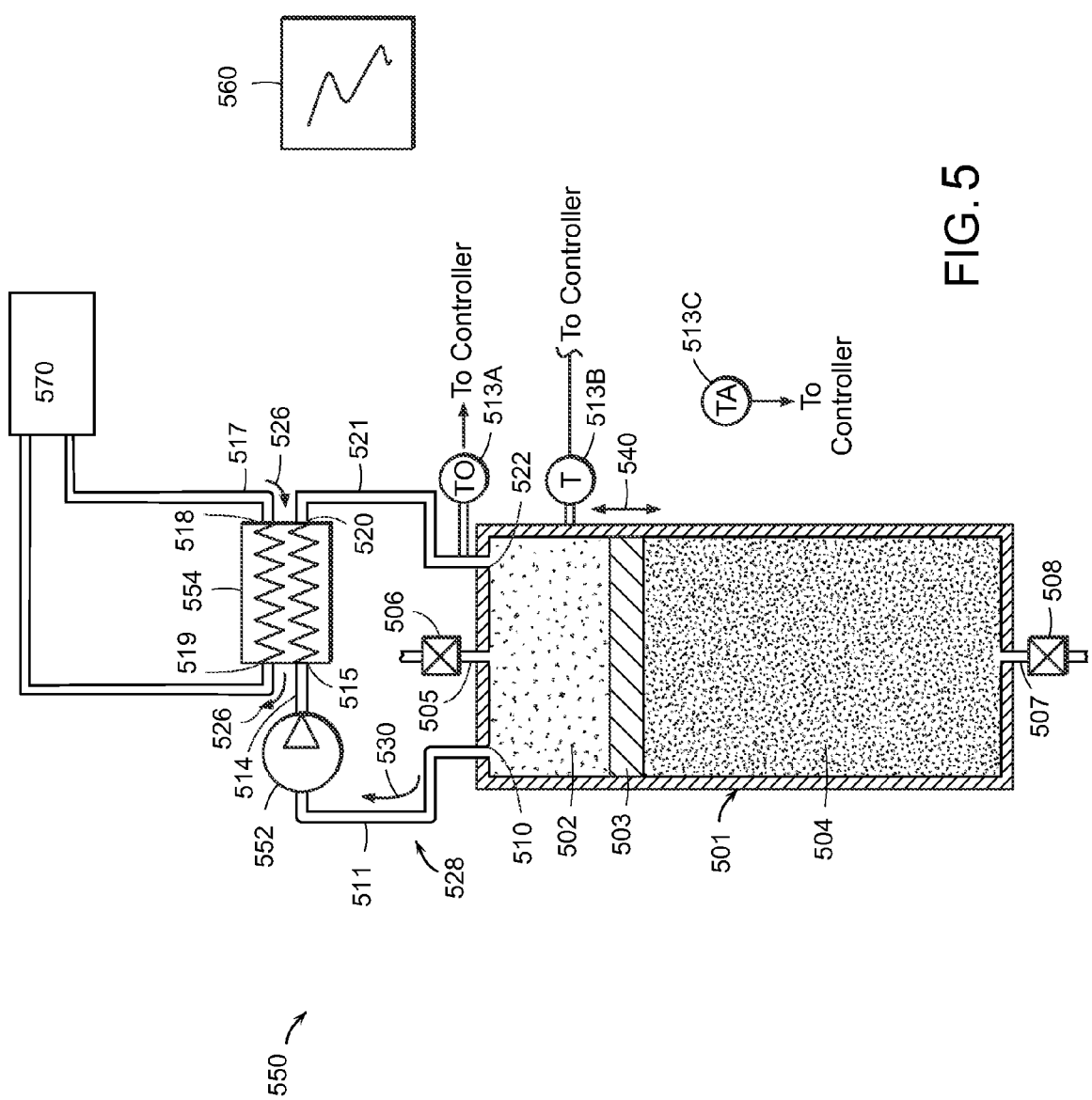
FIG. 5 is a schematic partial cross section of a hydraulic/pneumatic cylinder assembly including a heat-exchange subsystem that facilitates isothermal expansion within the pneumatic side of the cylinder, as well as a heat exchange subsystem facilitating heating and/or cooling the surroundings in accordance with various embodiments of the invention.

FIG. 5 is an illustrative embodiment of an isothermal-expansion hydraulic/pneumatic system 550 in accordance with one embodiment of the invention. The system includes of a cylinder 501 containing a gas chamber or "pneumatic side" 502 and a fluid chamber or "hydraulic side" 504 separated by a movable (double arrow 540) piston 503 or other force/pressure-transmitting barrier that isolates the gas from the fluid. The cylinder 501 may be a conventional, commercially available component, modified to receive additional ports as described below. Embodiments of the invention may include one or more intensifiers in addition to or instead of the cylinder 501, as described in the '235 application. Any of the embodiments described herein may be implemented as a cylinder or intensifier in the hydraulic and pneumatic circuits of energy storage and recovery systems, such as those described in the '057 application. The cylinder 501 includes a primary gas port 505, which may be closed via valve 506 and that connects with a pneumatic circuit, or any other pneumatic source/storage system. The cylinder 501 further includes a primary fluid port 507 that may be closed by valve 508. This fluid port connects with a source of fluid in the hydraulic circuit of the above-described storage system, or any other fluid reservoir.

The cylinder 501 has one or more gas circulation outlet ports 510 that are connected via piping 511 to the gas circulator 552. Note that, as used herein, the terms "pipe," "piping" and the like shall refer to one or more conduits that are rated to carry gas or liquid between two points. Thus, the singular term should be taken to include a plurality of parallel conduits where appropriate. The gas circulator 552 may be a conventional or customized low-head pneumatic pump, fan, or any other device for circulating a gas. The gas circulator 552 should be sealed and rated for operation at the pressures contemplated within the gas chamber 502. Thus, the gas circulator 552 creates a predetermined flow (arrow 530) of gas up the piping 511 and therethrough. The gas circulator 552 may be powered by electricity from a power source or by another drive mechanism, such as a fluid motor. The mass-flow speed and on/off functions of the circulator 552 may be controlled by a controller 560 acting on the power source for the circulator 552. The controller 560 may be a software and/or hardware-based system that carries out the heat-exchange procedures described herein. The outlet of the gas circulator 552 is connected via a pipe 514 to the gas inlet 515 of a heat exchanger 554.

The heat exchanger 554 of the illustrative embodiment may be any acceptable design that allows energy to be efficiently transferred between a high-pressure gas flow contained within a pressure conduit and another mass flow (fluid) . The rate of heat exchange is based in part on the relative flow rates of the gas and fluid, the exchange-surface area between the gas and fluid, and the thermal conductivity of the interface therebetween. In particular, the gas flow is heated or cooled, depending on the stage of operation of the energy conversion system, in the heat exchanger 554 by the fluid counter-flow passing through piping 517 (arrows 526), which enters the fluid inlet 518 of heat exchanger 554 at ambient temperature and exits the heat exchanger 554 at the fluid exit 519 equal or approximately equal in temperature to the gas in piping 514. The gas flow at gas exit 520 of heat exchanger 554 is at ambient or approximately ambient temperature, and returns via piping 521 through one or more gas circulation inlet ports 522 to gas chamber 502. (By "ambient" is meant the temperature of the surrounding environment or any other temperature at which efficient performance of the system can be achieved.) The ambient-temperature gas reentering the cylinder's gas chamber 502 at the circulation inlet ports 522 mixes with the gas in the gas chamber 502, thereby bringing the temperature of the fluid in the gas chamber 502 closer to ambient temperature.

The controller 560 manages the rate of heat exchange based, for example, on the prevailing temperature (T) of the gas within the gas chamber 502 as determined using a temperature sensor 513B of conventional design that thermally communicates with the gas within the chamber 502. The sensor 513B may be placed at any location along the cylinder including a location that is at, or adjacent to, the heat exchanger gas inlet port 510. The controller 560 reads the value T from the cylinder sensor and compares it to an ambient temperature value (TA) derived from a sensor 513C located somewhere within the system environment. When T is greater than TA, the heat exchange subsystem 550 is directed to move gas (by powering the circulator 552) therethrough at a rate that may be partly dependent upon the temperature differential (so that the exchange does not overshoot or undershoot the desired rate of heat exchange. Additional sensors may be located at various locations within the heat-exchange subsystem to provide additional telemetry that may be used by a more complex control algorithm. For example, the outlet gas temperature (TO) from the heat exchanger may measured by a sensor 513A that is placed upstream of the inlet port 522.

The heat exchanger's fluid circuit may be filled with water, a coolant mixture, and/or any acceptable heat-transfer medium. In alternative embodiments, a gas, such as air or refrigerant, is used as the heat-transfer medium. In general, the fluid is routed by conduits to a large reservoir of such fluid in a closed or open loop. One example of an open loop is a well or body of water from which ambient water is drawn and the exhaust water is delivered to a different location, for example, downstream in a river. In a closed-loop embodiment, a cooling tower may cycle the water through the air for return to the heat exchanger. Likewise, water may pass through a submerged or buried coil of continuous piping where a counter heat-exchange occurs to return the fluid flow to ambient temperature before it returns to the heat exchanger for another cycle.

It should also be clear that the isothermal operation of embodiments of this invention works in two directions thermodynamically. The gas may be warmed toward ambient by the heat exchanger during expansion or cooled toward ambient by the heat exchanger during compression; in the latter case, without cooling, significant internal heat may build up via compression. The heat-exchanger components should therefore be rated to handle at least the temperature range likely to be encountered for entering gas and exiting fluid. Moreover, since the heat exchanger is external to the hydraulic/pneumatic cylinder, it may be located anywhere that is convenient and may be sized as needed to deliver a high rate of heat exchange. In addition, it may be attached to the cylinder with straightforward taps or ports that are readily installed on the base end of an existing, commercially available hydraulic/pneumatic cylinder.

In various preferred embodiments, the heat-exchange fluid may be conditioned (i.e., pre-heated and/or pre-chilled) or used for heating or cooling needs by connecting the fluid inlet 518 and fluid outlet 519 of the external heat exchange side of the heat exchanger 554 to an installation 570, such as heat-engine power plants, industrial processes with waste heat, heat pumps, and buildings needing space heating or cooling.

As described above, in one embodiment, installation 570 is merely a large water reservoir that acts as a constant temperature thermal fluid source for use with the system. Alternatively, the water reservoir may be thermally linked to waste heat from an industrial process or the like, as described above, via another heat exchanger contained within the installation 570. This allows the heat exchange fluid to acquire or expel heat from/to the linked process, depending on configuration, for later use as a heating/cooling medium in the compressed air energy storage/conversion system.

Figure 6:
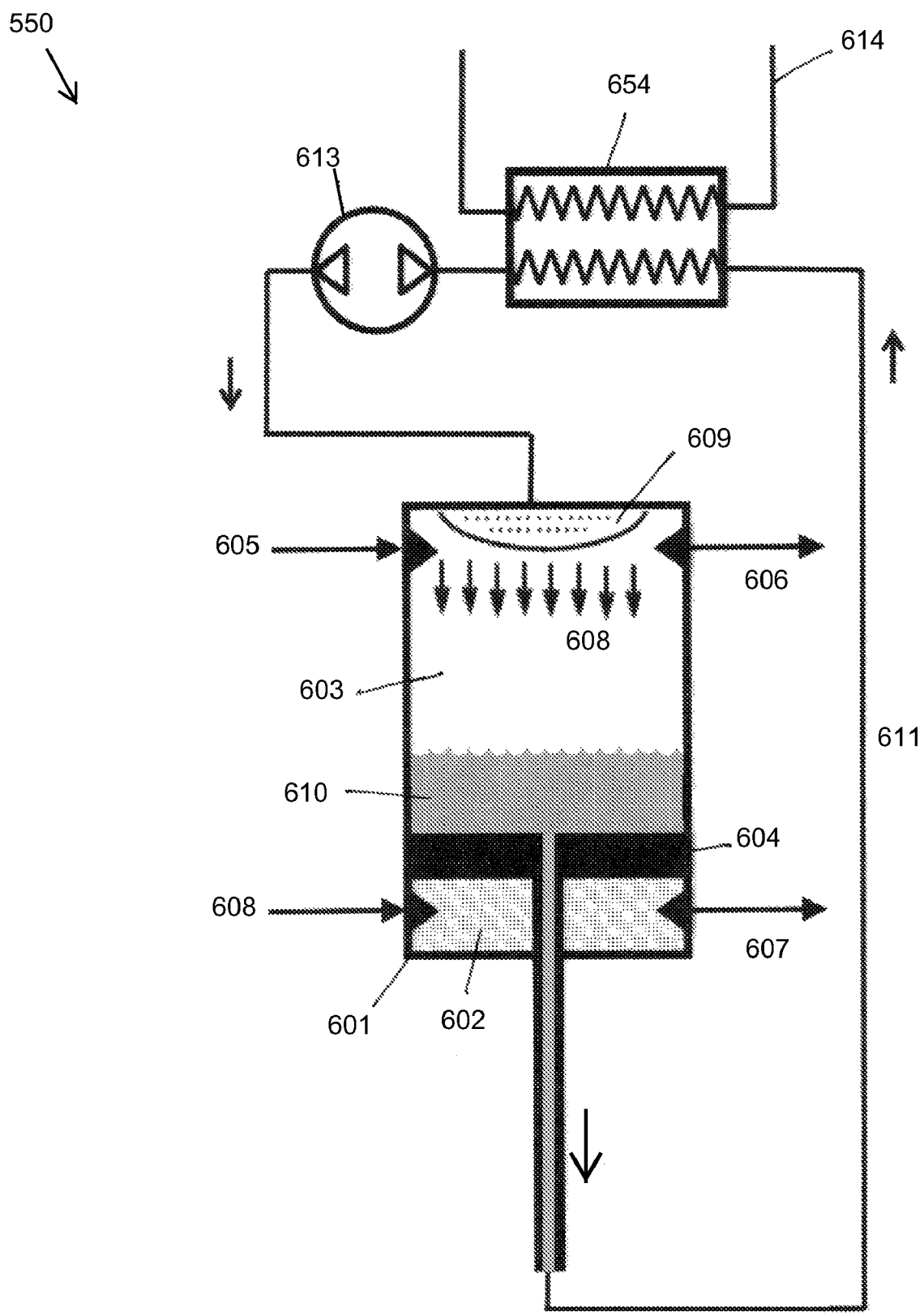
FIGS. 6 and 7 are schematic diagrams of liquid-spray-type mechanisms for expedited heat transfer to and from a gas undergoing compression or expansion in accordance with various embodiments of the invention.
Figure 7:
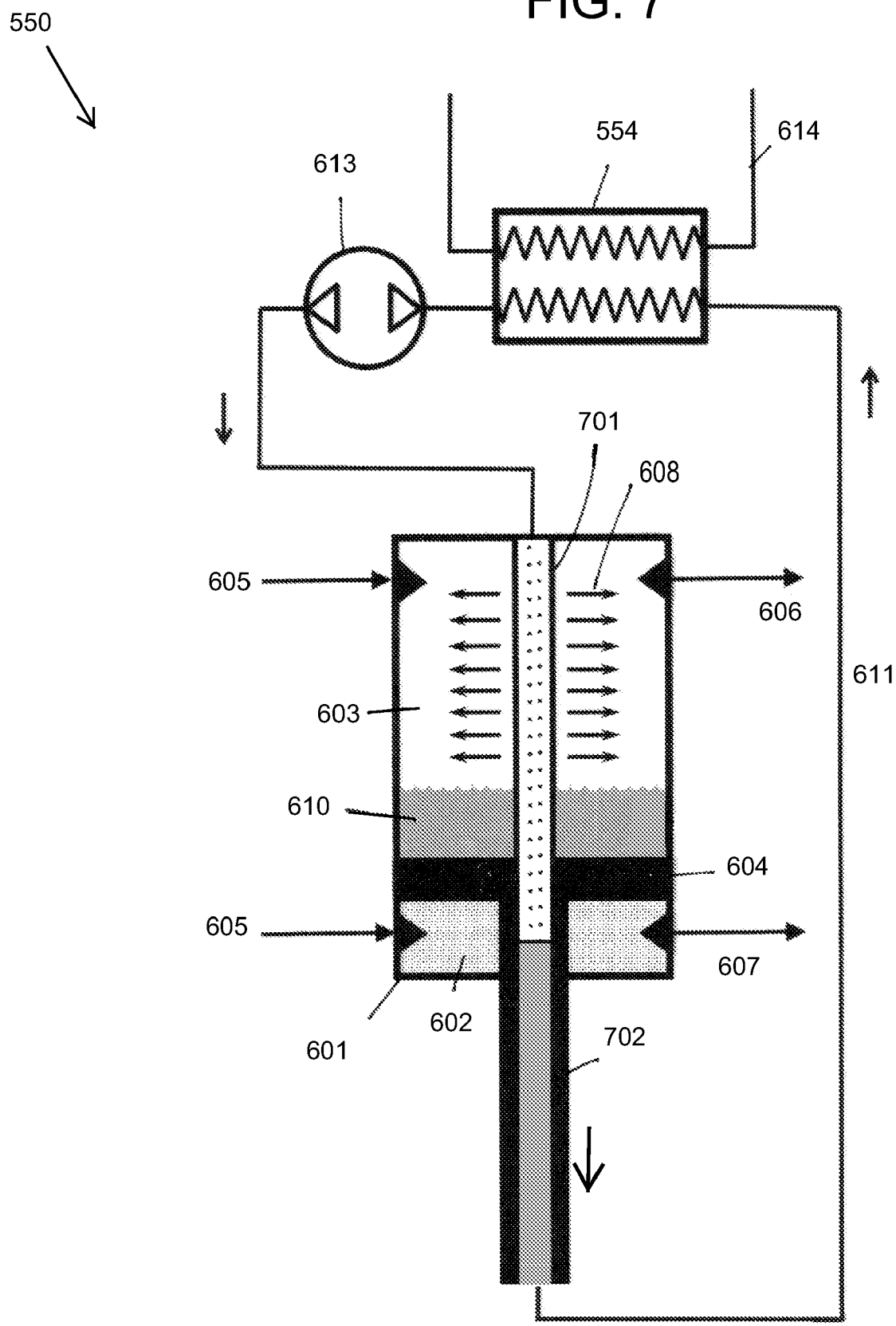

FIGS. 6 and 7 depict simplified alternative embodiments of isothermal-expansion hydraulic/pneumatic system 550 using spray-type heat-transfer schemes, such as those described in the '703 application. Referring to FIG. 6, heat transfer is improved through the use of a liquid circulator, heat exchanger circuit, and a spray head, where the liquid is sprayed downward into a vertical cylinder. In this embodiment, a vertically oriented hydraulic-pneumatic cylinder (accumulator, intensifier, or other hydraulic-pneumatic assembly) 601 having a hydraulic side 602 separated from a gas side 603 by a moveable piston 604 is shown in a state of operation where compressed gas from a pressure vessel, not shown but indicated by 605, is admitted to the gas side 603. In other states of operation, gas may be exhausted from the gas side 603 through a vent, not shown but indicated by 606.

In FIG. 6, as gas expands in the gas side 603 it pushes the piston 604 downward, pressurizing liquid in the hydraulic side 602. This liquid exits to a hydraulic motor/pump, not shown but indicated by 607, whose shaft drives an electric motor/generator (also not shown) to produce electricity. Liquid may be admitted to the hydraulic side 602 from a source (e.g., the liquid output of the hydraulic motor/pump), not shown but indicated by 608.

In FIG. 6, the gas expanding in the gas side 603 tends to cool according to the ideal gas law. Greater effective efficiency may be achieved if heat is transferred to the gas during expansion. This may be achieved by the introduction into the gas side 603 of a heated liquid (e.g., water) spray 608 through a spray head or heads 609. This liquid falls as a spray or droplets through the gas side 603, exchanging heat with the expanding gas; accumulates 610 in the bottom of the gas side; is conducted out of the gas side (it is herein illustrated as exiting through a center-drilled piston rod) and passes through piping 611 to heat exchanger 654, where it is heated; exits the heat exchanger to pass through a circulator 613; and is again sprayed through the spray head 609. Heat is delivered to heat exchanger 554 by a circuit 614 that communicates with some source of heat (e.g., an installation 570 as described above). Operated appropriately, this mechanism will achieve substantially isothermal expansion of the compressed gas from the reservoir 605, with resulting power output and total recoverable energy superior to that achievable otherwise.

Reference is now made to FIG. 7, which is a schematic representation of a system and method for expedited heat transfer to a gas in a staged hydraulic-pneumatic system where the heat transfer is improved through the use of a liquid circulator, heat exchanger circuit, and spray rod, where the liquid is sprayed radially into an arbitrarily-oriented cylinder. As shown in the illustrated embodiment, the heat-exchange liquid is sprayed outward 608 from a central spray rod 701 into the arbitrarily oriented cylinder. In this illustrative embodiment, the cylinder is oriented vertically; however, it may be oriented horizontally or obliquely. In this embodiment, a vertically oriented hydraulic-pneumatic cylinder (accumulator, intensifier, or other hydraulic-pneumatic assembly) 601 having a hydraulic side 602 separated from a gas side 603 by a moveable piston 604 is shown in a state of operation where compressed gas from a pressure vessel, not shown but indicated by 605, is admitted to the gas side 603 of the intensifier 601. In other states of operation, gas may be exhausted from the gas side 603 through a vent, not shown but indicated by 606.

In FIG. 7, as gas expands in the gas side 603 it pushes the piston 604 downward, pressurizing liquid in the hydraulic side 602. This liquid exits the hydraulic side to a hydraulic motor/pump, not shown but indicated by 607, whose shaft drives an electric motor/generator (also not shown) to produce electricity. Liquid may be admitted to the hydraulic side from a source (e.g., the liquid outlet of the hydraulic motor/pump), not shown, but indicated by 608.

In FIG. 7, the gas expanding in the gas side 603 of the cylinder 601 tends to cool. Greater effective efficiency may be achieved if heat is transferred to the gas during expansion. This may be achieved by the introduction into the gas side 603 of a heated liquid spray 608 from a hollow spray rod 701. The spray rod 701 is perforated at intervals along its whole length and around its circumference so that the whole open volume of the gas side 603 is sprayed with droplets. The spray rod is concentric with the shaft 702 attached to the piston 604, so that spray is emitted only by whatever portion of the spray rod 701 is exposed in the gas side 603 of the cylinder 601. This arrangement is for illustrative purposes and any other system or method for allowing an appropriate length of the spray rod (or multiple spray rods) to spray the interior of the gas side 603 of the intensifier would embody the same invention.

The spray droplets pass through the gas side 603, exchanging heat with the expanding gas. Liquid accumulates 610 in whatever portion of the gas side is bottommost; is conducted out of the gas side through a line 611 (herein illustrated as exiting through a center-drilled piston rod) to a heat exchanger 554 where it is heated; exits the heat exchanger to pass through a circulator 613; and is again introduced into the interior of the hollow spray rod 701. Heat is delivered to the heat exchanger 554 by a circuit 614 that communicates with a source of heat, e.g. an installation 570 as described above.

It should be clear that during compression of gas for delivery to a storage reservoir (not shown), as opposed to expansion of gas from the storage reservoir (shown), the identical mechanisms shown in FIGS. 6 and 7, if the heat-exchange liquid is cooled by the heat-exchange circuit rather than heated, may be used to cool the gas undergoing compression in the gas side of the intensifier. Likewise, heat sinks and/or sources of low-temperature fluid may further reduce power requirements and overall input energy during compression, thus enhancing performance. The embodiments depicted in FIGS. 6 and 7 (as well as other embodiments of the invention described herein) may be utilized with, e.g., gas storage systems described in the '703 application.

Figure 8:
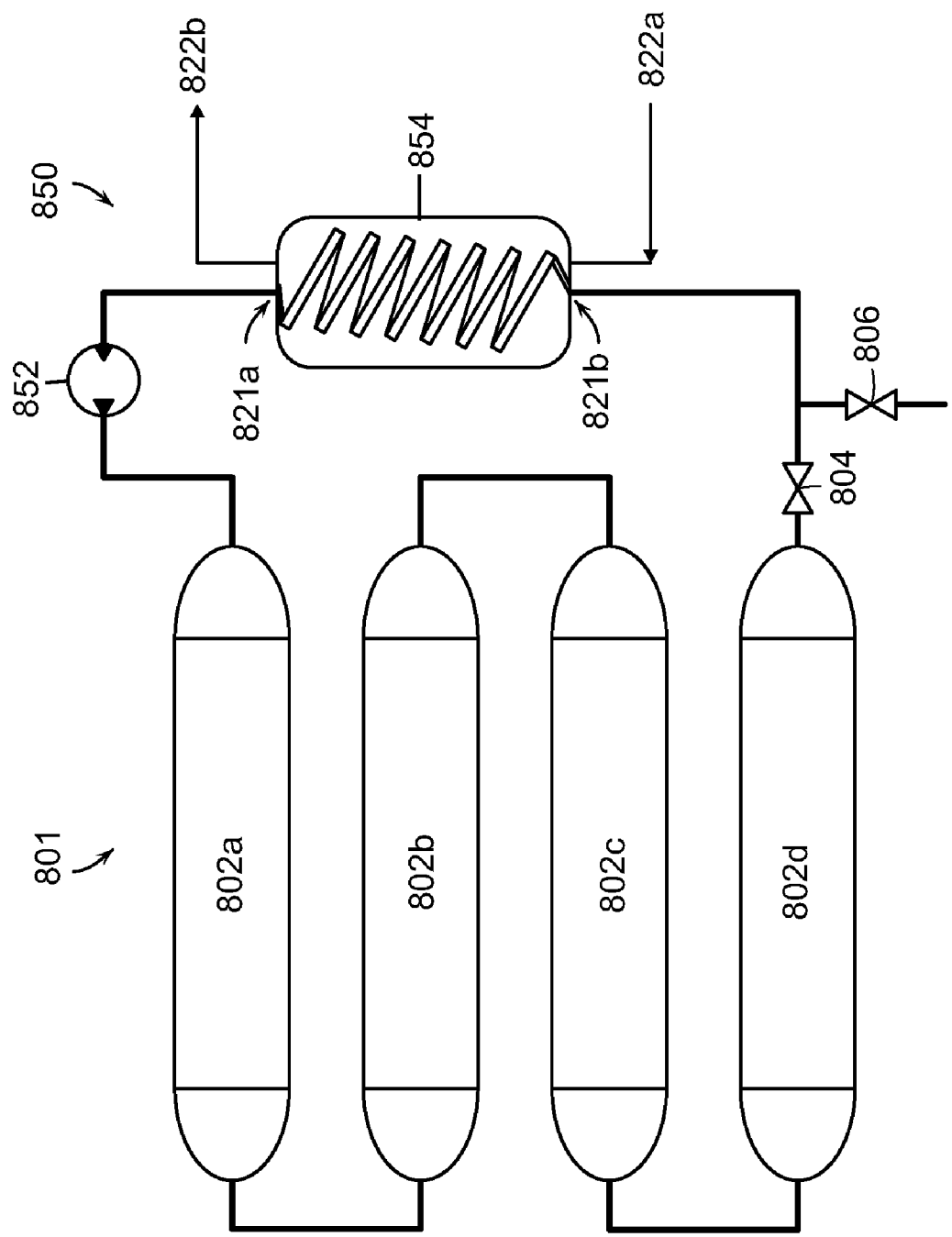
FIGS. 8 and 9 are schematic diagrams of compressed-gas storage subsystems for heating and cooling compressed gas in energy conversion systems in accordance with various embodiments of the invention.
Figure 9:
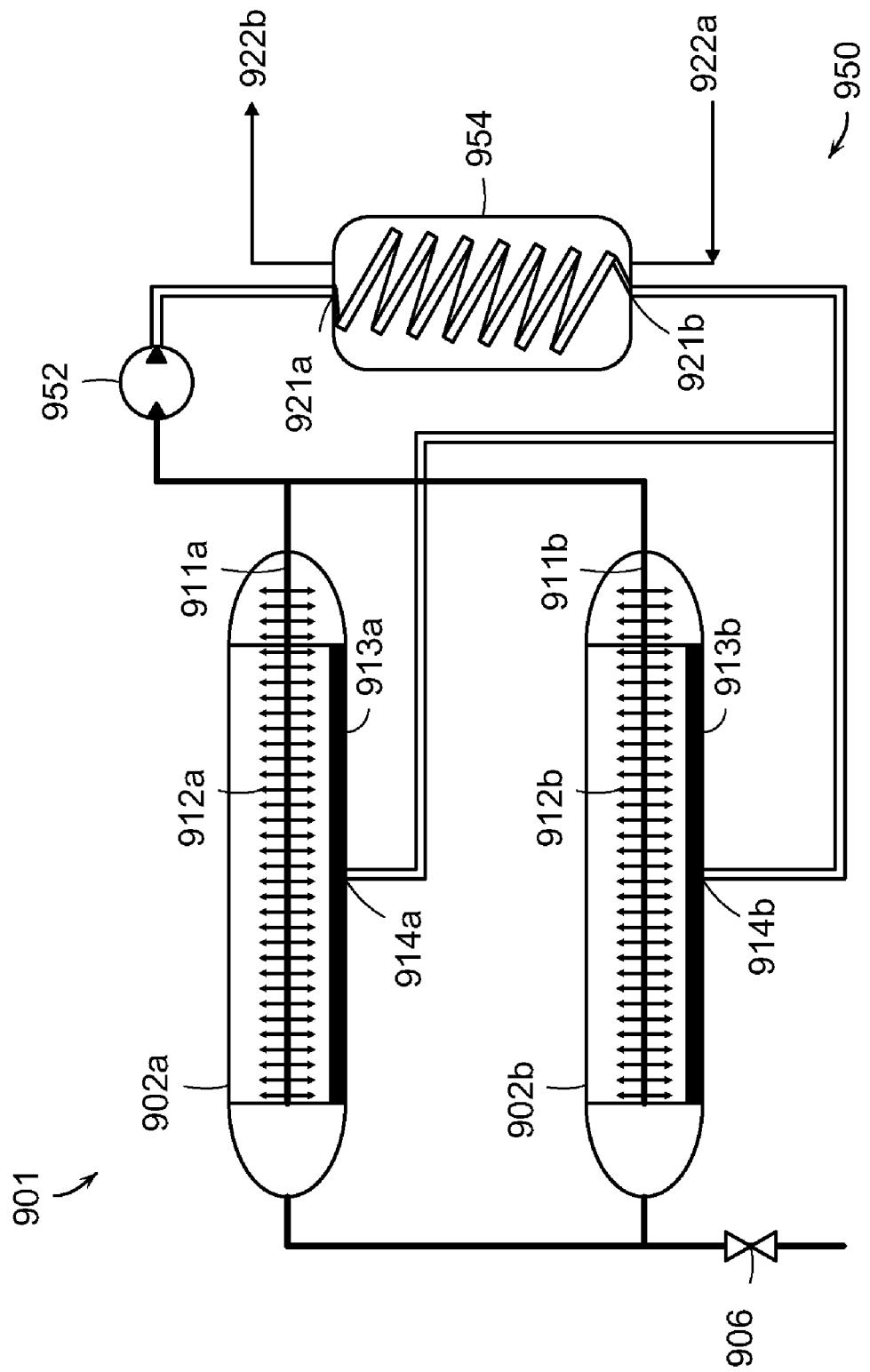

It should be noted that heat-transfer subsystems discussed above may also be used in conjunction with the high pressure gas storage systems (e.g., storage tanks 302) to thermally condition the pressurized gas stored therein, as shown in FIGS. 8 and 9. Generally, these systems are arranged and operate in the same manner as described above.

FIG. 8 depicts the use of a heat-transfer subsystem 850 in conjunction with a gas storage system 801 for use with the compressed-gas energy conversion systems described herein, to expedite transfer of thermal energy to, for example, the compressed gas prior to and during expansion. Compressed air from the pressure vessels (802a-802d) is circulated through a heat exchanger 854 using an air pump 852 operating as a circulator. The air pump 852 operates with a small pressure change sufficient for circulation, but within a housing that is able to withstand high pressures. The air pump 852 circulates the high-pressure air through the heat exchanger 854 without substantially increasing its pressure (e.g., a 50 psi increase for 3000 psi air). In this way, the stored compressed air may be pre-heated (or pre-cooled) by opening valve 804 with valve 806 closed and heated during expansion or cooled during compression by closing 804 and opening 806. The heat exchanger 854 may be any sort of standard heat-exchanger design; illustrated here is a tube-in-shell type heat exchanger with high-pressure air inlet and outlet ports 821a and 821b and low-pressure shell ports 822a and 822b (which may be connected to an external heating or cooling source, as described above).

FIG. 9 depicts the use of a heat exchange subsystem 950 in conjunction with a gas storage system 901 for use with the compressed gas in energy conversion systems described herein, to expedite transfer of thermal energy to the compressed gas prior to and during expansion. In this embodiment, thermal energy transfer to and from the stored compressed gas in pressure vessels (902a and 902b) is expedited by a water circulation scheme using a water pump 952 and heat exchanger 954. The water pump 952 operates with a small pressure change sufficient for circulation and spray but within a housing that is able to withstand high pressures. The water pump 952 circulates high-pressure water through heat exchanger 954 and sprays the water into pressure vessels 902 without substantially increasing its pressure (e.g., a 100 psi increase for circulating and spraying within 3000 psi stored compressed air). In this way, the stored compressed air may be pre-heated (or pre-cooled) using a water circulation and spraying method.

The spray heat exchange may occur either as pre-heating prior to expansion or, when valve 906 is opened, pre-cooling prior to compression in the system. The heat exchanger 954 may be any sort of standard heat exchanger design; illustrated here is a tube-in-shell type heat exchanger with high-pressure water inlet and outlet ports 921a and 921b and low-pressure shell ports 922a and 922b (which may be connected to an external heating or cooling source, as described above). As liquid-to-liquid heat exchangers tend to be more efficient than air-to-liquid heat exchangers, heat exchanger size may be reduced and/or heat transfer may be improved by use of a liquid-to-liquid heat exchanger. Heat exchange within the pressure vessels 902 is expedited by active spraying of the liquid (e.g., water) into the pressure vessels 902.

As shown in FIG. 9, a perforated spray rod 911a, 911b is installed within each pressure vessel 902a, 902b. The water pump 952 increases the water pressure above the vessel pressure such that water is actively circulated and sprayed out of rods 911a and 911b, as shown by arrows 912a and 912b. After spraying through the volume of the pressure vessels 902, the water settles to the bottom of the vessels 902 (see 913a, 913b) and is then removed through a drainage port 914a, 914b. The water may be circulated through the heat exchanger 954 as part of the closed-loop water circulation and spray system.

Figure 10:
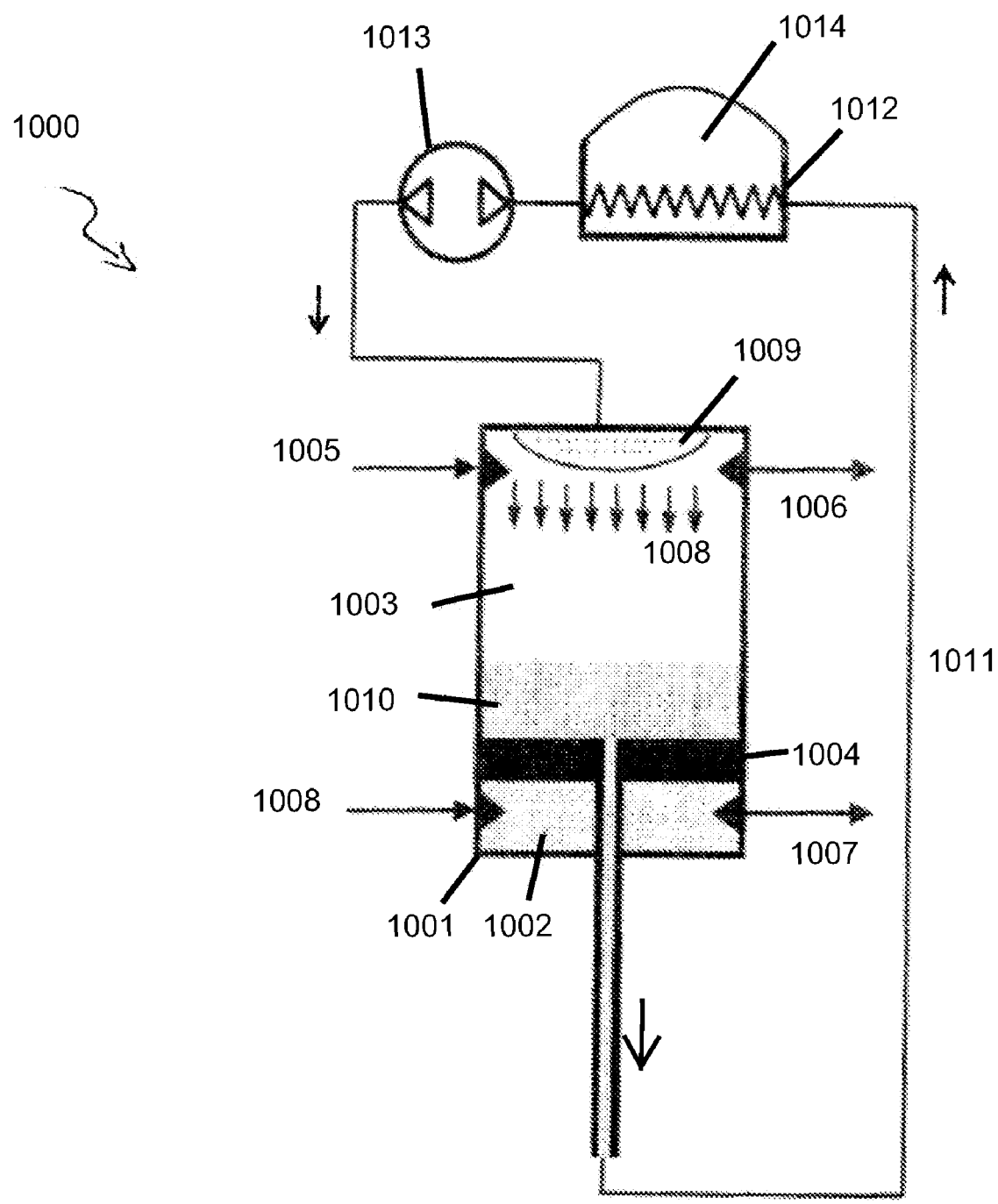
FIG. 10 and FIG. 11 are schematic diagrams of compressed-gas energy storage with a thermal well using a liquid-spray mechanism (FIG. 10) or an air-circulation mechanism (FIG. 11) for expedited heat transfer to and from a gas undergoing compression or expansion in accordance with various embodiments of the invention.

FIG. 10 depicts an embodiment of a compressed-gas energy conversion system with combined thermal well, where a liquid is sprayed downward into a vertically oriented cylinder to expedite heat transfer to the gas in the compressed-gas energy conversion system. The system 1000 includes some of the same components of the energy-storage system labeled 110 in FIG. 1. In this embodiment, a vertically oriented hydraulic-pneumatic cylinder (accumulator, intensifier, or other hydraulic-pneumatic assembly) 1001 having a fluid chamber or "hydraulic side" 1002 separated from a gas chamber or "pneumatic side" 1003 by a moveable piston 1004 is shown in a state of operation where compressed gas from a pressure vessel (e.g., 120 in FIG. 1), not shown but indicated by 1005, is admitted to the pneumatic side 1003. In other states of operation, gas may be exhausted from the pneumatic side 1003 through a vent, not shown, but indicated by 1006.

As gas expands in the gas side 1003 of the cylinder 1001, it pushes the piston 1004 downward, pressurizing the liquid in the hydraulic side 1002. This liquid exits to a hydraulic motor/pump, not shown but indicated by 1007, whose shaft drives an electric motor/generator (also not shown) to produce electricity. Liquid may be admitted to the hydraulic side 1002 from any source (e.g., the liquid outlet of the hydraulic motor/pump), not shown, but indicated by 1008.

The gas expanding in the pneumatic side 1003 tends to cool according to the ideal gas law. Greater effective efficiency is achieved if heat is transferred to the gas during expansion. This is achieved by the introduction of a heated liquid into the pneumatic side 1003 of the cylinder. The heated liquid (e.g., water) may be introduced as a spray 1008 through a spray head or heads 1009. This liquid falls as a spray or droplets through the pneumatic side 1003, exchanging heat with the expanding gas. The liquid accumulates 1010 in the bottom of the pneumatic side 1003 and is drawn out of the pneumatic side 1003 of the cylinder. As shown in FIG. 10, the liquid is drawn out of the cylinder 1001 via a center-drilled piston rod; however, other means for removing the liquid are contemplated and within the scope of the invention. The liquid is drawn through piping 1011 to a heat exchanger 1012; exits the heat exchanger 1012 via a circulator 1013; and is again introduced into the gas side 1003 through the spray head 1009. Other mechanisms for introducing the liquid to the pneumatic side are contemplated and within the scope of the invention.

The heat exchanger 1012 passes through a thermal well 1014, shown here as a water reservoir. In use, this system will achieve substantially isothermal expansion of the compressed gas from the reservoir 1005, with resulting power output and total recoverable energy superior to that achievable otherwise. The thermal energy delivered by the heat-exchange circuit and liquid spray to the expanding gas may raise its temperature, thereby increasing mechanical work that is delivered by the cylinder to the motor/generator and the amount of electricity produced.

Similarly, during compression of the gas, thermal energy may be transferred from the compressing gas to the liquid spray and then to the thermal well. Overall, for equal power and duration expansion and compression cycles, equal amounts of thermal energy will be stored and returned from the thermal well. Due to inefficiencies in the energy conversion system, the thermal well will actually gain in thermal energy over the course of a full compression and expansion process. This gain in thermal energy may be dissipated by means such as an environmental heat exchanger or other heat transfer, such as losses through imperfect insulation. In some embodiments, the gain in thermal energy may be utilized as a heat source for process heat or building conditioning, as described above.

Figure 11:
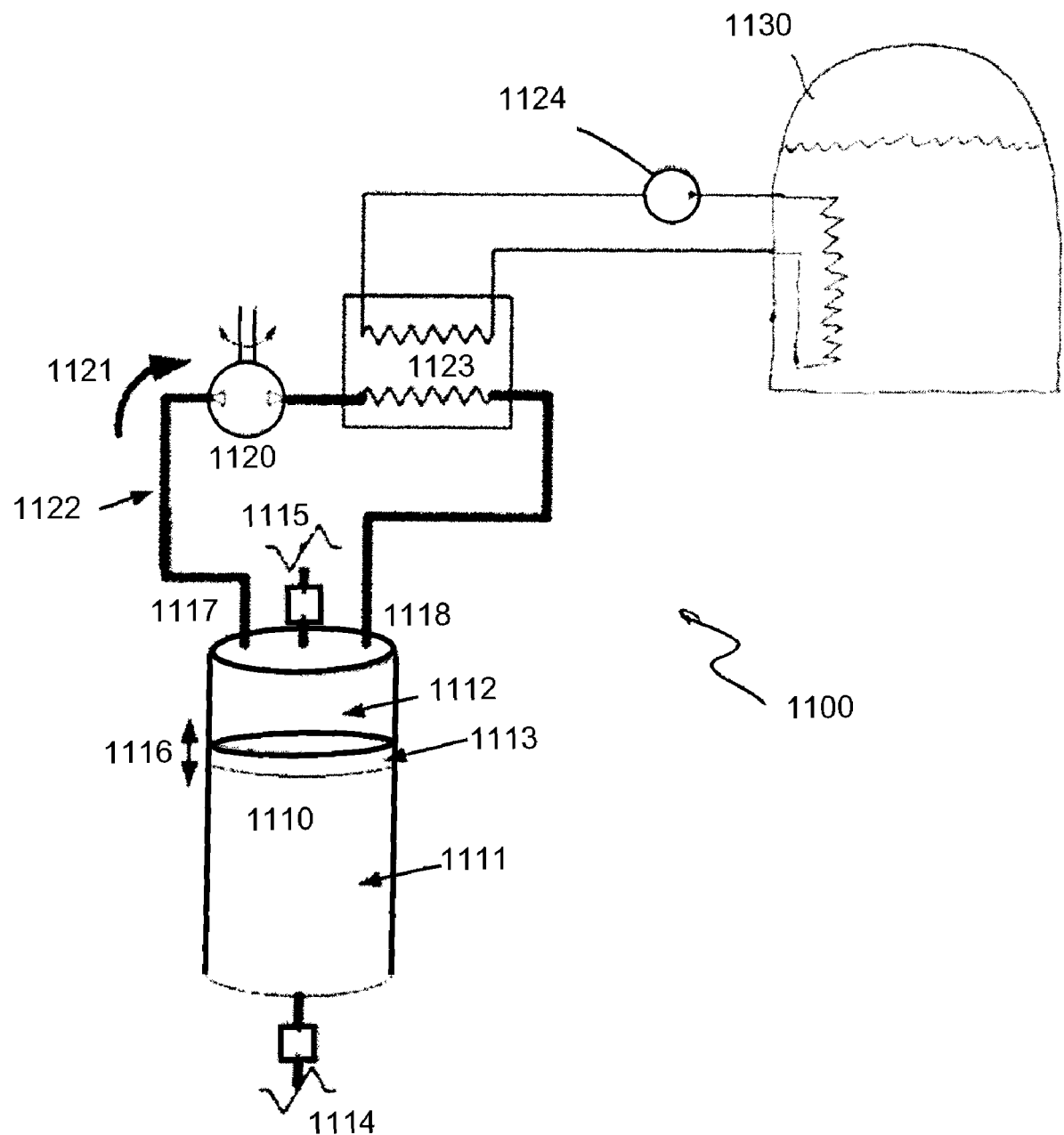

FIG. 11 depicts another embodiment of a compressed-gas energy conversion system with combined thermal well 1100, where the gas is circulated through a heat exchanger 1123 external to the expanding cylinder volume. A portion of the compressed-gas energy conversion system, including the heat exchange subsystem, is shown to illustrate the heat exchange process. The system 1100 includes some of the same components of the energy-storage system labeled 110 in FIG. 1. In FIG. 11, a single stage of the staged compressed-gas energy conversion system is represented by a cylinder 1110, which contains a gas chamber or "pneumatic side" 1112 and a fluid chamber or "hydraulic side" 1111 separated by a movable (double arrow 1116) piston 1113 or other force/pressure-transmitting barrier that isolates the gas from the fluid. The cylinder 1110 includes a primary gas port 1115 that connects with a pneumatic circuit that for compression admits the uncompressed gases and eventually outputs the compressed gas and for expansion admits the compressed gases and outputs the decompressed gases. The cylinder 1110 further includes a primary fluid port 1114 that connects with a hydraulic drive circuit of the storage system that for compression admits the pressurized fluid to drive the piston 1116 and compress the gases in pneumatic side 1112 and for expansion outputs the pressurized fluid to drive a motor generator.

The cylinder 1110 has one or more gas circulation outlet ports 1117, which are connected via piping 1122 to a gas circulator 1120, which may be part of the heat exchange subsystem described in the '235 application. The gas circulator 1120 provides a flow (arrow 1121) of gas through the piping 1122. The outlet of the gas circulator 1120 is connected via a pipe to the gas inlet of the heat exchanger 1123. The heat exchanger 1123 may pass directly through the thermal well, or as shown here, other connections on the heat exchanger 1123 may bring an external heat exchange fluid (e.g., water) from the thermal well 1130 to the heat exchanger 1123 to provide or extract thermal energy from the circulating compressed gas, thereby maintaining the gas at nearly the temperature of the exchange fluid. In one embodiment, a fluid circulator 1124 is used to circulate the heat exchange fluid through the heat exchanger 1123. The system 1100 improves efficiency and power output of the compressed-gas energy conversion system.

Figure 12:
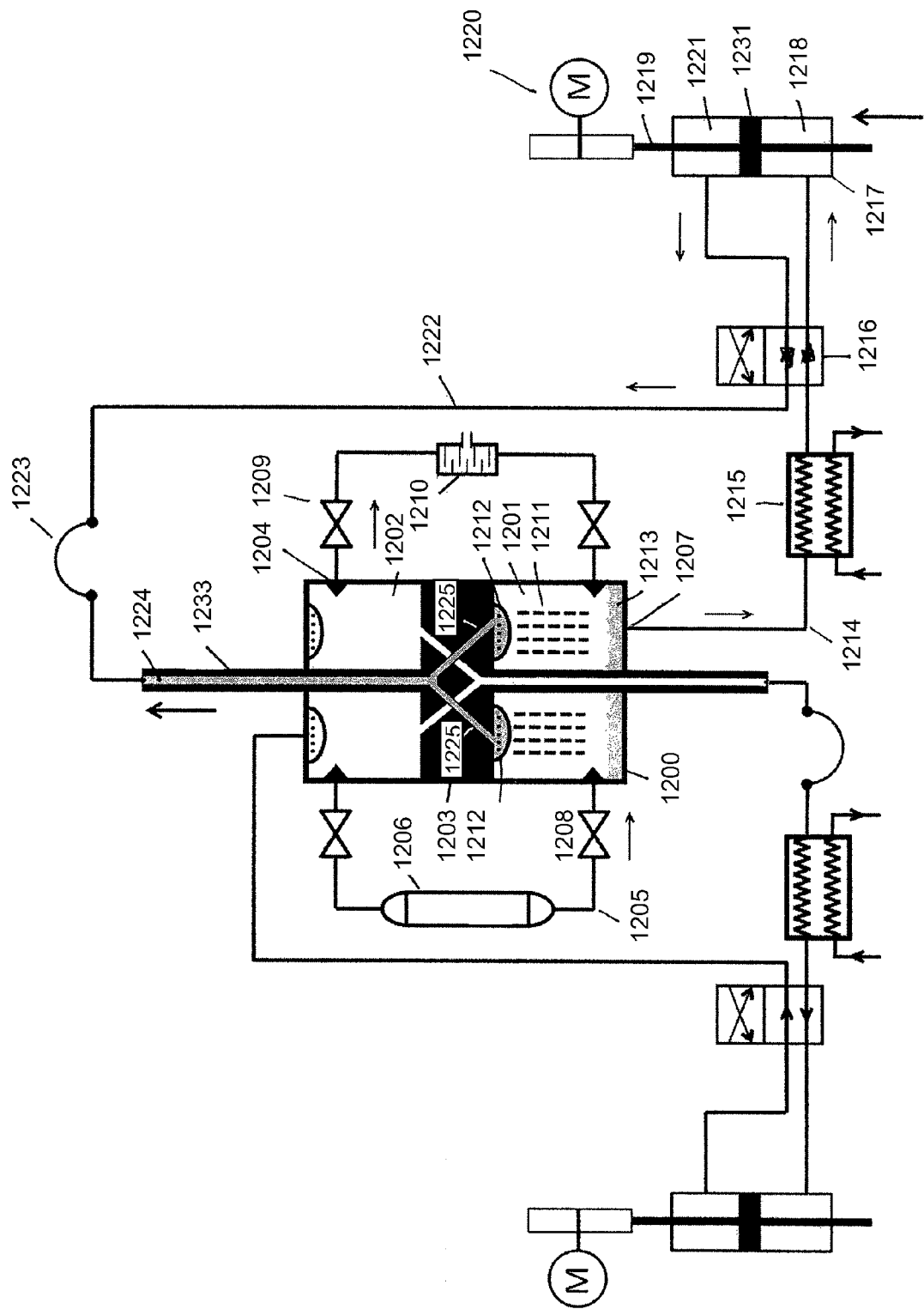
FIG. 12 is a schematic diagram of a system using pressurized stored gas to operate a double-acting pneumatic cylinder (shown in partial cross-section) to produce mechanical force that may be used to drive to an electric motor/generator (not shown) in accordance with various embodiments of the invention.

FIG. 12 is a schematic diagram of a system and method for using pressurized stored gas to operate a double-acting pneumatic cylinder to produce mechanical motion that may be used to drive to an electric motor/generator (not shown, but similar to those described in the '057 application) in accordance with an embodiment of the invention. In this illustrative embodiment, sprays of heat-exchange liquid may be introduced into either compartment of the cylinder to enable approximately isothermal expansion (or compression) of gas. A hydraulic pump (in this exemplary embodiment, a double-acting two-chamber hydraulic cylinder) pressurizes the heat-exchange liquid for injection into the cylinder. Heat-exchange liquid is recycled from the high-pressure chamber to allow the hydraulic pump to operate more efficiently than if the liquid had to be pressurized starting from a lower pressure (e.g., atmospheric).

The system includes a pneumatic cylinder 1200 divided into two compartments 1201, 1202 by a piston 1203. The cylinder 1200, which is shown in a vertical orientation in this illustrative embodiment, has one or more gas ports 1204 that may exchange gas with other devices through piping 1205. In the operating state shown in FIG. 12, pressurized gas from a reservoir 1206 passes through a valve 1208 and drives the piston 1203 of the double-acting high-pressure cylinder 1200 in the upward direction. Gas from the lower-pressure side (in this case compartment 1202) of the cylinder 1200 is directed through a valve 1209 to a vent 1210.

In this embodiment of the invention, liquid sprays may be introduced into either of the compartments 1201, 1202 of the cylinder 1200. The liquid, sprayed downward, allows for expedited heat transfer with the high-pressure gas being expanded (or compressed) in the cylinder 1200, as described in detail above. In FIG. 12, gas is expanded in chamber 1201 beginning at high pressure, e.g., 3000 psi. Spray droplets 1211 are introduced into the chamber 1201 at a higher pressure (e.g., 3010 psi) than that of the gas in the chamber via perforated spray heads 1212. The function of this spray is to warm the high-pressure gas as it expands. (If gas is being compressed, the sprays serve to cool the gas.)

Liquid 1213 accumulating at the bottom of the chamber 1201 is removed at a pressure substantially the same as that of the gas inside the expansion chamber (e.g., 3000 psi at the start of the expansion) through a port 1207 and conveyed via piping 1214 to a heat exchanger 1215 to raise its temperature, which has been reduced by heat exchange with the expanding gas. The heat exchanger 1215 is shown for illustrative purposes and may be located anywhere in the circuit; moreover, its function may be performed during system idle times through circulation of water at low pressure or with replacement from a larger water bath. Exiting the heat exchanger 1215, the liquid passes through a four-way, two-position valve 1216 that directs it to whichever of the two chambers of a double-acting hydraulic cylinder 1217 is presently being filled. In the state of operation shown in FIG. 12, this happens to be chamber 1218. The valve 1216 allows the hydraulic cylinder 1217 to pump liquid through the recycling loop in the same sense regardless of which way the hydraulic cylinder's piston 1231 is moving. A four-way, two-position valve 1216 is shown for illustrative purposes and may be replaced by check valves or other valve arrangements. The shaft 1219 of the hydraulic cylinder is driven by an actuator or motor 1220. The entire pumping unit 1217 is shown for illustrative purposes as a driven double-acting cylinder; however, the pumping unit may be any means for pumping a fluid, such as a modified gear-based hydraulic pump able to withstand high inlet pressures.

Liquid pressurized by the hydraulic cylinder 1217 (i.e., in chamber 1221, in this state of operation) is directed through the valve 1216, through piping 1222, through a flexible hose 1223, and into a center-drilled channel 1224 in one side of a piston shaft 1233 of the pneumatic cylinder 1200. Channels 1225 formed within the body of the piston 1203 direct the heat-exchange liquid to the spray heads 1212. The arrangement of channels and spray heads shown here is illustrative only, as any number and disposition of channels and spray heads or other spray devices inside the cylinder 1200 and its piston 1203 may be selected to suit a particular application: such variations are expressly contemplated and within the scope of the invention. The concept is also independent of whatever pumping mechanism is used to pressurize the heat-exchange liquid in the hydraulic loop.

Figure 13:
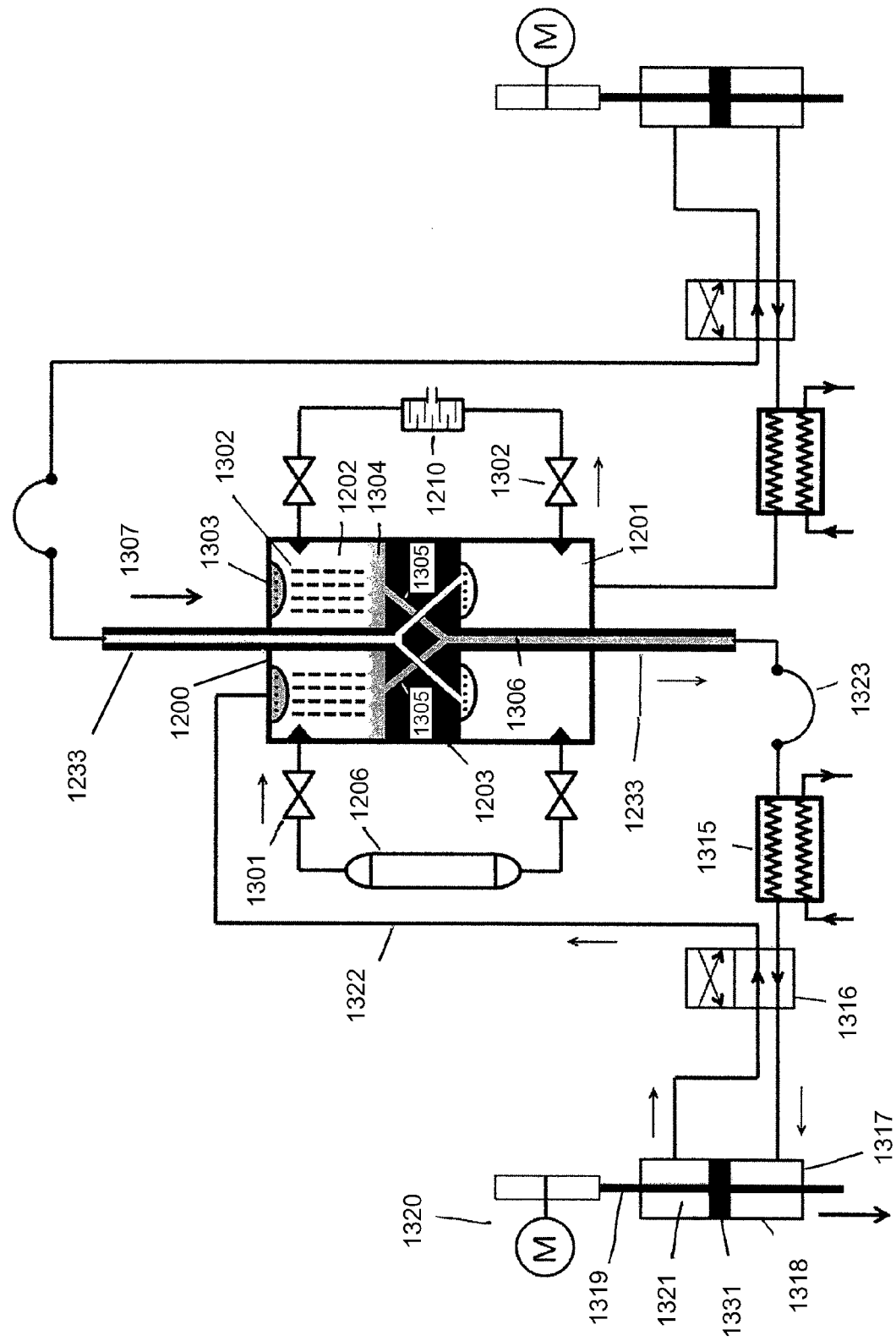
FIG. 13 shows the system of FIG. 12 in a different phase of operation in accordance with various embodiments of the invention.

Reference is now made to FIG. 13, which shows the illustrative embodiment of FIG. 12 in a second operating state (i.e., with the high- and low-pressure sides of the piston reversed, the direction of shaft motion reversed, and the other hydraulic loop in use). In this state, the piston shaft 1233 of the pneumatic cylinder 1200 has a direction of motion opposite to that shown in FIG. 12. Gas flows from the high-pressure reservoir 1206 through valve 1301 into compartment 1202 of the cylinder 1200. Gas at low pressure flows from chamber 1201 of the pneumatic cylinder 1200 through a valve 1302 to the vent 1210.

In FIG. 13, gas is expanded in chamber 1201 beginning at about, for example, 3000 psi. Spray droplets 1302 are introduced into the chamber at a pressure (e.g., 3010 psi) higher than that of the gas in the chamber via perforated spray heads 1303. Liquid 1304 accumulating at the bottom of the chamber 1202 is removed through channels 1305 formed in the body of the piston 1203 and then through a center-drilled channel 1306 in one side of the piston shaft 1233. The piston 1203 moves downward, as indicated by the arrow 1307.

The heat-exchange liquid is passed through a flexible hose 1323, a heat exchanger 1315, a four-way, two-position valve 1316, and raised to injection pressure by a hydraulic cylinder 1317 driven by an actuator 1320. It is then passed through the valve 1316 again and returned to the spray heads 1303 for injection into chamber 1202, in a process similar to that described with respect to FIG. 12.

If the electric motor/generator (not shown) coupled to the pneumatic cylinder is operated as a motor rather than as a generator, the mechanism shown in FIGS. 12 and 13 may employ electricity to produce pressurized stored gas; in such a case, the sprays here shown as heating gas undergoing expansion may be used, instead, to cool gas undergoing compression.

Figure 14:
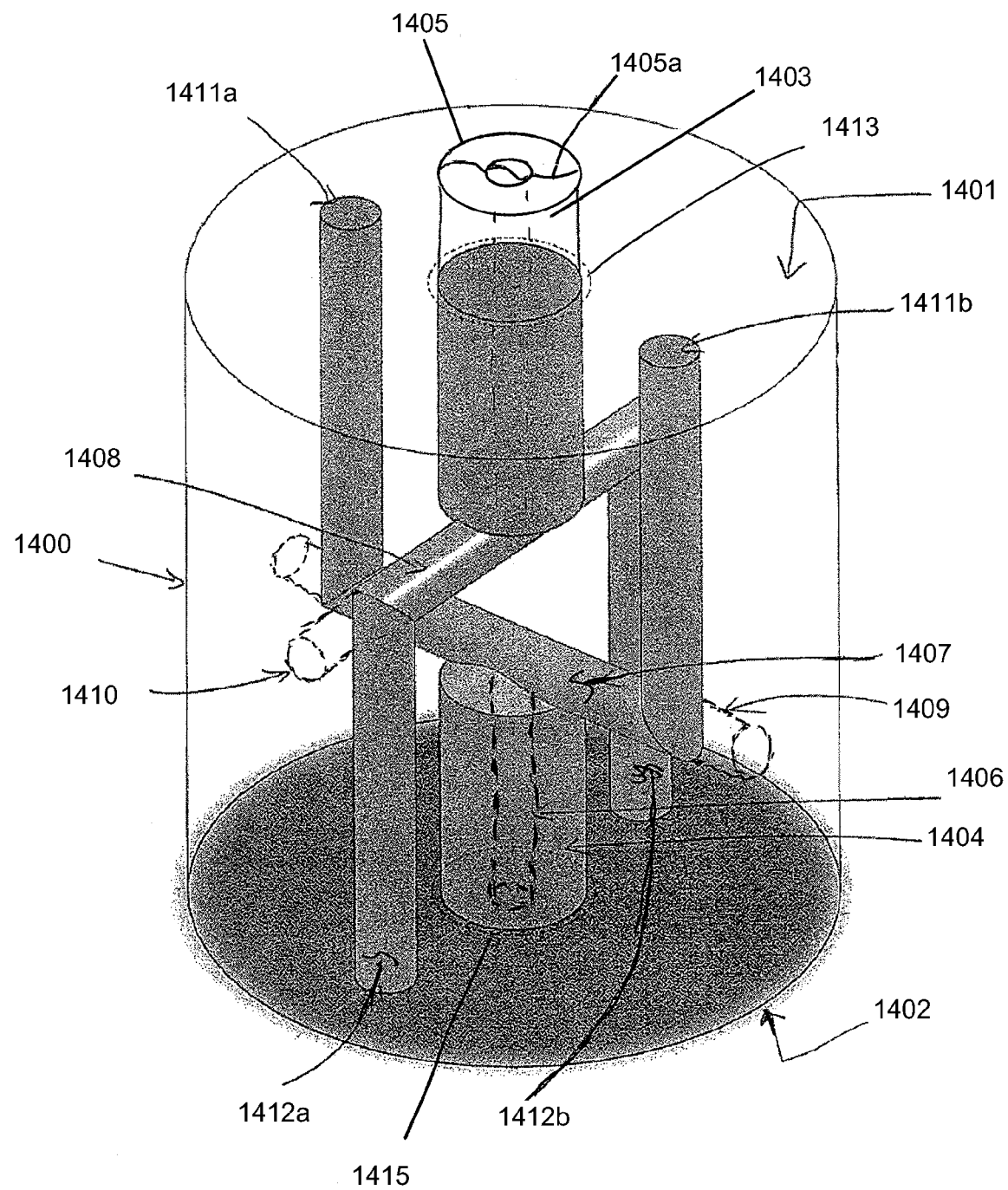
FIG. 14 shows a schematic perspective view of a piston drilled for drainage and injection of a heat transfer fluid for use in a cylinder for a system in accordance with various embodiments of the invention.

Reference is now made to FIG. 14, which depicts a schematic perspective view for one design for a piston head drilled to allow fluid to flow from off-center holes in one piston side to a centered piston hole in the other side, with the centered piston hole potentially connected to a center drilled piston rod, as shown in FIGS. 12 and 13. This piston head, among other applications, allows for the heat transfer fluid to be removed and injected as described in FIGS. 12 and 13.

As shown in FIG. 14, a cylindrical piston head 1400 is shown having a top face 1401 and a bottom face 1402, which when inserted in a honed cylinder (not shown) is separated by a seal mechanism (not shown) around the exterior curved surface of the piston head 1400. The piston head 1400 is shown with a centrally located machined hole 1413 on the top face 1401 for holding a piston rod 1403, shown here with a center drilled passage 1405. The break lines 1405a indicate that the piston rod may be of any length, presumably longer than the cylinder stroke length. Similarly, the piston head is shown with a centrally located machined hole 1415 on the bottom face 1402 for holding a piston rod 1404, shown here with center drilled passage 1406. The holes 1413, 1415 are referred to as vertical in the orientation as shown in FIG. 14. A horizontal hole 1408 is drilled through the piston head, connecting with the hole 1413 and the channel created by center drilled passage 1405. This hole 1408 may be drilled through the entire piston head and plugged as indicated by dashed line 1410. A second horizontal hole 1407 is drilled through the piston head to connect with hole 1415 and the channel created by center drilled passage 1406. Hole 1408 is shown rotated with respect to hole 1407 by 90 degrees when viewed from the top side 1401 or the bottom side 1402. This hole 1407 may be drilled through the entire piston head and plugged as indicated by dashed line 1409. Vertical holes 1411a, 1411b are drilled from the top face 1401 to intersect with hole 1407, but not through the piston, thus maintaining the integrity of the seal mechanism (not shown) separating the top and bottom compartments of a cylinder in which the piston is disposed. Additional vertical holes 1412a, 1412b are drilled from the bottom face 1402 to intersect with hole 1408, but not through the piston, again maintaining the integrity of the seal mechanism (not shown) separating the top and bottom compartments of the cylinder. In this manner, fluid may flow from (or into) the top side 1401 of the piston through holes 1411a, 1411b, through hole 1407, and out hole 1406, allowing fluid to be continuously pulled from the top compartment of the cylinder regardless of piston position. Likewise, fluid may flow into (or from) center drilled passage 1405, through hole 1408, and out holes 1412a, 1412b out of the bottom side 1402 of the piston into the cylinder regardless of piston position. This illustration indicates one method of machining a cylindrical piston head for injection and removal of heat transfer fluid. Other means of machining the piston head and other orientations for achieving the same function, such as angled holes, for example as shown schematically in FIGS. 12 and 13, will be apparent to any person reasonably skilled in the art.

The system shown in FIGS. 12 and 13 may clearly also be operated in compression mode. In that mode, for example, an electric motor/generator (not shown) coupled in a manner to drive the pneumatic cylinder shaft is operated and the droplet-spray mechanism is used to cool gas undergoing compression for delivery to the storage reservoir, rather than to warm gas undergoing expansion from the reservoir. The mechanism shown in this illustrative embodiment may thus operate as a full-cycle energy conversion system with high efficiency.

The system shown in FIGS. 12 and 13, or other embodiments employing energy-efficient recycling of pressurized heat-exchange liquid, may draw or deliver thermal energy via their heat-exchange mechanisms to external systems, as described above. The systems shown in FIGS. 12 and 13, or other embodiments employing energy-efficient recycling of pressurized heat-exchange liquid, may also be modified to employ multiple pneumatic cylinders in series to reduce the operating pressure range of the system for further increase of efficiency, as described, for example, in U.S. Provisional Patent Application No. 61/257,583, the entire disclosure of which is incorporated by reference herein. For example, such systems may include multiple, fluidly coupled pneumatic cylinders, and may operate in an expansion mode and then a compression mode.

Embodiments of the invention disclosed herein may be utilized in a variety of applications, including extraction, sequestration, and subsequent use of gases emitted from power plants, such as carbon dioxide. Fossil fuel-based power generation, as of 2008, accounts for a large fraction of the world's generated energy. While pollution control equipment can successfully capture much of the criteria emissions (e.g., sulfur dioxide, nitrogen oxides, particulates) at low-percentage energy consumption and cost, carbon dioxide ($CO_2$) sequestration systems for fossil fuel power plants remain prohibitively energy intensive (utilizing 20-40% of the total energy generated) and expensive.

One potential method of carbon dioxide fixation from power plants emissions is through the growth of plant-based biomass. One use of biomass growth for $CO_2$ emission mitigation described in US Patent Application Publication No. 2007/0289206, the disclosure of which is hereby incorporated by reference in its entirety, in which high-growth-rate algae is grown in a carbon-dioxide-rich environment. The grown biomass (e.g., algae) has the potential to be used as an energy carrier through the extraction of oils (biodiesel) and/or processing for use as other biofuels (e.g. ethanol). In any of these cases, when the ultimate biofuel is used (typically combusted in an engine) the sequestered carbon dioxide will be released. Overall, through the biomass-based $CO_2$ emission mitigation, the net effect is an approximate halving of the carbon dioxide emissions for both processes (power plant generation and biofuel usage (e.g., transportation).

There is one significant drawback to the approach described above. Most such biomass-based $CO_2$ emission mitigation schemes require light to provide the activation energy necessary for photosynthesis. Therefore, power plant biomass-based carbon dioxide sequestration schemes generally only operate well during daytime hours.

Other types of carbon dioxide sequestration systems are described in PCT Application Publication No. WO02/092755, PCT Application Publication No. WO 2007/134294, PCT Application Publication No. WO 2006/108532, PCT Application Publication No. WO 2006/100667, U.S. Patent Application Publication No. 2008/0220486, U.S. Patent Application Publication No. 2008/0009055, and U.S. Patent Application Publication No. 2008/0252215, all of which are hereby incorporated by reference in their entireties.

As the compressed-gas energy-storage methods and systems described above are relatively indifferent to the species of gas involved, such systems can compress and later expand processed carbon dioxide-rich power plant exhaust gasses without adverse effect on their energy-storage efficiency. The combination of fossil fuel based power plants, compressed-gas energy storage, and biomass carbon dioxide fixation/sequestration allows for the storage of low-cost energy during nighttime off-peak hours for release during daytime peak hours simultaneously with the storage of nighttime power plant emissions for daytime release through a biomass carbon dioxide sequestration facility. This provides an economically feasible solution to both energy-storage needs and carbon dioxide sequestration. Embodiments of the present invention enable the temporary storage of nighttime power plant emissions by a compressed-gas energy conversion system for later release through a biomass sequestration system during daylight hours.

Embodiments of the invention overcome the disadvantages of the prior art by combining biomass carbon dioxide sequestration with compressed-gas energy storage to allow for a cost-effective means of both storing energy and sequestering carbon dioxide at all times, day and night. The gas emissions from a power plant are compressed and stored, primarily during nighttime hours, in effect storing both energy and carbon-dioxide-rich power plant gas emissions. At other times, primarily during daytime hours, carbon-dioxide-rich power plant gas emissions are directed to a biomass sequestration facility, such as algae ponds or bioreactors. Upon market or other demand for energy stored by the compressed gas system, primarily during daytime hours, compressed and stored carbon-dioxide-rich gas emissions are expanded, generating usable/saleable power; after expansion, these previously stored carbon dioxide-rich gas emissions may also be directed to the biomass sequestration facility.

Figure 15:
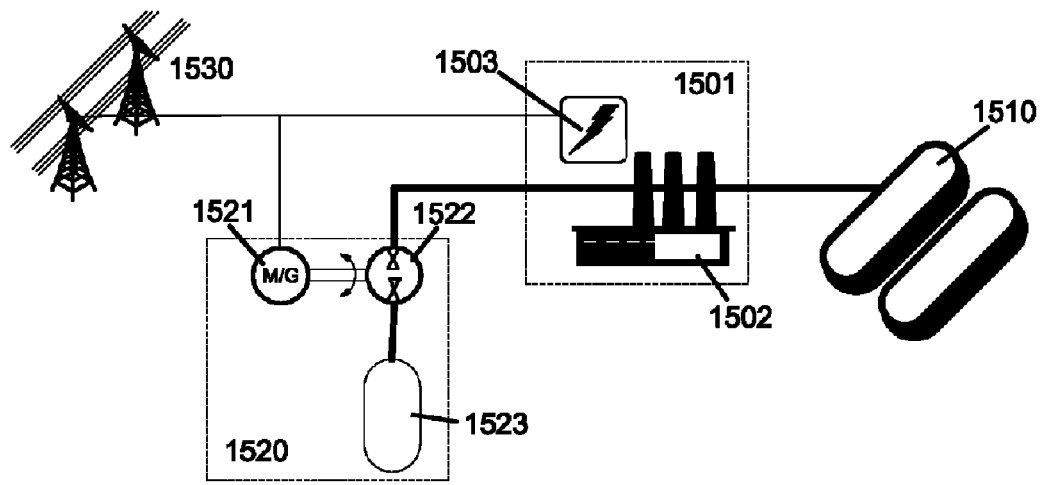
FIGS. 15-18 are schematic diagrams of systems for carbon dioxide sequestration using compressed-gas energy storage and biomass growth in accordance with various embodiments of the invention.

FIG. 15 is a diagram of an illustrative embodiment of the major systems for carbon dioxide sequestration using compressed-gas energy storage and biomass growth, in accordance with one embodiment of the invention. The illustrated system includes a fossil-fuel based power plant (e.g., one consuming coal and/or natural gas) 1501, with simplified outputs of gas emissions 1502 and generated power 1503. Additional components include a biomass-based carbon dioxide sequestration system 1510, a compressed-gas energy conversion system 1520, and, for illustrative purposes, the market usage of the generated power 1530. The major components of the compressed-gas energy conversion system 1520 may include any or all of the features described above with reference to compressed-gas energy conversion systems. As illustrated, these include a motor/generator 1521, a gas compressor/expander 1522, and a means of compressed gas storage 1523 (e.g., pressure vessels, caverns).

Figure 16:
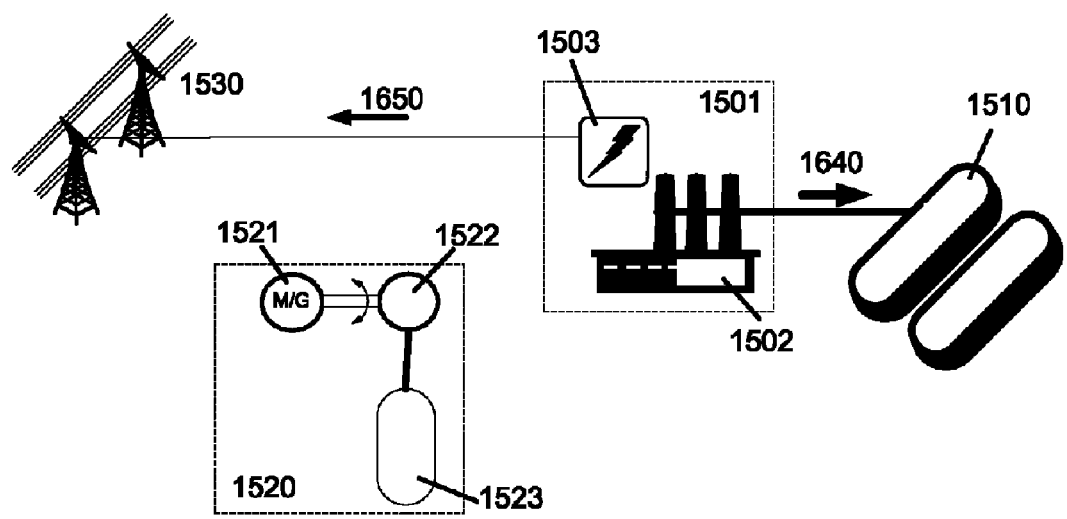
Figure 17:
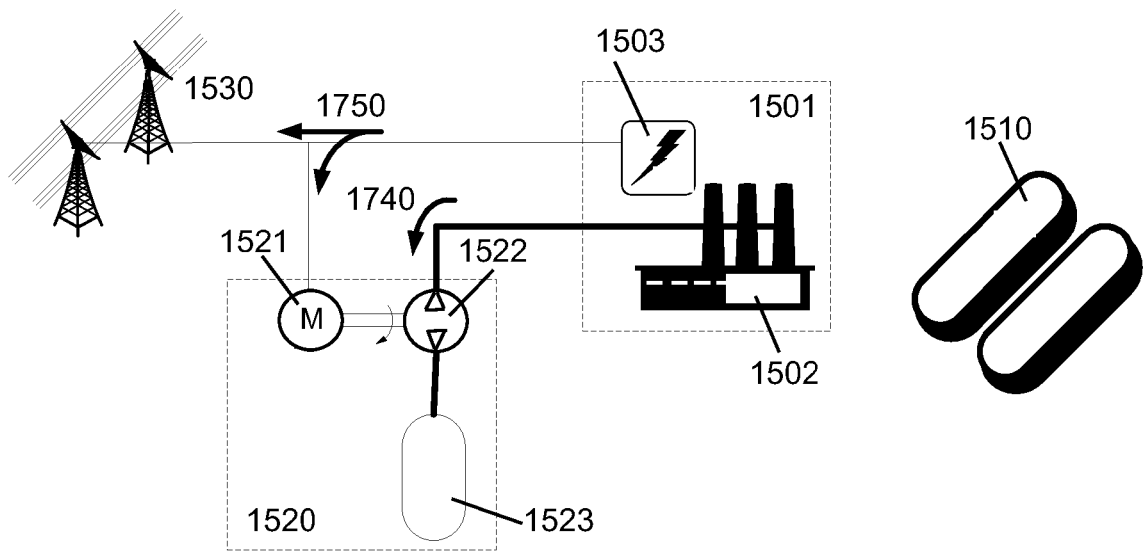
Figure 18:
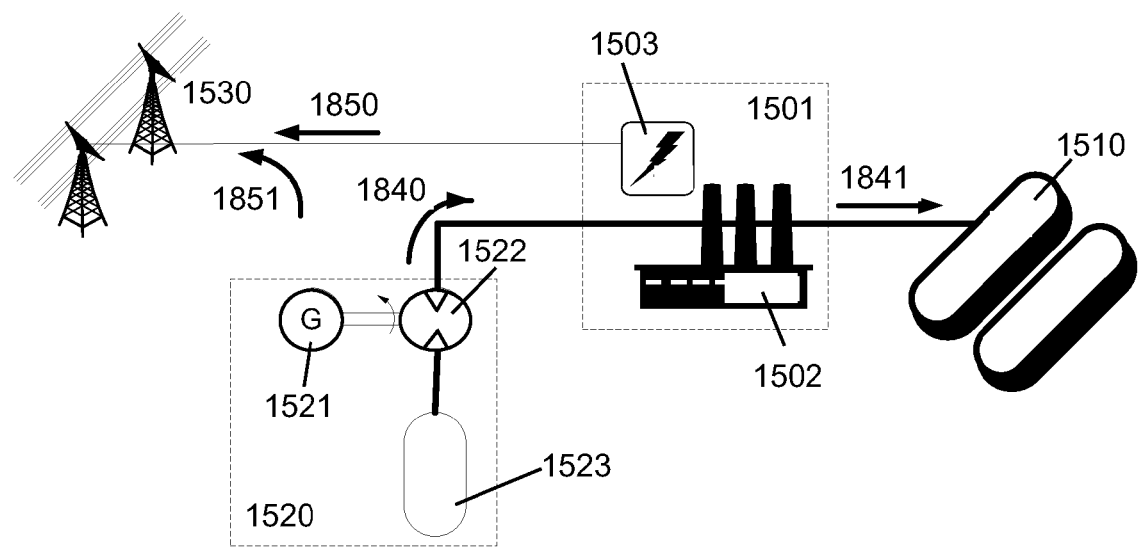

Reference is now made to FIGS. 16-18, which illustrate three states of carbon dioxide sequestration using compressed-gas energy storage and biomass growth. In FIG. 16, the major systems are shown operating in a state where no power-plant energy is being stored or recovered from the compressed-gas energy conversion system. In this state, typically during daytime hours, power is fully transmitted for market usage of the generated power 1530, as indicated by the connection and arrow 1650. Power-plant gas emissions 1502 are directed to the biomass-based carbon dioxide sequestration system 1510, as indicated by the connection and arrow 1640.

In FIG. 17, the major systems for carbon dioxide sequestration using compressed-gas energy storage and biomass growth are shown in a state in which some power-plant energy and all carbon-dioxide-rich power plant gas emissions are being stored by the compressed-gas energy conversion system. In this state, typically during nighttime hours, some portion of the generated power is transmitted for market usage 1530 and some generated power is utilized to drive the motor 1521 and compressor 1522 (as indicated by the connection and arrow 1750), compressing gas 1523 to store energy. Power-plant gas emissions 1502 are compressed and stored into the means of compressed gas storage 1523 as part of this method as indicated by the connection and arrow 1740. Additional air or other gases beyond the power plant gas emissions may be compressed and stored depending on market demand and costs.

In FIG. 18, the major systems for carbon dioxide sequestration using compressed-gas energy storage and biomass growth are shown in a state in which market or other demand for stored energy exists. In this state, previously compressed and stored carbon dioxide-rich gas emissions in the means of compressed gas storage 1523 are expanded through an expander 1522 and generator 1521 generating usable/saleable power which, along with the power from the current operation of the power plant, is transmitted for market usage 1530, as indicated by the connections and arrows 1850 and 1851. After expansion, these previously stored carbon dioxide-rich gas emissions, along with current gas emissions from operation of the power plant, are directed to the biomass facility 1510, as indicated by the connections and arrows 1840 and 1841.

Systems and methods of carbon dioxide extraction from power plants emissions in accordance with embodiments of the invention feature compression of the emission gases to high pressure such that a portion of the carbon dioxide present undergoes a phase change to liquid and/or a supercritical fluid state. For example, pure carbon dioxide undergoes a phase change from gas to liquid at approximately 30 atm (440 psi) at 20° C. and 71 atm (1050 psi) at 31° C. As 31° C. and 71 atm is the critical point for carbon dioxide, above 31° C. carbon dioxide will be a combination of gas, liquid, and/or supercritical fluid, depending on the pressure. Carbon dioxide in a gas mixture (i.e., impure carbon dioxide), such as in power plant emissions, will undergo phase changes in accordance to the partial pressure of the carbon dioxide in the mixture. For example, a portion of carbon dioxide at a 10% concentration (by volume) in gas emissions will liquefy at 20° C. when the overall pressure reaches 300 atm (4400 psi), thus bringing the partial pressure of carbon dioxide to 30 atm. To liquefy the majority of carbon dioxide in a gas emissions mixture, very high pressures or reduced temperature is generally needed. After the carbon dioxide is liquefied or in the form of a supercritical fluid, it will typically sink to the bottom of the storage vessel due to its higher density. Removal of the liquefied or supercritical carbon dioxide may then be accomplished mechanically. Example mechanical apparatus for separation of the liquefied or supercritical carbon dioxide, among others, are described in U.S. Pat. Nos. 5,690,828 and 5,866,004, the disclosures of which are hereby incorporated herein by reference in their entireties.

Systems and methods for carbon dioxide extraction from carbon dioxide-rich gas emissions may involve the chemical processing of carbon dioxide rich gas emissions, such as in U.S. Pat. No. 6,497,852, where the recovery is done by passing the emissions over a material such as a "liquid absorbent fluid comprising an organic amine absorbent," or as in U.S. Pat. No. 6,235,092, where separation is accomplished by "contact . . . with carbon dioxide nucleated water under conditions of selective carbon dioxide clathrate formation." The extracted carbon dioxide may be compressed after extraction to form a liquid or supercritical fluid where it may be sequestered at depth or sold as a useful solvent for such things as dry cleaning and contaminant removal. Additionally, among other applications, the extracted carbon dioxide may be used for biofuel production. The disclosures of U.S. Pat. Nos. 6,497,852 6,235,092 are hereby incorporated herein by reference in their entireties. Typically, carbon dioxide separation from air is accomplished via chemical extraction methods in part due to the high partial pressures and/or low temperatures required.

The compressed-gas energy conversion systems described herein may be used for further cooling of compressed gases and thus extraction of carbon dioxide at low pressures. By compressing power plant emissions gas to store energy, such systems can concurrently process the carbon dioxide-rich power plant gas emissions (e.g., 2-30% carbon dioxide) for partial extraction of the carbon dioxide from said emissions. The combination of fossil fuel-based power plants, compressed-gas energy storage, and compression-based carbon dioxide extraction provides an economically feasible solution to both energy storage needs and carbon dioxide extraction. The added benefit of carbon dioxide extraction through the compression process further increases the value of the compressed-gas energy conversion system, providing carbon dioxide in liquid or supercritical fluid form, both reducing carbon dioxide gas emissions and providing a potential resource for use as solvent or otherwise.

Embodiments of the invention combine mechanical carbon dioxide extraction systems and methods with compressed-gas energy storage to allow for a cost-effective means of both storing energy and extracting carbon dioxide. Gas emissions from a power plant are compressed to high pressures using any of the compressed-air energy-storage systems described above, and then a portion of the carbon dioxide is extracted mechanically, in effect both storing energy and extracting carbon dioxide from carbon dioxide-rich power plant gas emissions. At other times, upon market or other demand, primarily during daytime hours, the processed and compressed power plant gas emissions are expanded, recovering most of the stored energy, while the extracted carbon dioxide is sold, utilized, or sequestered.

In one embodiment, compressed-gas energy conversion systems are utilized to concurrently store energy and capture carbon dioxide at a coal-fired or other carbon-based power plant. Some of the energy produced by the power plant at night is used to compress the gas emissions from the power plant and, at the same time, some carbon dioxide is extracted through compression of the emission gases to high pressure such that a portion of the carbon dioxide present undergoes a phase change to liquid and/or supercritical fluid state; this liquefied carbon dioxide, due to its higher density, sinks to the bottom of the storage vessel and is removed mechanically. During daylight hours, where market or other demand exists for additional power, previously compressed and stored gas emissions, which have undergone carbon dioxide extraction, are expanded increasing power output to the grid. Overall, this method has the potential to offset the high costs of sequestration by combining with an energy conversion system that can add value to a power generation plant by allowing the matching demand and the reutilization of a portion of the energy used in carbon dioxide extraction. This method both provides shifting of the energy produced by the power plant and extraction of some of the carbon dioxide produced by the plant and storing it in liquid form. Among other applications, the extracted carbon dioxide may be used as a valuable solvent or in biofuel production and/or sequestered through deep-well injection or in biomass as described above.

Figure 19:
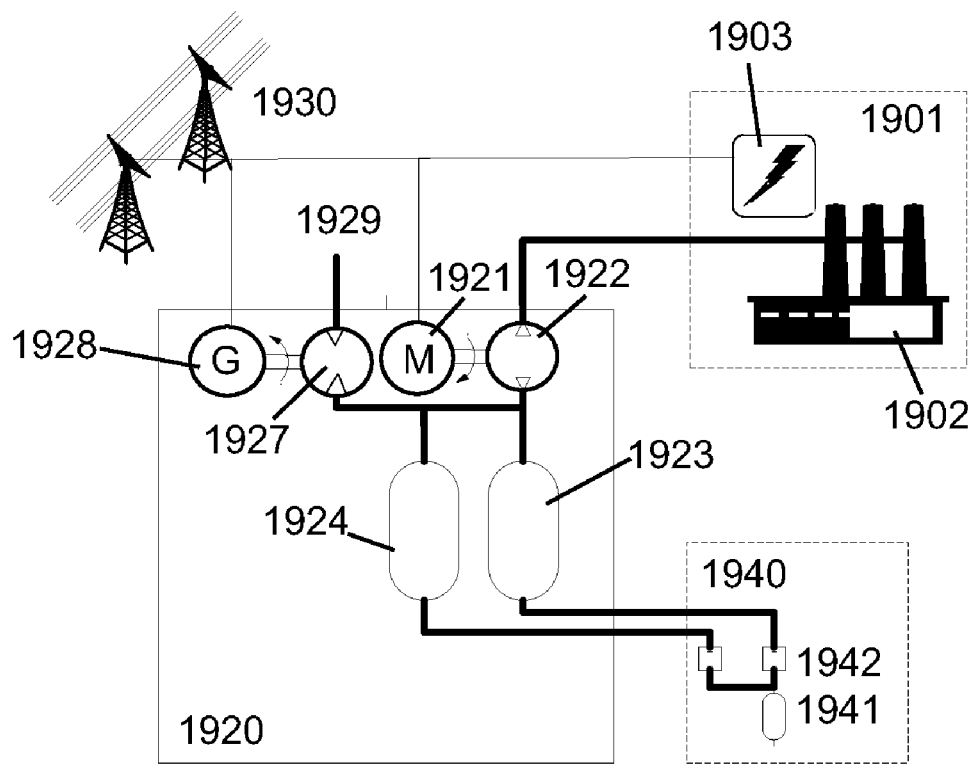
FIGS. 19-25 are schematic diagrams of systems for carbon dioxide extraction using compressed-gas energy storage in accordance with various embodiments of the invention.
Figure 21:
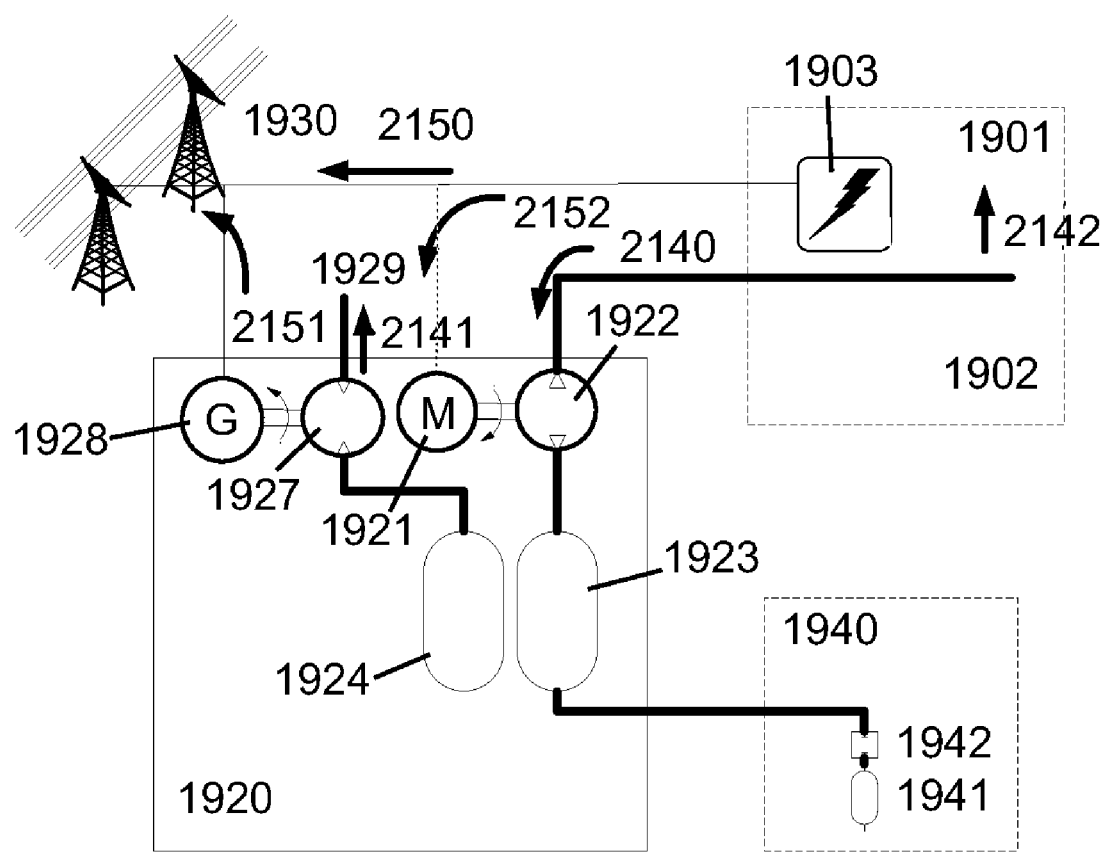

FIG. 19 is a diagram of an illustrative embodiment of the major systems for carbon dioxide extraction using compressed-gas energy storage. The system consists of a fossil-fuel based power plant (e.g., coal, natural gas) 1901, with simplified outputs of gas emissions 1902 and generated power 1903. Additional components include a compressed-gas energy storage 1920 system utilizing any compressed air energy conversion system, such as any of those describe above, a carbon dioxide extraction system 1940, and, for illustrative purposes, the market usage of the generated power 1930. The major components of the illustrated compressed-gas energy storage 1920 include a motor 1921, a gas compressor 1922, means of compressed gas storage 1923 and 1924 (e.g., pressure vessels, caverns, and/or storage vessels), gas expander 1927, generator 1928, and gas exhaust 1929. The gas exhaust 1929 may be a vent opening to the atmosphere having a manual or electronically controlled opening. The use of two storage bottles provides flexibility in operating the system, namely allowing for simultaneous expansion and compression and a carbon dioxide separation operation, which is shown in FIG. 21. The major components of the carbon dioxide extraction system 1940 include a mechanical system for extracting liquid from the gas storage vessel 1942 and a carbon dioxide pressure vessel 1941. The mechanical extraction occurs by means of a valve system on the bottom of the compressed gas storage means 1923, 1924. Both the carbon dioxide pressure vessel 1942 and the mechanical system for extracting liquid 1941 are physically downstream of the hydraulic-pneumatic conversion system. Single combined motor/generators 1921, 1928 and compressor/expanders 1922, 1927 may also be utilized.

Figure 20:
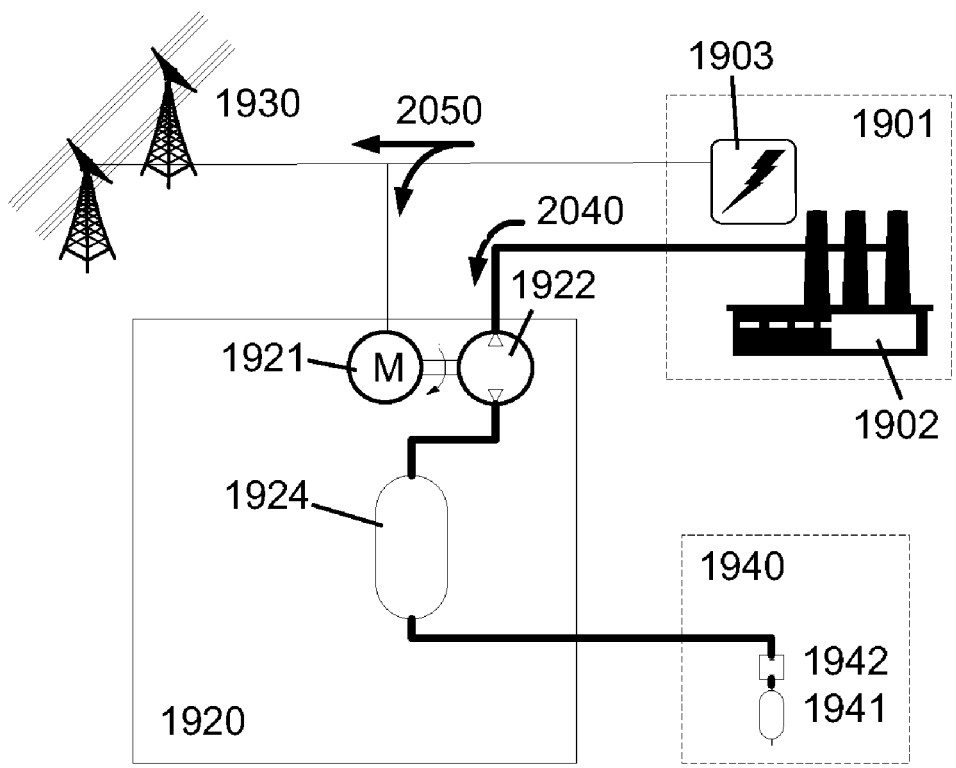

Reference is now made to FIGS. 20 and 21, which illustrate two states of carbon dioxide extraction using compressed-gas energy storage. In FIG. 20, the major systems for carbon dioxide extraction using compressed-gas energy storage are shown in a state in which some power plant energy and carbon dioxide-rich power plant gas emissions are being stored by the compressed-gas energy conversion system. In this state, some portion of the generated power is transmitted for market usage 1930 and some generated power is utilized to drive the motor 1921 and compressor 1922, compressing gas into the means of compressed gas storage 1923 to store energy as indicated by the connections and arrows 2050. Power plant gas emissions 1902 are compressed and stored into the means of compressed gas storage 1924, as indicated by the connection and arrow 2040. Additional air or other gases beyond the power plant gas emissions may be compressed and stored depending on market demand and costs. When a pressure sufficient to liquefy some of the carbon dioxide in the means of compressed-gas storage 1924 is reached, the mechanical system 1942 extracts liquid from the means of compressed-gas storage 1924 for storage in the carbon dioxide pressure vessel 1941. If desired, the temperature of the means of compressed gas storage 1924 may be reduced to condense, and thereafter extract, more carbon dioxide. This additional cooling may be performed either previous to the initial extraction stage, whereby additional condensed carbon dioxide may be extracted during the normal extraction stage, or after this initial extraction. In the latter case, an additional extraction stage will typically remove the extra carbon dioxide condensed during cooling.

In FIG. 21, the major systems for carbon dioxide extraction using compressed-gas energy storage are shown in a state in which market or other demand for stored energy exists. In this state, previously compressed and stored gas emissions in the means of compressed gas storage 1924, which have undergone carbon dioxide extraction, are expanded through an expander 1927 and generator 1928, generating usable/saleable power which, along with the power from the current operation of the power plant, is transmitted for market usage 1930, as indicated by the connection and arrow 2150 and 2151. The previously compressed and stored gas emissions, which have undergone carbon dioxide extraction, are exhausted through 1929 to the atmosphere following expansion as indicated by the connection and arrow 2141. At the same time, depending on operator decisions, current carbon dioxide-rich power plant gas emissions 1902 may be stored in the means of compressed-gas storage 1923, as indicated by the connection and arrow 2140, or exhausted, as indicated by arrow 2142. When the emissions are directly exhausted, a separate compressor/expander and motor/generator are unnecessary. When carbon dioxide-rich power plant emissions 1902 are stored, some portion of the generated power may be utilized to drive the motor 1921 and compressor 1922, compressing gas into the means of compressed gas storage 1923 to store energy as indicated by the connections and arrows 2152. When pressure sufficient to liquefy some of the carbon dioxide in the means of compressed gas storage 1923 is reached, the mechanical system 1942 extracts liquid from the means of compressed gas storage 1923 for storage in the carbon dioxide pressure vessel 1941. If desired, the temperature of the means of compressed gas storage 1923 may be reduced to extract more carbon dioxide, as described above with reference to FIG. 20.

Embodiments of the invention also feature even more efficient methods of extraction of carbon dioxide (and/or other gases) in tandem with compressed-gas energy storage. In one embodiment, the gas emissions from a power plant are compressed within the first stage of a compressed gas storage system to moderate pressures and within that stage of the energy conversion system the carbon dioxide is extracted, in effect both storing energy and pressurizing the power plant emissions for extracting carbon dioxide from carbon dioxide-rich power plant gas emissions. Following carbon dioxide extraction in the first stage of the compressed-gas energy conversion system, both the processed power plant emissions and the extracted carbon dioxide may be further compressed in the second stage of the energy conversion system. At other times, upon market or other demand, primarily during daytime hours, the processed and compressed power plant gas emissions are expanded, recovering most of the stored energy, while the extracted carbon dioxide is sold, utilized, or sequestered.

Figure 22:
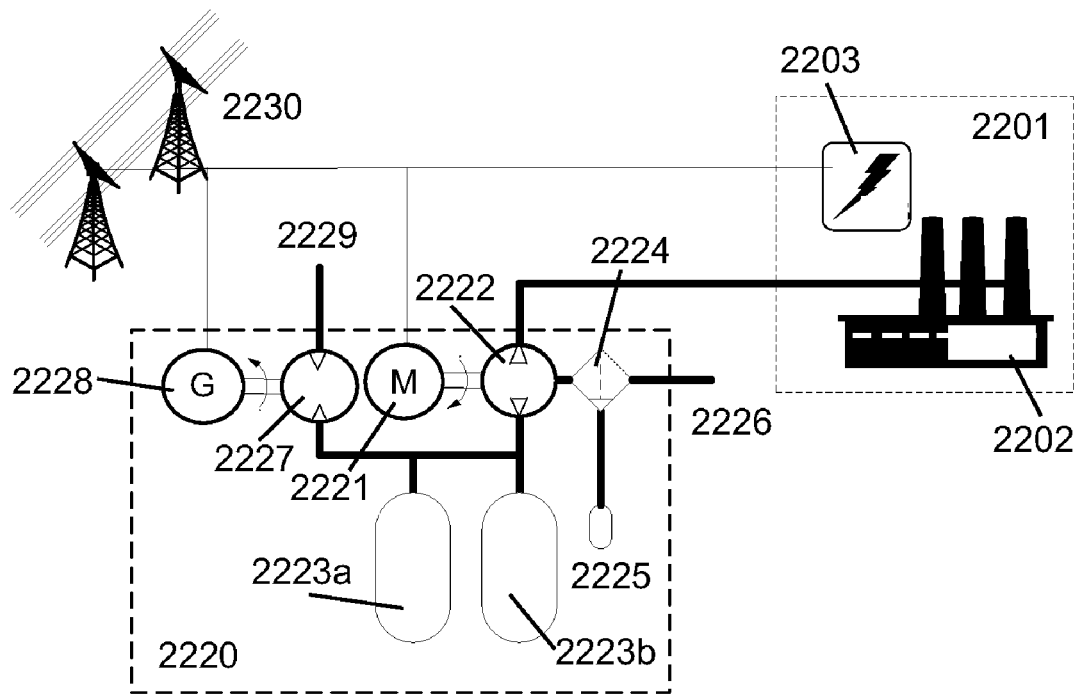

FIG. 22 is a diagram of another illustrative embodiment of the major systems for carbon dioxide extraction combined with compressed-gas energy storage. The illustrated system includes a fossil-fuel based power plant (e.g., one utilizing coal or natural gas) 2201, with simplified outputs of gas emissions 2202 and generated power 2203. Additional components may include a compressed-gas energy storage and carbon dioxide extraction system 2220, and, for illustrative purposes, the market usage of the generated power 2230. The major components of the illustrated compressed-gas energy storage and carbon dioxide extraction system 2220 include a motor 2221 to drive the gas compressor 2222, means of compressed gas storage 2223a and 2223b (e.g., pressure vessels and/or caverns), system for carbon dioxide extraction 2224, carbon dioxide pressure vessel 2225, gas expander 2227, generator 2228, and gas exhausts 2226 and 2229. Gas exhausts 2226 and 2229 may be a vent to atmosphere having a manual or electronically controlled opening. Two storage vessels 2223*a*, 2223*b* are included in order to increase operational flexibility, which will be discussed presently, although two vessels are not necessary to achieve the carbon dioxide extraction (as discussed above).

Figure 23:
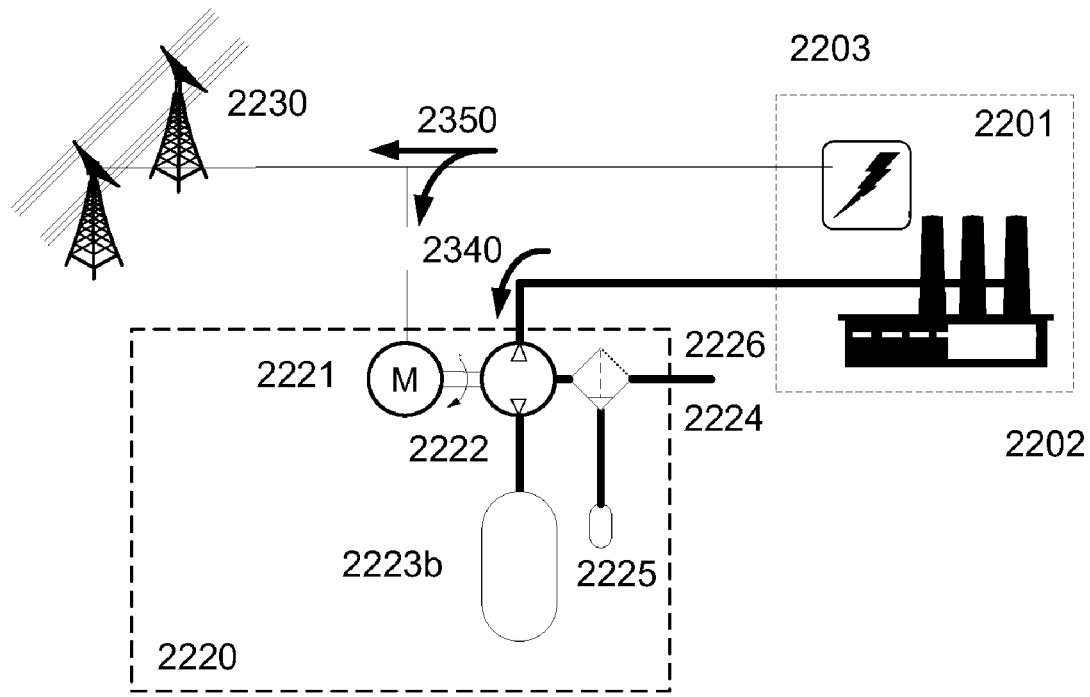
Figure 24:
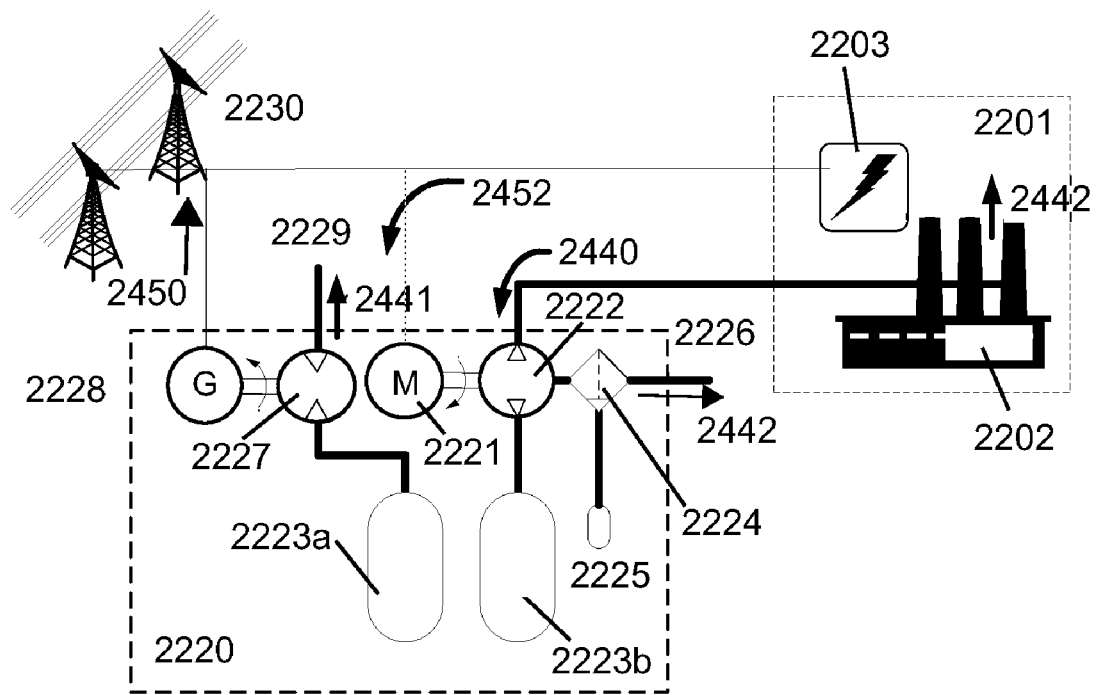

Reference is now made to FIGS. 23 and 24, which illustrate two states of the system for carbon dioxide extraction with combined compressed-gas energy storage. In FIG. 23, the major systems are shown operating in a state where some power-plant energy is being stored by the compressed-gas energy conversion system and the gas being compressed includes (or is made entirely of) carbon-dioxide-rich power plant gas emissions which are being compressed and from which carbon dioxide is being extracted during compression. In this state, some portion of the generated power is transmitted for market usage 2230, and some generated power is utilized to drive the motor 2221 and compressor 2222, compressing gas into the compressed gas storage 2223*b* to store energy as indicated by the connection and arrow 2350. Power-plant gas emissions 2202 are directed to the compressed gas system, as indicated by the connection and arrow 2340, and, during compression, circulated through the system for carbon dioxide extraction 2224, where carbon dioxide is extracted and stored into a carbon dioxide pressure vessel 2225. Additionally, ambient air or other gases beyond power plant gas emissions may be compressed and stored depending on market demand and costs. Alternatively, where there is no foreseeable demand for stored energy or the compressed gas storage 2223*b* is filled, additional emissions 2202 may be treated with the subsequent carbon dioxide-lean exhaust being vented from gas exhaust 2226.

In FIG. 24, the major sub-systems for carbon dioxide extraction with combined compressed-gas energy storage are shown where market or other demand for stored energy exists. In this state, previously compressed and stored gas emissions in the compressed-gas storage 2223*a*, which have undergone carbon dioxide extraction, are expanded through an expander 2227 driving the generator 2228, generating usable/saleable power which, along with the power from the current operation of the power plant, is transmitted for market usage 2230, as indicated by the connection and arrow 2450. The previously compressed and stored gas emissions, which have undergone carbon dioxide extraction, are exhausted through gas exhaust 2229 to the atmosphere following expansion, as indicated by the connection and arrow 2441. At the same time, depending on operator decisions, current carbon dioxide-rich power plant gas emissions 2202 may be processed for carbon dioxide extraction, as indicated by the connection and arrow 2440, or exhausted as indicated by arrow 2442. When the emissions are directly exhausted, a separate compressor/expander and motor/generator are generally unnecessary. When carbon dioxide-rich power plant emissions 2202 are stored, some portion of the generated power is utilized to drive the motor 2221, compressor 2222, and carbon dioxide extraction system 2224 for storage in the carbon dioxide pressure vessel 2225. These processed emissions may be exhausted through gas exhaust 2226 or stored as compressed gas in the compressed gas storage 2223*b*, depending on desired operating conditions.

Figure 25:
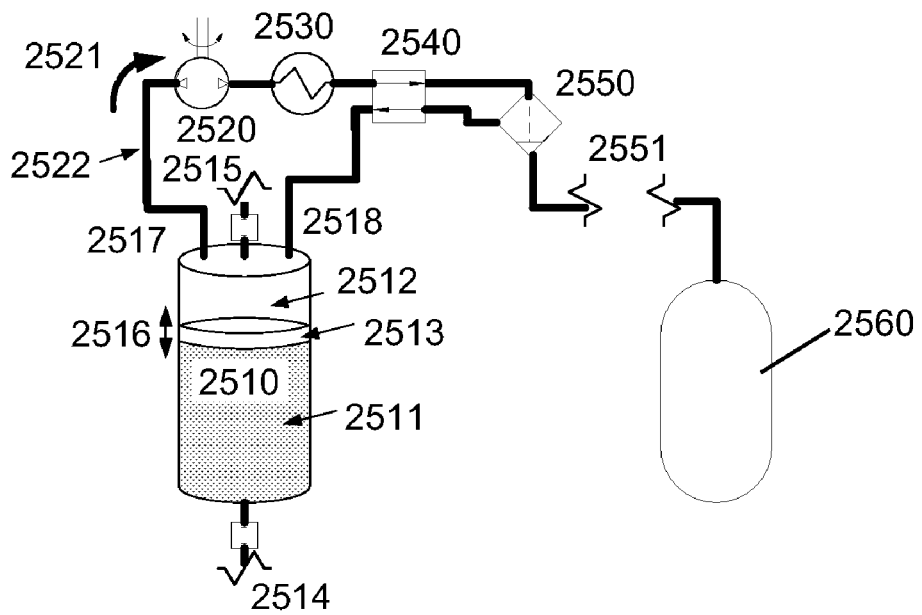

In FIG. 25, some power-plant energy is being stored by the compressed-gas energy conversion system, the gas being compressed includes (or is made entirely of) carbon-dioxide-rich power plant gas emissions that are being compressed, and carbon dioxide is being extracted during compression. The gas compression subsystem preferably includes the hydraulic/pneumatic system and heat transfer circuits describe above. In FIG. 25, a single stage of a staged hydraulic/pneumatic compressed-gas energy conversion system is represented here by a cylinder 2510 containing a gas chamber or "pneumatic side" 2512 and a fluid chamber or hydraulic side 2511 separated by a movable (double arrow 2516) piston 2513 or other force/pressure-transmitting barrier that isolates the gas from the fluid. The cylinder 2510 includes a primary gas port 2515, which connects with a pneumatic circuit that initially admits the uncompressed gases and eventually outputs the compressed gas (not shown). The cylinder 2510 further includes a primary fluid port 2514, which connects with a hydraulic drive circuit of the storage system that provides the pressurized fluid to drive the piston 2513 and compresses the gases in the pneumatic side 2512.

The cylinder 2510 has one or more gas circulation outlet ports (shown here as port 2517) that are connected via piping 2522 to a gas circulator 2520 which is part of a heat exchange subsystem like those described above with respect to FIG. 5. The gas circulator 2520 provides a flow (arrow 2521) of gas through the piping 2522. The outlet of the gas circulator 2520 is connected via a pipe to the gas inlet of a heat exchanger 2530. As described above, such a system improves efficiency and power output of the compressed-gas energy conversion system.

Additionally, the compressed gases may further be circulated through a carbon-dioxide extraction system 2550 depending on the state of the valve 2540. Reactivity in many carbon dioxide extraction systems, such as absorber-type extraction systems using MEA (monoethanolamine), improves with compression of the gases being processed. In the system herein described, energy used for the compression of the exhaust gases is mostly stored and recovered in the compressed-gas energy conversion system. As indicated in FIG. 25, the compressed gases are processed in the carbon dioxide extraction system 2550, which may be accomplished using an established extraction method such as pressure swing adsorption, chemical absorption, or membrane separation. Extracted carbon dioxide continues to additional stages of the carbon dioxide process, indicated by 2551, while the remaining compressed gases after the carbon dioxide extraction in 2550 complete the air circuit, passing back through valve 2540, and return to the cylinder via piping into the inlet port(s) shown here as port 2518. Extracted carbon dioxide is further processed in 2551 and stored in a pressure vessel 2560. The carbon dioxide is often further compressed to liquid or supercritical fluid state where it may be sold as a useful solvent, sequestered at depth or in a biomass, or used for biofuel production.

Embodiments of the invention disclosed herein may also be utilized in wind-energy storage applications. The power generated by a wind turbine/generator is variable and proportional to the wind speed. Wind turbine installations not coupled with energy storage supply the grid with intermittent power, typically resulting in increased costs for the utility due to the need to increase standby reserves to compensate for short-term variability in generation.

In 2008, nearly all operational wind turbines include an electric generator mounted in the nacelle of a horizontal-axis wind turbine. The inclusion of an electric generator in each turbine adds cost and weight to the nacelle for wind turbines. Certain approaches have been proposed to reduce weight in the nacelle, by moving the electrical generator to the ground, and to reduce costs, by replacing separate electric generators for each turbine with one larger generator for an array of turbines.

The replacement of the electrical generator in a wind turbine nacelle with a hydraulic drivetrain allows for the reduction of weight (and potentially cost) for the turbine, a broader wind-speed efficiency range for operation, and the ability to replace electrical generators at each individual turbine with a larger central electrical generator. Additionally, by coupling the hydraulic system with an efficient energy conversion system (such as those described above), wind energy generation may become a baseline generator with constant output or even a source of dispatchable energy providing power based on market needs.

Figure 26:
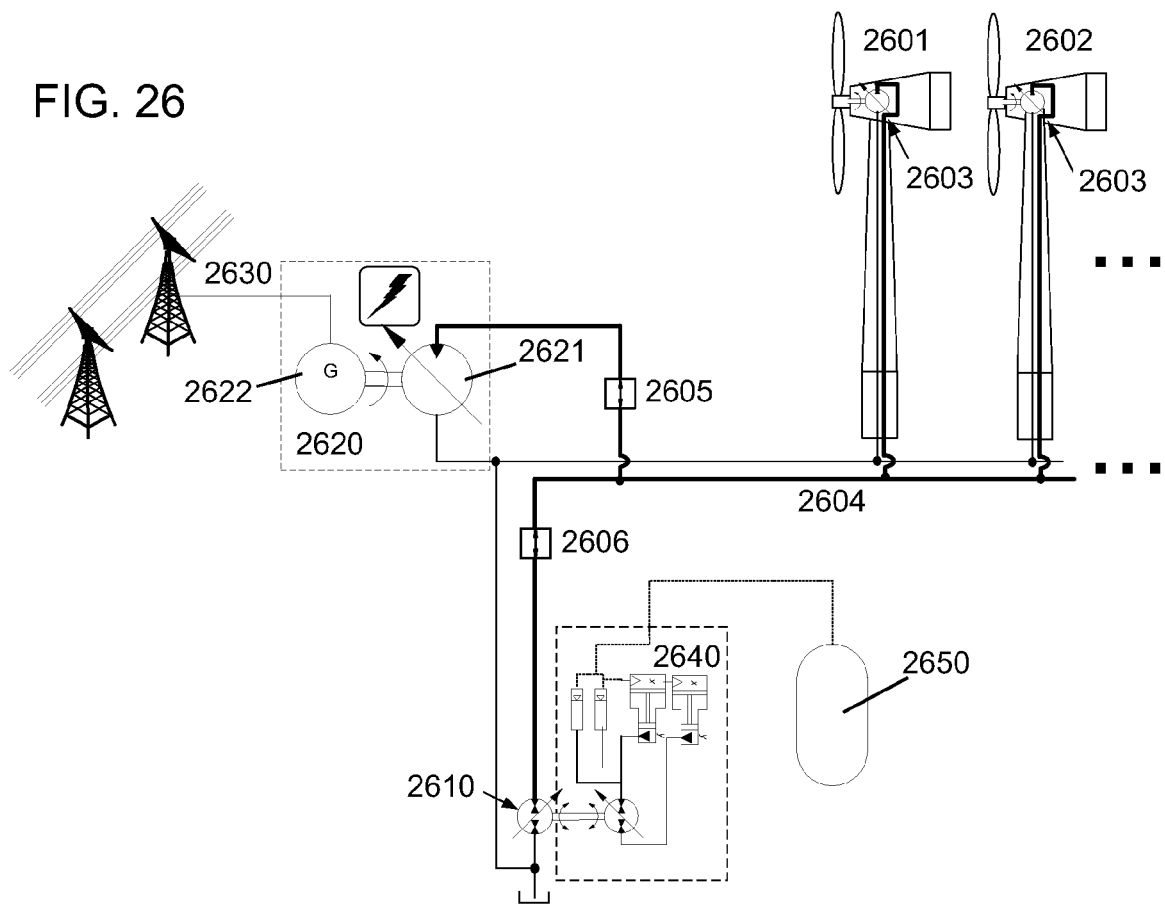
FIG. 26 is a schematic diagram of a system for wind-energy generation and storage in accordance with various embodiments of the invention.

FIG. 26 is a diagram of the major systems for a method for wind energy generation and storage utilizing a turbine with a hydraulic drivetrain and an energy conversion system. The system includes a single or series of wind turbines 2601, 2602, each with a hydraulic drive 2603, represented here as a variable hydraulic pump that maintains a consistent pressure throughout the pressurized hydraulic lines. As the wind turbine spins in the wind, pressurized hydraulic fluid is forced through tubing 2604 in varying flow rates to hydraulic machine 2610 (driving an electric generator 2622) and/or energy conversion system 2640 (which may incorporate any of the energy conversion system features described above, with respect to, for example, FIG. 3). For illustrative purposes, the on/off flow of the pictured pressurized hydraulic fluid is controlled via valves 2605 and 2606, and flow rate is controlled via variable displacement hydraulic pump/motors 2610 and 2621. For immediate power generation, the pressurized hydraulic fluid is used to drive hydraulic motor 2621 attached to a generator 2622, generating power for power-grid delivery 2630 or other usage. When excess power is available or market demand is low, a portion or all of the pressurized hydraulic fluid may be directed to energy conversion system 2640. In an exemplary hydraulic-pneumatic energy conversion system, the pressurized hydraulic fluid is used to compress air to high pressures and store in pressure vessels or caverns 2650. Upon market demand, the stored compressed air in 2650 may be expanded through the hydraulic-pneumatic energy conversion system 2640, driving hydraulic pump/motor 2610, and used in combination with or separately from contemporaneous wind-power production to drive hydraulic pump/motor 2621 and the electric generator 2622

Further, in another embodiment, the hydraulic-pneumatic energy conversion system 2640 may be used to store energy from another power source, such as the electric grid 2630, by having generator 2622 driven as an electric motor and hydraulic motor 2621 as a hydraulic pump, in turn driving hydraulic pump/motor 2610 as a hydraulic motor to power the system 2640 to compress air to high pressures in energy conversion system 2640 and store in pressure vessels or caverns 2650.

The foregoing has been a detailed description of illustrative embodiments of the invention. Various modifications and additions may be made without departing from the spirit and scope of this invention. Each of the various embodiments described above may be combined with other described embodiments in order to provide multiple features. Furthermore, while the foregoing describes a number of separate embodiments of the systems and methods of the present invention, what has been described herein is merely illustrative of the application of the principles of the present invention. For example, the size, performance characteristics, and number of components used to implement the system are highly variable. For example, while a particular implementation of a heat exchanger is shown and described, the type and placement of components within the heat exchange subsystem may be highly variable. For example, in an alternative embodiment, the circulator 352, 552 (FIGS. 3A and 5) may be located downstream of the heat exchanger(s) 354, 554 rather than upstream, or at both upstream and downstream locations. The flow of gas through the heat exchanger may be further controlled by one or more valves within the subsystem. A variety of other sensors, such as a pressure sensor assembly, may also be employed within the heat exchange subsystem. Furthermore, the identical exemplary embodiments of the invention shown in FIGS. 12-14, as well as other embodiments described but not shown, may be operated as both compressor and expander, storing electricity in the form of the potential energy of compressed gas and producing electricity from the potential energy of compressed gas.

What is claimed is:

1. A combined thermal and compressed-gas energy conversion system (i) suitable for the efficient use and conservation of energy resources and (ii) for use with a source of recovered thermal energy, the system comprising:
    an open-air compressed-gas energy conversion system configured for substantially isothermal storage and recovery of energy and comprising:
        at least one cylinder assembly for the storage and recovery of energy via compression and expansion of gas therewithin,
        selectively fluidly connected to the at least one cylinder assembly, means for storage of compressed gas after compression and supply of compressed gas for expansion thereof, and
        selectively fluidly connected to the at least one cylinder assembly, a vent for exhausting expanded gas to atmosphere after expansion and supply of gas for compression thereof; and
    a heat-exchange subsystem (i) configured for fluid communication with the compressed-gas energy conversion system and the source of recovered thermal energy, and (ii) comprising, disposed in at least one said cylinder assembly, a spray mechanism for introducing a heat-exchange fluid therein.

2. The system of claim 1, wherein the heat-exchange subsystem utilizes the recovered thermal energy to heat the compressed gas prior to and/or during expansion thereof.

3. The system of claim 1, wherein the heat-exchange subsystem utilizes the recovered thermal energy to cool the compressed gas during and/or after compression thereof.

4. The system of claim 1, wherein the source of recovered thermal energy comprises at least one of a fossil fuel power plant, a heat engine power plant, a solar thermal source, a geothermal source, an industrial process with waste heat, a heat pump, a heat source, a heat sink, or a source of environmentally chilled water.

5. The system of claim 1, wherein the source of recovered thermal energy comprises a thermal well.

6. The system of claim 1, wherein the heat-exchange subsystem comprises:
    a circulation apparatus in fluid communication with the energy conversion system for circulating the heat-exchange fluid through the heat-exchange subsystem; and
    a heat exchanger comprising:
        a first side in fluid communication with the circulation apparatus and the energy conversion system, the circulation apparatus circulating the heat-exchange fluid from the energy conversion system, through the heat exchanger, and back to the energy conversion system, and
        a second side configured for fluid communication with the source of recovered thermal energy.

7. The system of claim 6, wherein the heat-exchange fluid transfers at least a portion of the recovered thermal energy for use as at least one of process heat, cooling, or building conditioning.

8. The system of claim 1, wherein the at least one cylinder assembly comprises a first cylinder assembly including a staged pneumatic side and a hydraulic side, the sides being separated by a mechanical boundary mechanism that transfers energy therebetween, and the heat exchange subsystem is in fluid communication with the pneumatic side of the first cylinder assembly.

9. The system of claim 1, wherein the spray mechanism comprises at least one of a spray head disposed at an end of at least one said cylinder assembly or a spray rod running through at least a portion of at least one said cylinder assembly.

10. The system of claim 8, further comprising, in fluid communication with the first cylinder assembly, a second cylinder assembly including a staged pneumatic side and a hydraulic side separated by a boundary mechanism that transfers mechanical energy therebetween.

11. The system of claim 10, wherein the first cylinder assembly is an accumulator that transfers the mechanical energy at a first pressure ratio and the second cylinder assembly is an intensifier that transfers the mechanical energy at a second pressure ratio greater than the first pressure ratio.

12. The system of claim 1, wherein the means for storage of compressed gas after compression and supply of compressed gas for expansion thereof comprises a pressure vessel, and the heat-exchange subsystem is in fluid communication with the pressure vessel.

13. The system of claim 12, wherein the heat-exchange subsystem comprises:
  a circulation apparatus in fluid communication with the pressure vessel for circulating a fluid through the heat-exchange subsystem; and
  a heat exchanger comprising:
    a first side in fluid communication with the circulation apparatus and the pressure vessel, the circulation apparatus circulating the fluid from the pressure vessel, through the heat exchanger, and back to the pressure vessel, and
    a second side configured for fluid communication with the source of recovered thermal energy.

14. The system of claim 13, wherein the fluid comprises a gas being stored in the pressure vessel.

15. A combined thermal and compressed-gas energy conversion system (i) suitable for the efficient use and conservation of energy resources and (ii) for use with a source of recovered thermal energy, the system comprising:
  a compressed-gas energy conversion system (i) configured for substantially isothermal storage and recovery of energy, and (ii) comprising a cylinder assembly including a staged pneumatic side and a hydraulic side, the sides being separated by a mechanical boundary mechanism that transfers energy therebetween; and
  a heat-exchange subsystem configured for fluid communication with the pneumatic side of the cylinder assembly and the source of recovered thermal energy,
  wherein the heat-exchange subsystem comprises:
  a circulation apparatus in fluid communication with the pneumatic side of the cylinder assembly for circulating a fluid through the heat-exchange subsystem; and
  a heat exchanger comprising:
    a first side in fluid communication with the circulation apparatus and the pneumatic side of the cylinder assembly, the circulation apparatus circulating the fluid from the pneumatic side of the cylinder assembly, through the heat exchanger, and back to the pneumatic side of the cylinder assembly, and
    a second side configured for fluid communication with the source of recovered thermal energy.

16. The system of claim 15, wherein the fluid comprises a gas being compressed or expanded in the pneumatic side of the cylinder assembly.

17. The system of claim 15, further comprising a spray mechanism disposed in the pneumatic side of the cylinder assembly, wherein the fluid comprises a heat-exchange fluid introduced into the cylinder assembly through the spray mechanism.

18. The system of claim 17, wherein the spray mechanism comprises at least one of a spray head disposed at an end of the cylinder assembly or a spray rod running through at least a portion of the cylinder assembly.

19. The system of claim 15, further comprising, in fluid communication with the cylinder assembly, a second cylinder assembly including a staged pneumatic side and a hydraulic side separated by a boundary mechanism that transfers mechanical energy therebetween.

20. The system of claim 19, wherein the cylinder assembly is an accumulator that transfers the mechanical energy at a first pressure ratio and the second cylinder assembly is an intensifier that transfers the mechanical energy at a second pressure ratio greater than the first pressure ratio.

21. The system of claim 15, wherein the heat-exchange subsystem utilizes the recovered thermal energy to heat the compressed gas prior to and/or during expansion thereof.

22. The system of claim 15, wherein the heat-exchange subsystem utilizes the recovered thermal energy to cool the compressed gas during and/or after compression thereof.

23. The system of claim 15, wherein the source of recovered thermal energy comprises at least one of a fossil fuel power plant, a heat engine power plant, a solar thermal source, a geothermal source, an industrial process with waste heat, a heat pump, a heat source, a heat sink, or a source of environmentally chilled water.

24. The system of claim 15, wherein the source of recovered thermal energy comprises a thermal well.

25. The system of claim 15, wherein the fluid transfers at least a portion of the recovered thermal energy for use as at least one of process heat, cooling, or building conditioning.

26. A combined thermal and compressed-gas energy conversion system (i) suitable for the efficient use and conservation of energy resources and (ii) for use with a source of recovered thermal energy, the system comprising:
  a compressed-gas energy conversion system (i) configured for substantially isothermal storage and recovery of energy, and (ii) comprising a pressure vessel for storage of the compressed gas;
  a spray mechanism disposed in the pressure vessel; and
  a heat-exchange subsystem configured for fluid communication with the pressure vessel and the source of recovered thermal energy, the heat-exchange subsystem comprising:
  a circulation apparatus in fluid communication with the pressure vessel for circulating a fluid through the heat-exchange subsystem, and
  a heat exchanger comprising:
    a first side in fluid communication with the circulation apparatus and the pressure vessel, the circulation apparatus circulating the fluid from the pressure vessel, through the heat exchanger, and back to the pressure vessel, and
    a second side configured for fluid communication with the source of recovered thermal energy, wherein the fluid comprises a heat-exchange fluid introduced into the pressure vessel through the spray mechanism.

27. The system of claim 26, wherein the heat-exchange subsystem utilizes the recovered thermal energy to heat the compressed gas prior to and/or during expansion thereof.

28. The system of claim 26, wherein the heat-exchange subsystem utilizes the recovered thermal energy to cool the compressed gas during and/or after compression thereof.

29. The system of claim 26, wherein the source of recovered thermal energy comprises at least one of a fossil fuel power plant, a heat engine power plant, a solar thermal source, a geothermal source, an industrial process with waste heat, a heat pump, a heat source, a heat sink, or a source of environmentally chilled water.

30. The system of claim 26, wherein the source of recovered thermal energy comprises a thermal well.

31. The system of claim 26, wherein the fluid transfers at least a portion of the recovered thermal energy for use as at least one of process heat, cooling, or building conditioning.

* * * * *